(12) United States Patent
Makrides-Saravanos et al.

(10) Patent No.: US 8,538,226 B2
(45) Date of Patent: Sep. 17, 2013

(54) FIBER OPTIC EQUIPMENT GUIDES AND RAILS CONFIGURED WITH STOPPING POSITION(S), AND RELATED EQUIPMENT AND METHODS

(75) Inventors: Elli Makrides-Saravanos, Highland Village, TX (US); Kevin L. Strause, Keller, TX (US); Antwan J. Works, Lewisville, TX (US)

(73) Assignee: Corning Cable Systems LLC, Hickory, NC (US)

( * ) Notice: Subject to any disclaimer, the term of this patent is extended or adjusted under 35 U.S.C. 154(b) by 431 days.

(21) Appl. No.: 12/576,806

(22) Filed: Oct. 9, 2009

(65) Prior Publication Data
US 2010/0296791 A1 Nov. 25, 2010

Related U.S. Application Data

(60) Provisional application No. 61/180,331, filed on May 21, 2009, provisional application No. 61/219,233, filed on Jun. 22, 2009, provisional application No. 61/180,334, filed on May 21, 2009, provisional application No. 61/219,241, filed on Jun. 22, 2009.

(51) Int. Cl.
*G02B 6/00* (2006.01)
(52) U.S. Cl.
USPC ............ 385/135; 385/137; 385/139; 385/147
(58) Field of Classification Search
USPC .................. 385/135, 137, 139, 147
See application file for complete search history.

(56) References Cited

U.S. PATENT DOCUMENTS

| | | | |
|---|---|---|---|
| 620,013 | A | 2/1899 | Barnes |
| 2,614,685 | A | 10/1952 | Miller |
| 3,175,873 | A | 3/1965 | Blomquist et al. |
| 3,433,886 | A | 3/1969 | Myers |
| 3,568,263 | A | 3/1971 | Meehan |

(Continued)

FOREIGN PATENT DOCUMENTS

| CA | 2029592 A1 | 5/1992 |
|---|---|---|
| CA | 2186314 A1 | 4/1997 |

(Continued)

OTHER PUBLICATIONS

Patent Cooperation Treaty, International Search Report for International Application No. PCT/US10/35529, Jul. 23, 2010, 2 pages.

(Continued)

*Primary Examiner* — David A Vanore

(57) ABSTRACT

Fiber optic equipment guides and rails and related methods are disclosed. In one embodiment, the fiber optic equipment guides and rails have at least one stopping member disposed therein to provide at least one stopping position during movement. The fiber optic equipment guides and rails can be included in fiber optic equipment to support movement or translation of the fiber optic equipment for access. Such fiber optic equipment can include, but is not limited to, fiber optic equipment chassis, drawers, equipment trays, and fiber optic modules. The fiber optic equipment guides and/or rails include at least one stopping member configured to provide at least one stopping position during movement. Stopping positions allow fiber optic equipment to be retained in a given position during access to the fiber optic equipment. The stopping positions are configured to be overcome with additional force to allow further movement of the fiber optic equipment.

48 Claims, 55 Drawing Sheets

(56) References Cited

U.S. PATENT DOCUMENTS

| | | |
|---|---|---|
| 3,646,244 A | 2/1972 | Cole |
| 3,880,396 A | 4/1975 | Freiberger et al. |
| 3,906,592 A | 9/1975 | Sakasegawa et al. |
| 4,047,797 A | 9/1977 | Arnold et al. |
| 4,059,872 A | 11/1977 | Delesandri |
| 4,119,285 A | 10/1978 | Bisping et al. |
| 4,239,316 A | 12/1980 | Spaulding |
| 4,285,486 A | 8/1981 | Von Osten et al. |
| 4,354,731 A | 10/1982 | Mouissie |
| 4,457,482 A | 7/1984 | Kitagawa |
| 4,525,012 A | 6/1985 | Dunner |
| 4,597,173 A | 7/1986 | Chino et al. |
| 4,611,875 A | 9/1986 | Clarke et al. |
| 4,645,292 A | 2/1987 | Sammueller |
| 4,657,340 A | 4/1987 | Tanaka et al. |
| 4,702,551 A | 10/1987 | Coulombe |
| 4,736,100 A | 4/1988 | Vastagh |
| 4,744,629 A | 5/1988 | Bertoglio et al. |
| 4,747,020 A | 5/1988 | Brickley et al. |
| 4,752,110 A | 6/1988 | Blanchet et al. |
| 4,787,706 A | 11/1988 | Cannon, Jr. et al. |
| 4,792,203 A | 12/1988 | Nelson et al. |
| 4,798,432 A | 1/1989 | Becker et al. |
| 4,808,774 A | 2/1989 | Crane |
| 4,824,193 A | 4/1989 | Maeda et al. |
| 4,824,196 A | 4/1989 | Bylander |
| 4,826,277 A | 5/1989 | Weber et al. |
| 4,838,643 A | 6/1989 | Hodges et al. |
| 4,865,280 A | 9/1989 | Wollar |
| 4,898,448 A | 2/1990 | Cooper |
| 4,900,123 A | 2/1990 | Barlow |
| 4,911,662 A | 3/1990 | Debortoli et al. |
| 4,948,220 A | 8/1990 | Violo et al. |
| 4,949,376 A | 8/1990 | Nieves et al. |
| 4,971,421 A | 11/1990 | Ori |
| 4,991,928 A | 2/1991 | Zimmer |
| 4,995,688 A | 2/1991 | Anton et al. |
| 5,001,602 A | 3/1991 | Suffi et al. |
| 5,005,941 A | 4/1991 | Barlow et al. |
| 5,017,211 A | 5/1991 | Wenger et al. |
| 5,023,646 A | 6/1991 | Ishida et al. |
| 5,024,498 A | 6/1991 | Becker et al. |
| 5,028,114 A | 7/1991 | Krausse et al. |
| 5,037,175 A | 8/1991 | Weber |
| 5,048,918 A | 9/1991 | Daems et al. |
| 5,066,149 A | 11/1991 | Wheeler et al. |
| 5,067,784 A | 11/1991 | Debortoli et al. |
| 5,071,211 A | 12/1991 | Debortoli et al. |
| 5,071,220 A | 12/1991 | Ruello et al. |
| 5,073,042 A | 12/1991 | Mulholland et al. |
| 5,074,635 A | 12/1991 | Justice et al. |
| 5,076,688 A | 12/1991 | Bowen et al. |
| 5,080,459 A | 1/1992 | Wettengel et al. |
| 5,100,221 A | 3/1992 | Carney et al. |
| 5,125,060 A | 6/1992 | Edmundson |
| 5,127,082 A | 6/1992 | Below et al. |
| 5,129,030 A | 7/1992 | Petrunia |
| 5,133,039 A | 7/1992 | Dixit |
| 5,138,688 A | 8/1992 | Debortoli |
| 5,142,598 A | 8/1992 | Tabone |
| 5,142,607 A | 8/1992 | Petrotta et al. |
| 5,150,277 A | 9/1992 | Bainbridge et al. |
| D330,368 S | 10/1992 | Bourgeois et al. |
| 5,152,760 A | 10/1992 | Latina |
| 5,153,910 A | 10/1992 | Mickelson et al. |
| 5,157,749 A | 10/1992 | Briggs et al. |
| 5,167,001 A | 11/1992 | Debortoli et al. |
| 5,189,723 A | 2/1993 | Johnson et al. |
| 5,204,929 A | 4/1993 | Machall et al. |
| 5,209,572 A | 5/1993 | Jordan |
| 5,214,735 A | 5/1993 | Henneberger et al. |
| 5,224,186 A | 6/1993 | Kishimoto et al. |
| 5,231,687 A | 7/1993 | Handley |
| 5,231,688 A | 7/1993 | Zimmer |
| 5,233,674 A | 8/1993 | Vladic |
| 5,239,609 A | 8/1993 | Auteri |
| 5,243,679 A | 9/1993 | Sharrow et al. |
| 5,253,320 A | 10/1993 | Takahashi et al. |
| 5,260,957 A | 11/1993 | Hakimi et al. |
| 5,261,633 A | 11/1993 | Mastro |
| 5,265,187 A | 11/1993 | Morin et al. |
| 5,274,731 A | 12/1993 | White |
| 5,280,138 A | 1/1994 | Preston et al. |
| 5,285,515 A | 2/1994 | Milanowski et al. |
| 5,315,679 A | 5/1994 | Baldwin et al. |
| 5,317,663 A | 5/1994 | Beard et al. |
| 5,323,478 A | 6/1994 | Milanowski et al. |
| 5,323,480 A | 6/1994 | Mullaney et al. |
| 5,333,193 A | 7/1994 | Cote et al. |
| 5,333,221 A | 7/1994 | Briggs et al. |
| 5,333,222 A | 7/1994 | Belenkiy et al. |
| 5,337,400 A | 8/1994 | Morin et al. |
| 5,339,379 A | 8/1994 | Kutsch et al. |
| 5,347,603 A | 9/1994 | Belenkiy et al. |
| 5,353,367 A | 10/1994 | Czosnowski et al. |
| 5,359,688 A | 10/1994 | Underwood |
| 5,363,466 A | 11/1994 | Milanowski et al. |
| 5,366,388 A | 11/1994 | Freeman et al. |
| 5,367,598 A | 11/1994 | Devenish, III et al. |
| 5,373,421 A | 12/1994 | Detsikas et al. |
| 5,383,051 A | 1/1995 | Delrosso et al. |
| 5,398,295 A | 3/1995 | Chang et al. |
| 5,398,820 A | 3/1995 | Kiss |
| 5,399,814 A | 3/1995 | Staber et al. |
| 5,401,193 A | 3/1995 | Lo Cicero et al. |
| 5,402,515 A | 3/1995 | Vidacovich et al. |
| 5,408,557 A | 4/1995 | Hsu |
| RE34,955 E | 5/1995 | Anton et al. |
| 5,412,751 A | 5/1995 | Siemon et al. |
| 5,416,837 A | 5/1995 | Cote et al. |
| 5,418,874 A | 5/1995 | Carlisle et al. |
| 5,420,956 A | 5/1995 | Grugel et al. |
| 5,420,958 A | 5/1995 | Henson et al. |
| 5,438,641 A | 8/1995 | Malacarne |
| 5,442,725 A | 8/1995 | Peng |
| 5,442,726 A | 8/1995 | Howard et al. |
| 5,443,232 A | 8/1995 | Kesinger et al. |
| 5,448,015 A | 9/1995 | Jamet et al. |
| 5,450,518 A | 9/1995 | Burek et al. |
| 5,458,019 A | 10/1995 | Trevino |
| 5,471,555 A | 11/1995 | Braga et al. |
| 5,479,505 A | 12/1995 | Butler et al. |
| 5,481,634 A | 1/1996 | Anderson et al. |
| 5,481,939 A | 1/1996 | Bernardini |
| 5,490,229 A | 2/1996 | Ghandeharizadeh et al. |
| 5,497,416 A | 3/1996 | Butler, III et al. |
| 5,497,444 A | 3/1996 | Wheeler |
| 5,511,144 A | 4/1996 | Hawkins et al. |
| 5,511,798 A | 4/1996 | Kawamoto et al. |
| 5,519,804 A | 5/1996 | Burek et al. |
| 5,542,015 A | 7/1996 | Hultermans |
| 5,546,495 A | 8/1996 | Bruckner et al. |
| 5,548,641 A | 8/1996 | Butler et al. |
| 5,553,183 A | 9/1996 | Bechamps |
| 5,553,186 A | 9/1996 | Allen |
| 5,572,617 A | 11/1996 | Bernhardt et al. |
| 5,575,680 A | 11/1996 | Suffi |
| 5,577,151 A | 11/1996 | Hoffer |
| 5,590,234 A | 12/1996 | Pulido |
| 5,595,507 A | 1/1997 | Braun et al. |
| 5,600,020 A | 2/1997 | Wehle et al. |
| 5,602,954 A | 2/1997 | Nolf et al. |
| 5,608,606 A | 3/1997 | Blaney |
| 5,613,030 A | 3/1997 | Hoffer et al. |
| 5,617,501 A | 4/1997 | Miller et al. |
| 5,638,474 A | 6/1997 | Lampert et al. |
| 5,640,476 A | 6/1997 | Womack et al. |
| 5,640,482 A | 6/1997 | Barry et al. |
| 5,647,043 A | 7/1997 | Anderson et al. |
| 5,647,045 A | 7/1997 | Robinson et al. |
| 5,650,334 A | 7/1997 | Zuk et al. |
| 5,668,911 A | 9/1997 | Debortoli |
| 5,671,273 A | 9/1997 | Lanquist |
| 5,689,605 A | 11/1997 | Cobb et al. |

| | | | | | | |
|---|---|---|---|---|---|---|
| 5,689,607 A | 11/1997 | Vincent et al. | | 6,181,861 B1 | 1/2001 | Wenski et al. |
| 5,694,511 A | 12/1997 | Pimpinella et al. | | 6,188,687 B1 | 2/2001 | Mussman et al. |
| 5,701,380 A | 12/1997 | Larson et al. | | 6,188,825 B1 | 2/2001 | Bandy et al. |
| 5,708,742 A | 1/1998 | Beun et al. | | 6,192,180 B1 | 2/2001 | Kim et al. |
| 5,708,751 A | 1/1998 | Mattei | | 6,201,920 B1 | 3/2001 | Noble et al. |
| 5,710,851 A | 1/1998 | Walter et al. | | 6,208,796 B1 | 3/2001 | Williams |
| 5,717,810 A | 2/1998 | Wheeler | | 6,212,324 B1 | 4/2001 | Lin et al. |
| 5,734,776 A | 3/1998 | Puetz | | 6,215,938 B1 | 4/2001 | Reitmeier et al. |
| 5,740,300 A | 4/1998 | Hodge | | 6,227,717 B1 | 5/2001 | Ott et al. |
| 5,742,982 A | 4/1998 | Dodd et al. | | 6,234,683 B1 | 5/2001 | Waldron et al. |
| 5,751,874 A | 5/1998 | Chudoba et al. | | 6,234,685 B1 | 5/2001 | Carlisle et al. |
| 5,751,882 A | 5/1998 | Daems et al. | | 6,236,795 B1 | 5/2001 | Rodgers |
| 5,758,003 A | 5/1998 | Wheeler et al. | | 6,240,229 B1 | 5/2001 | Roth |
| 5,758,004 A | 5/1998 | Alarcon et al. | | 6,243,522 B1 | 6/2001 | Allan et al. |
| 5,761,026 A | 6/1998 | Robinson et al. | | 6,245,998 B1 | 6/2001 | Curry et al. |
| 5,769,908 A | 6/1998 | Koppelman | | 6,263,141 B1 | 7/2001 | Smith |
| 5,774,612 A | 6/1998 | Belenkiy et al. | | 6,265,680 B1 | 7/2001 | Robertson |
| 5,778,122 A | 7/1998 | Giebel et al. | | 6,269,212 B1 | 7/2001 | Schiattone |
| 5,778,130 A | 7/1998 | Walters et al. | | 6,275,641 B1 | 8/2001 | Daoud |
| 5,781,686 A | 7/1998 | Robinson et al. | | 6,278,829 B1 | 8/2001 | BuAbbud et al. |
| 5,790,741 A | 8/1998 | Vincent et al. | | 6,278,831 B1 | 8/2001 | Henderson et al. |
| 5,793,920 A | 8/1998 | Wilkins et al. | | D448,005 S | 9/2001 | Klein, Jr. et al. |
| 5,793,921 A | 8/1998 | Wilkins et al. | | 6,292,614 B1 | 9/2001 | Smith et al. |
| 5,796,908 A | 8/1998 | Vicory | | 6,301,424 B1 | 10/2001 | Hwang |
| 5,823,646 A | 10/1998 | Arizpe et al. | | 6,307,997 B1 | 10/2001 | Walters et al. |
| 5,825,955 A | 10/1998 | Ernst et al. | | 6,318,824 B1 | 11/2001 | LaGrotta et al. |
| 5,825,961 A | 10/1998 | Wilkins et al. | | 6,321,017 B1 | 11/2001 | Janus et al. |
| 5,828,807 A | 10/1998 | Tucker et al. | | 6,322,279 B1 | 11/2001 | Yamamoto et al. |
| 5,832,162 A | 11/1998 | Sarbell | | 6,325,549 B1 | 12/2001 | Shevchuk |
| 5,835,657 A | 11/1998 | Suarez et al. | | RE37,489 E | 1/2002 | Anton et al. |
| 5,835,658 A | 11/1998 | Smith | | 6,343,313 B1 | 1/2002 | Salesky et al. |
| 5,862,290 A | 1/1999 | Burek et al. | | 6,347,888 B1 | 2/2002 | Puetz |
| 5,870,519 A | 2/1999 | Jenkins et al. | | 6,353,696 B1 | 3/2002 | Gordon et al. |
| 5,877,565 A | 3/1999 | Hollenbach et al. | | 6,353,697 B1 | 3/2002 | Daoud |
| 5,880,864 A | 3/1999 | Williams et al. | | 6,359,228 B1 | 3/2002 | Strause et al. |
| 5,881,200 A | 3/1999 | Burt | | 6,363,200 B1 | 3/2002 | Thompson et al. |
| 5,883,995 A | 3/1999 | Lu et al. | | 6,370,309 B1 | 4/2002 | Daoud |
| 5,884,003 A | 3/1999 | Cloud et al. | | 6,377,218 B1 | 4/2002 | Nelson et al. |
| 5,887,095 A | 3/1999 | Nagase et al. | | 6,379,052 B1 | 4/2002 | De Jong et al. |
| 5,887,106 A | 3/1999 | Cheeseman et al. | | 6,385,381 B1 | 5/2002 | Janus et al. |
| 5,892,877 A | 4/1999 | Meyerhoefer | | 6,389,214 B1 | 5/2002 | Smith et al. |
| 5,894,540 A | 4/1999 | Drewing | | 6,397,166 B1 | 5/2002 | Leung et al. |
| 5,901,220 A | 5/1999 | Garver et al. | | 6,411,767 B1 | 6/2002 | Burrous et al. |
| 5,903,693 A | 5/1999 | Brown | | 6,418,262 B1 | 7/2002 | Puetz et al. |
| 5,913,006 A | 6/1999 | Summach | | 6,424,781 B1 | 7/2002 | Puetz et al. |
| 5,914,976 A | 6/1999 | Jayaraman et al. | | 6,425,694 B1 | 7/2002 | Szilagyi et al. |
| 5,915,055 A | 6/1999 | Bennett et al. | | 6,427,045 B1 | 7/2002 | Matthes et al. |
| 5,923,804 A | 7/1999 | Rosson | | 6,431,762 B1 | 8/2002 | Taira et al. |
| 5,930,425 A | 7/1999 | Abel et al. | | 6,434,313 B1 | 8/2002 | Clapp, Jr. et al. |
| 5,933,557 A | 8/1999 | Ott | | 6,438,310 B1 | 8/2002 | Lance et al. |
| 5,945,633 A | 8/1999 | Ott et al. | | 6,452,925 B1 | 9/2002 | Sistanizadeh et al. |
| 5,946,440 A | 8/1999 | Puetz | | 6,456,773 B1 | 9/2002 | Keys |
| 5,949,946 A | 9/1999 | Debortoli et al. | | 6,464,402 B1 | 10/2002 | Andrews et al. |
| 5,956,439 A | 9/1999 | Pimpinella | | 6,466,724 B1 | 10/2002 | Glover et al. |
| 5,956,444 A | 9/1999 | Duda et al. | | 6,469,905 B1 | 10/2002 | Hwang |
| 5,966,492 A | 10/1999 | Bechamps et al. | | D466,087 S | 11/2002 | Cuny et al. |
| 5,969,294 A | 10/1999 | Eberle et al. | | 6,478,472 B1 | 11/2002 | Anderson et al. |
| 5,975,769 A | 11/1999 | Larson et al. | | 6,480,487 B1 | 11/2002 | Wegleitner et al. |
| 5,978,540 A | 11/1999 | Bechamps et al. | | 6,480,660 B1 | 11/2002 | Reitmeier et al. |
| 5,980,303 A | 11/1999 | Lee et al. | | 6,483,977 B2 | 11/2002 | Battey et al. |
| 5,993,071 A | 11/1999 | Hultermans | | 6,484,958 B1 | 11/2002 | Xue et al. |
| 5,995,700 A | 11/1999 | Burek et al. | | 6,496,640 B1 | 12/2002 | Harvey et al. |
| 5,999,393 A | 12/1999 | Brower | | 6,504,988 B1 | 1/2003 | Trebesch et al. |
| 6,001,831 A | 12/1999 | Papenfuhs et al. | | 6,507,980 B2 | 1/2003 | Bremicker |
| 6,009,224 A | 12/1999 | Allen | | 6,510,274 B1 | 1/2003 | Wu et al. |
| 6,009,225 A | 12/1999 | Ray et al. | | 6,532,332 B2 | 3/2003 | Solheid et al. |
| 6,011,831 A | 1/2000 | Nieves et al. | | 6,533,472 B1 | 3/2003 | Dinh et al. |
| 6,027,252 A | 2/2000 | Erdman et al. | | 6,535,397 B2 | 3/2003 | Clark et al. |
| 6,044,193 A | 3/2000 | Szentesi et al. | | 6,539,147 B1 | 3/2003 | Mahony |
| 6,058,235 A | 5/2000 | Hiramatsu et al. | | 6,539,160 B2 | 3/2003 | Battey et al. |
| 6,061,492 A | 5/2000 | Strause et al. | | 6,542,688 B1 | 4/2003 | Battey et al. |
| 6,078,661 A | 6/2000 | Arnett et al. | | 6,554,485 B1 | 4/2003 | Beatty et al. |
| 6,079,881 A | 6/2000 | Roth | | 6,560,334 B1 | 5/2003 | Mullaney et al. |
| 6,127,627 A | 10/2000 | Daoud | | 6,567,601 B2 | 5/2003 | Daoud et al. |
| 6,134,370 A | 10/2000 | Childers et al. | | 6,571,048 B1 | 5/2003 | Bechamps et al. |
| 6,149,313 A | 11/2000 | Giebel et al. | | 6,577,595 B1 | 6/2003 | Counterman |
| 6,149,315 A | 11/2000 | Stephenson | | 6,577,801 B2 | 6/2003 | Broderick et al. |
| 6,151,432 A | 11/2000 | Nakajima et al. | | 6,579,014 B2 | 6/2003 | Melton et al. |
| 6,160,946 A | 12/2000 | Thompson et al. | | 6,584,267 B1 | 6/2003 | Caveney et al. |

| | | | |
|---|---|---|---|
| 6,587,630 B2 | 7/2003 | Spence et al. | |
| 6,588,938 B1 | 7/2003 | Lampert et al. | |
| 6,591,051 B2 | 7/2003 | Solheid et al. | |
| 6,597,670 B1 | 7/2003 | Tweedy et al. | |
| 6,600,866 B2 | 7/2003 | Gatica et al. | |
| 6,612,515 B1 | 9/2003 | Tinucci et al. | |
| 6,614,978 B1 | 9/2003 | Caveney | |
| 6,614,980 B1 | 9/2003 | Mahony | |
| 6,621,975 B2 | 9/2003 | Laporte et al. | |
| 6,625,374 B2 | 9/2003 | Holman et al. | |
| 6,625,375 B1 | 9/2003 | Mahony | |
| 6,631,237 B2 | 10/2003 | Knudsen et al. | |
| 6,640,042 B2 | 10/2003 | Araki et al. | |
| RE38,311 E | 11/2003 | Wheeler | |
| 6,647,197 B1 | 11/2003 | Marrs et al. | |
| 6,648,520 B2 | 11/2003 | McDonald et al. | |
| 6,654,536 B2 | 11/2003 | Battey et al. | |
| 6,668,127 B1 | 12/2003 | Mahony | |
| 6,677,520 B1 | 1/2004 | Kim et al. | |
| 6,687,450 B1 | 2/2004 | Kempeneers et al. | |
| 6,710,366 B1 | 3/2004 | Lee et al. | |
| 6,715,619 B2 | 4/2004 | Kim et al. | |
| 6,719,149 B2 | 4/2004 | Tomino | |
| 6,741,784 B1 | 5/2004 | Guan | |
| 6,741,785 B2 | 5/2004 | Barthel et al. | |
| 6,748,154 B2 | 6/2004 | O'Leary et al. | |
| 6,748,155 B2 | 6/2004 | Kim et al. | |
| 6,758,600 B2 | 7/2004 | Del Grosso et al. | |
| 6,768,860 B2 | 7/2004 | Liberty | |
| 6,771,861 B2 | 8/2004 | Wagner et al. | |
| 6,778,525 B1 | 8/2004 | Baum et al. | |
| 6,778,752 B2 | 8/2004 | Laporte et al. | |
| 6,788,871 B2 | 9/2004 | Taylor | |
| 6,792,190 B2 | 9/2004 | Xin et al. | |
| 6,798,751 B1 | 9/2004 | Voit et al. | |
| 6,804,447 B2 | 10/2004 | Smith et al. | |
| 6,819,856 B2 | 11/2004 | Dagley et al. | |
| 6,819,857 B2 | 11/2004 | Douglas et al. | |
| 6,826,174 B1 | 11/2004 | Erekson et al. | |
| 6,839,428 B2 | 1/2005 | Brower et al. | |
| 6,839,438 B1 | 1/2005 | Riegelsberger et al. | |
| 6,840,815 B2 | 1/2005 | Musolf et al. | |
| 6,845,207 B2 | 1/2005 | Schray | |
| 6,848,862 B1 | 2/2005 | Schlig | |
| 6,850,685 B2 | 2/2005 | Tinucci et al. | |
| 6,853,637 B1 | 2/2005 | Norrell et al. | |
| 6,854,894 B1 | 2/2005 | Yunker et al. | |
| 6,856,334 B1 | 2/2005 | Fukui | |
| 6,865,331 B2 | 3/2005 | Mertesdorf | |
| 6,865,334 B2 | 3/2005 | Cooke et al. | |
| 6,866,541 B2 | 3/2005 | Barker et al. | |
| 6,868,216 B1 | 3/2005 | Gehrke | |
| 6,869,227 B2 | 3/2005 | Del Grosso et al. | |
| 6,870,734 B2 | 3/2005 | Mertesdorf et al. | |
| 6,870,997 B2 | 3/2005 | Cooke | |
| 6,879,545 B2 | 4/2005 | Cooke et al. | |
| 6,915,058 B2 | 7/2005 | Pons | |
| 6,920,273 B2 | 7/2005 | Knudsen | |
| 6,920,274 B2 | 7/2005 | Rapp et al. | |
| 6,925,241 B2 | 8/2005 | Bohle et al. | |
| 6,934,451 B2 | 8/2005 | Cooke | |
| 6,934,456 B2 | 8/2005 | Ferris et al. | |
| 6,937,807 B2 | 8/2005 | Franklin et al. | |
| 6,944,383 B1 | 9/2005 | Herzog et al. | |
| 6,944,389 B2 | 9/2005 | Giraud et al. | |
| 6,963,690 B1 | 11/2005 | Kassal et al. | |
| 6,968,107 B2 | 11/2005 | Belardi et al. | |
| 6,968,111 B2 | 11/2005 | Trebesch et al. | |
| 6,985,665 B2 | 1/2006 | Baechtle | |
| 6,993,237 B2 | 1/2006 | Cooke et al. | |
| 7,000,784 B2 | 2/2006 | Canty et al. | |
| 7,006,748 B2 | 2/2006 | Dagley et al. | |
| 7,007,296 B2 | 2/2006 | Rakib | |
| 7,027,695 B2 | 4/2006 | Cooke et al. | |
| 7,027,706 B2 | 4/2006 | Diaz et al. | |
| 7,031,588 B2 | 4/2006 | Cowley et al. | |
| 7,035,510 B2 | 4/2006 | Zimmel et al. | |
| 7,038,137 B2 | 5/2006 | Grubish et al. | |
| 7,054,513 B2 | 5/2006 | Herz et al. | |
| 7,066,748 B2 | 6/2006 | Bricaud et al. | |
| 7,068,907 B2 | 6/2006 | Schray | |
| 7,070,459 B2 | 7/2006 | Denovich et al. | |
| 7,079,744 B2 | 7/2006 | Douglas et al. | |
| 7,090,406 B2 | 8/2006 | Melton et al. | |
| 7,090,407 B2 | 8/2006 | Melton et al. | |
| 7,094,095 B1 | 8/2006 | Caveney | |
| 7,097,047 B2 | 8/2006 | Lee et al. | |
| 7,101,093 B2 | 9/2006 | Hsiao et al. | |
| 7,102,884 B2 | 9/2006 | Mertesdorf et al. | |
| 7,103,255 B2 | 9/2006 | Reagan et al. | |
| 7,110,654 B2 | 9/2006 | Dillat | |
| 7,111,990 B2 | 9/2006 | Melton et al. | |
| 7,113,679 B2 | 9/2006 | Melton et al. | |
| 7,113,686 B2 | 9/2006 | Bellekens et al. | |
| 7,113,687 B2 | 9/2006 | Womack et al. | |
| 7,116,883 B2 | 10/2006 | Kline et al. | |
| 7,118,281 B2 | 10/2006 | Chiu et al. | |
| 7,118,405 B2 | 10/2006 | Peng | |
| 7,120,347 B2 | 10/2006 | Blackwell, Jr. et al. | |
| 7,120,348 B2 | 10/2006 | Trebesch et al. | |
| 7,120,349 B2 | 10/2006 | Elliott | |
| 7,128,471 B2 | 10/2006 | Wilson | |
| 7,139,462 B1 | 11/2006 | Richtman | |
| 7,171,099 B2 | 1/2007 | Barnes et al. | |
| 7,171,121 B1 | 1/2007 | Skarica et al. | |
| 7,181,142 B1 | 2/2007 | Xu et al. | |
| 7,194,181 B2 | 3/2007 | Holmberg et al. | |
| 7,195,521 B2 | 3/2007 | Musolf et al. | |
| 7,200,314 B2 | 4/2007 | Womack et al. | |
| 7,200,316 B2 | 4/2007 | Giraud et al. | |
| 7,228,036 B2 | 6/2007 | Elkins, II et al. | |
| 7,231,125 B2 | 6/2007 | Douglas et al. | |
| 7,234,878 B2 | 6/2007 | Yamauchi et al. | |
| 7,236,677 B2 | 6/2007 | Escoto et al. | |
| 7,245,809 B1 | 7/2007 | Gniadek et al. | |
| 7,259,325 B2 | 8/2007 | Pincu et al. | |
| 7,266,283 B2 | 9/2007 | Kline et al. | |
| 7,270,485 B1 | 9/2007 | Robinson et al. | |
| 7,272,291 B2 | 9/2007 | Bayazit et al. | |
| 7,274,852 B1 | 9/2007 | Smrha et al. | |
| 7,289,731 B2 | 10/2007 | Thinguldstad | |
| 7,292,769 B2 | 11/2007 | Watanabe et al. | |
| 7,298,950 B2 | 11/2007 | Frohlich | |
| 7,300,308 B2 | 11/2007 | Laursen et al. | |
| 7,302,149 B2 | 11/2007 | Swam et al. | |
| 7,302,153 B2 | 11/2007 | Thom | |
| 7,302,154 B2 | 11/2007 | Trebesch et al. | |
| 7,308,184 B2 | 12/2007 | Barnes et al. | |
| 7,310,471 B2 | 12/2007 | Bayazit et al. | |
| 7,315,681 B2 | 1/2008 | Kewitsch | |
| 7,325,975 B2 | 2/2008 | Yamada et al. | |
| 7,330,625 B2 | 2/2008 | Barth | |
| 7,330,626 B2 | 2/2008 | Kowalczyk et al. | |
| 7,330,629 B2 | 2/2008 | Cooke et al. | |
| 7,340,145 B2 | 3/2008 | Allen | |
| 7,349,615 B2 | 3/2008 | Frazier et al. | |
| 7,373,071 B2 | 5/2008 | Douglas et al. | |
| 7,376,321 B2 | 5/2008 | Bolster et al. | |
| 7,376,323 B2 | 5/2008 | Zimmel | |
| 7,391,952 B1 | 6/2008 | Ugolini et al. | |
| 7,397,996 B2 | 7/2008 | Herzog et al. | |
| 7,400,813 B2 | 7/2008 | Zimmel | |
| 7,409,137 B2 | 8/2008 | Barnes | |
| 7,417,188 B2 | 8/2008 | McNutt et al. | |
| 7,418,182 B2 | 8/2008 | Krampotich | |
| 7,418,184 B1 | 8/2008 | Gonzales et al. | |
| 7,421,182 B2 | 9/2008 | Bayazit et al. | |
| 7,428,363 B2 | 9/2008 | Leon et al. | |
| 7,437,049 B2 | 10/2008 | Krampotich | |
| 7,439,453 B2 | 10/2008 | Murano et al. | |
| 7,454,113 B2 | 11/2008 | Barnes | |
| 7,460,757 B2 | 12/2008 | Hoehne et al. | |
| 7,460,758 B2 | 12/2008 | Xin | |
| 7,461,981 B2 | 12/2008 | Yow, Jr. et al. | |
| 7,462,779 B2 | 12/2008 | Caveney et al. | |
| 7,463,810 B2 | 12/2008 | Bayazit et al. | |
| 7,463,811 B2 | 12/2008 | Trebesch et al. | |
| 7,469,090 B2 | 12/2008 | Ferris et al. | |

| Patent/Pub No. | Date | Name |
|---|---|---|
| 7,471,867 B2 | 12/2008 | Vogel et al. |
| 7,474,828 B2 | 1/2009 | Leon et al. |
| 7,477,824 B2 | 1/2009 | Reagan et al. |
| 7,477,826 B2 | 1/2009 | Mullaney et al. |
| 7,480,438 B2 | 1/2009 | Douglas et al. |
| 7,488,205 B2 | 2/2009 | Spisany et al. |
| 7,493,002 B2 | 2/2009 | Coburn et al. |
| 7,496,269 B1 | 2/2009 | Lee |
| 7,499,622 B2 | 3/2009 | Castonguay et al. |
| 7,499,623 B2 | 3/2009 | Barnes et al. |
| 7,509,015 B2 | 3/2009 | Murano |
| 7,509,016 B2 | 3/2009 | Smith et al. |
| 7,522,804 B2 | 4/2009 | Araki et al. |
| 7,526,171 B2 | 4/2009 | Caveney et al. |
| 7,526,172 B2 | 4/2009 | Gniadek et al. |
| 7,526,174 B2 | 4/2009 | Leon et al. |
| 7,529,458 B2 | 5/2009 | Spisany et al. |
| 7,534,958 B2 | 5/2009 | McNutt et al. |
| 7,536,075 B2 | 5/2009 | Zimmel |
| 7,542,645 B1 * | 6/2009 | Hua et al. .................. 385/125 |
| 7,555,193 B2 | 6/2009 | Rapp et al. |
| 7,558,458 B2 | 7/2009 | Gronvall et al. |
| 7,565,051 B2 | 7/2009 | Vongseng |
| 7,567,744 B2 | 7/2009 | Krampotich et al. |
| 7,570,860 B2 | 8/2009 | Smrha et al. |
| 7,570,861 B2 * | 8/2009 | Smrha et al. .................. 385/135 |
| 7,577,331 B2 | 8/2009 | Laurisch et al. |
| 7,603,020 B1 | 10/2009 | Wakileh et al. |
| 7,607,938 B2 | 10/2009 | Clark et al. |
| 7,609,967 B2 | 10/2009 | Hochbaum et al. |
| 7,613,377 B2 | 11/2009 | Gonzales et al. |
| 7,620,287 B2 | 11/2009 | Appenzeller et al. |
| 7,641,398 B2 | 1/2010 | O'Riorden et al. |
| 7,668,430 B2 | 2/2010 | McClellan et al. |
| 7,668,433 B2 | 2/2010 | Bayazit et al. |
| 7,672,561 B1 | 3/2010 | Keith et al. |
| 7,676,135 B2 | 3/2010 | Chen |
| 7,697,811 B2 | 4/2010 | Murano et al. |
| 7,715,683 B2 | 5/2010 | Kowalczyk et al. |
| 7,740,409 B2 | 6/2010 | Bolton et al. |
| 7,743,495 B2 | 6/2010 | Mori et al. |
| 7,756,382 B2 * | 7/2010 | Saravanos et al. ............. 385/137 |
| 7,760,984 B2 | 7/2010 | Solheid et al. |
| 7,764,858 B2 | 7/2010 | Bayazit et al. |
| 7,809,235 B2 | 10/2010 | Reagan et al. |
| 7,822,310 B2 | 10/2010 | Castonguay et al. |
| 7,850,372 B2 | 12/2010 | Nishimura et al. |
| 7,853,112 B2 | 12/2010 | Zimmel et al. |
| 7,856,166 B2 | 12/2010 | Biribuze et al. |
| 7,914,332 B2 | 3/2011 | Song et al. |
| 7,945,135 B2 * | 5/2011 | Cooke et al. .................. 385/135 |
| 7,945,136 B2 | 5/2011 | Cooke et al. |
| 7,970,250 B2 | 6/2011 | Morris |
| 8,014,171 B2 | 9/2011 | Kelly et al. |
| 8,014,646 B2 | 9/2011 | Keith et al. |
| 8,020,813 B1 | 9/2011 | Clark et al. |
| 8,107,785 B2 | 1/2012 | Berglund et al. |
| 2001/0029125 A1 | 10/2001 | Morita et al. |
| 2002/0010818 A1 | 1/2002 | Wei et al. |
| 2002/0012353 A1 | 1/2002 | Gerszberg et al. |
| 2002/0034290 A1 | 3/2002 | Pershan |
| 2002/0037139 A1 | 3/2002 | Asao et al. |
| 2002/0064364 A1 | 5/2002 | Battey et al. |
| 2002/0131730 A1 | 9/2002 | Keeble et al. |
| 2002/0136519 A1 | 9/2002 | Tinucci et al. |
| 2002/0141724 A1 | 10/2002 | Ogawa et al. |
| 2002/0150372 A1 | 10/2002 | Schray |
| 2002/0172467 A1 | 11/2002 | Anderson et al. |
| 2002/0181918 A1 | 12/2002 | Spence et al. |
| 2002/0181922 A1 | 12/2002 | Xin et al. |
| 2002/0194596 A1 | 12/2002 | Srivastava |
| 2003/0007743 A1 | 1/2003 | Asada |
| 2003/0007767 A1 | 1/2003 | Douglas et al. |
| 2003/0066998 A1 | 4/2003 | Lee |
| 2003/0086675 A1 | 5/2003 | Wu et al. |
| 2003/0095753 A1 | 5/2003 | Wada et al. |
| 2003/0147604 A1 | 8/2003 | Tapia et al. |
| 2003/0174996 A1 | 9/2003 | Henschel et al. |
| 2003/0180012 A1 | 9/2003 | Deane et al. |
| 2003/0183413 A1 | 10/2003 | Kato |
| 2003/0199201 A1 | 10/2003 | Mullaney et al. |
| 2003/0210882 A1 | 11/2003 | Barthel et al. |
| 2003/0223723 A1 | 12/2003 | Massey et al. |
| 2003/0235387 A1 | 12/2003 | Dufour |
| 2004/0013389 A1 | 1/2004 | Taylor |
| 2004/0013390 A1 | 1/2004 | Kim et al. |
| 2004/0074852 A1 | 4/2004 | Knudsen et al. |
| 2004/0086238 A1 | 5/2004 | Finona et al. |
| 2004/0086252 A1 | 5/2004 | Smith et al. |
| 2004/0147159 A1 | 7/2004 | Urban et al. |
| 2004/0151465 A1 | 8/2004 | Krampotich et al. |
| 2004/0175090 A1 | 9/2004 | Vastmans et al. |
| 2004/0192115 A1 | 9/2004 | Bugg |
| 2004/0208459 A1 | 10/2004 | Mizue et al. |
| 2004/0228598 A1 | 11/2004 | Allen et al. |
| 2004/0240882 A1 | 12/2004 | Lipski et al. |
| 2004/0264873 A1 | 12/2004 | Smith et al. |
| 2005/0002633 A1 | 1/2005 | Solheid et al. |
| 2005/0008131 A1 | 1/2005 | Cook |
| 2005/0036749 A1 | 2/2005 | Vogel et al. |
| 2005/0074990 A1 | 4/2005 | Shearman et al. |
| 2005/0076149 A1 | 4/2005 | McKown et al. |
| 2005/0083959 A1 | 4/2005 | Binder |
| 2005/0107086 A1 | 5/2005 | Tell et al. |
| 2005/0111809 A1 | 5/2005 | Giraud et al. |
| 2005/0123261 A1 | 6/2005 | Bellekens et al. |
| 2005/0129379 A1 | 6/2005 | Reagan et al. |
| 2005/0175293 A1 | 8/2005 | Byers et al. |
| 2005/0201073 A1 | 9/2005 | Pincu et al. |
| 2005/0232566 A1 | 10/2005 | Rapp et al. |
| 2005/0233647 A1 | 10/2005 | Denovich et al. |
| 2005/0254757 A1 | 11/2005 | Ferretti, III et al. |
| 2005/0281526 A1 | 12/2005 | Vongseng et al. |
| 2006/0018448 A1 | 1/2006 | Stevens et al. |
| 2006/0018622 A1 | 1/2006 | Caveney |
| 2006/0039290 A1 | 2/2006 | Roden et al. |
| 2006/0044774 A1 | 3/2006 | Vasavda et al. |
| 2006/0072606 A1 | 4/2006 | Posthuma |
| 2006/0077968 A1 | 4/2006 | Pitsoulakis et al. |
| 2006/0093303 A1 | 5/2006 | Reagan et al. |
| 2006/0110118 A1 | 5/2006 | Escoto et al. |
| 2006/0147172 A1 | 7/2006 | Luther et al. |
| 2006/0153517 A1 | 7/2006 | Reagan et al. |
| 2006/0160377 A1 | 7/2006 | Huang |
| 2006/0165365 A1 | 7/2006 | Feustel et al. |
| 2006/0165366 A1 | 7/2006 | Feustel et al. |
| 2006/0191700 A1 | 8/2006 | Herzog et al. |
| 2006/0193590 A1 | 8/2006 | Puetz et al. |
| 2006/0193591 A1 | 8/2006 | Rapp et al. |
| 2006/0198098 A1 | 9/2006 | Clark et al. |
| 2006/0215980 A1 | 9/2006 | Bayazit et al. |
| 2006/0269194 A1 | 11/2006 | Luther et al. |
| 2006/0269206 A1 | 11/2006 | Zimmel |
| 2006/0269208 A1 | 11/2006 | Allen et al. |
| 2006/0275008 A1 | 12/2006 | Xin |
| 2006/0275009 A1 | 12/2006 | Ellison et al. |
| 2006/0285812 A1 | 12/2006 | Ferris et al. |
| 2007/0003204 A1 | 1/2007 | Makrides-Saravanos et al. |
| 2007/0025070 A1 | 2/2007 | Jiang et al. |
| 2007/0031099 A1 | 2/2007 | Herzog et al. |
| 2007/0033629 A1 | 2/2007 | McGranahan et al. |
| 2007/0047894 A1 | 3/2007 | Holmberg et al. |
| 2007/0104447 A1 | 5/2007 | Allen |
| 2007/0127201 A1 | 6/2007 | Mertesdorf et al. |
| 2007/0131628 A1 | 6/2007 | Mimlitch, III et al. |
| 2007/0196071 A1 | 8/2007 | Laursen et al. |
| 2007/0221793 A1 | 9/2007 | Kusuda et al. |
| 2007/0237484 A1 | 10/2007 | Reagan et al. |
| 2007/0274718 A1 | 11/2007 | Bridges et al. |
| 2008/0011514 A1 | 1/2008 | Zheng et al. |
| 2008/0025683 A1 | 1/2008 | Murano |
| 2008/0031585 A1 | 2/2008 | Solheid et al. |
| 2008/0063350 A1 | 3/2008 | Trebesch et al. |
| 2008/0068788 A1 | 3/2008 | Ozawa et al. |
| 2008/0069511 A1 | 3/2008 | Blackwell, Jr. et al. |
| 2008/0069512 A1 | 3/2008 | Barnes et al. |
| 2008/0080826 A1 | 4/2008 | Leon et al. |
| 2008/0080827 A1 | 4/2008 | Leon et al. |

| | | | | | | |
|---|---|---|---|---|---|---|
| 2008/0080828 | A1 | 4/2008 | Leon et al. | 2010/0142544 A1 | 6/2010 | Chapel et al. |
| 2008/0085094 | A1 | 4/2008 | Krampotich | 2010/0142910 A1 | 6/2010 | Hill et al. |
| 2008/0089656 | A1 | 4/2008 | Wagner et al. | 2010/0150518 A1 | 6/2010 | Leon et al. |
| 2008/0095541 | A1 | 4/2008 | Dallesasse | 2010/0158467 A1 | 6/2010 | Hou et al. |
| 2008/0100440 | A1 | 5/2008 | Downie et al. | 2010/0166377 A1 | 7/2010 | Nair et al. |
| 2008/0106871 | A1 | 5/2008 | James | 2010/0178022 A1 | 7/2010 | Schroeder et al. |
| 2008/0118207 | A1 | 5/2008 | Yamamoto et al. | 2010/0202745 A1 | 8/2010 | Sokolowski et al. |
| 2008/0121423 | A1 | 5/2008 | Vogel et al. | 2010/0220967 A1 | 9/2010 | Cooke et al. |
| 2008/0124039 | A1 | 5/2008 | Gniadek et al. | 2010/0278499 A1 | 11/2010 | Mures et al. |
| 2008/0131068 | A1 | 6/2008 | Mertesdorf et al. | 2010/0296790 A1* | 11/2010 | Cooke et al. .................. 385/135 |
| 2008/0145013 | A1 | 6/2008 | Escoto et al. | 2010/0310225 A1 | 12/2010 | Anderson et al. |
| 2008/0152294 | A1 | 6/2008 | Hirano et al. | 2010/0316334 A1 | 12/2010 | Kewitsch |
| 2008/0166094 | A1 | 7/2008 | Bookbinder et al. | 2010/0322582 A1 | 12/2010 | Cooke et al. |
| 2008/0166131 | A1 | 7/2008 | Hudgins et al. | 2010/0322583 A1 | 12/2010 | Cooke et al. |
| 2008/0175550 | A1 | 7/2008 | Coburn et al. | 2011/0073730 A1 | 3/2011 | Kitchen |
| 2008/0175551 | A1 | 7/2008 | Smrha et al. | 2011/0085774 A1 | 4/2011 | Murphy et al. |
| 2008/0175552 | A1* | 7/2008 | Smrha et al. .................. 385/135 | 2011/0085776 A1 | 4/2011 | Biribuze et al. |
| 2008/0193091 | A1 | 8/2008 | Herbst | 2011/0097053 A1 | 4/2011 | Smith et al. |
| 2008/0205823 | A1 | 8/2008 | Luther et al. | 2011/0097977 A1 | 4/2011 | Bubnick et al. |
| 2008/0205844 | A1 | 8/2008 | Castonguay et al. | 2011/0280537 A1 | 11/2011 | Cowen et al. |
| 2008/0212928 | A1 | 9/2008 | Kowalczyk et al. | 2012/0051707 A1 | 3/2012 | Barnes et al. |
| 2008/0219632 | A1 | 9/2008 | Smith et al. | | | |
| 2008/0219634 | A1 | 9/2008 | Rapp et al. | FOREIGN PATENT DOCUMENTS | | |
| 2008/0236858 | A1 | 10/2008 | Quijano | CH | 688705 A5 | 1/1998 |
| 2008/0247723 | A1 | 10/2008 | Herzog et al. | DE | 8711970 U1 | 10/1987 |
| 2008/0267573 | A1 | 10/2008 | Douglas et al. | DE | 3726718 A1 | 2/1989 |
| 2008/0285934 | A1 | 11/2008 | Standish et al. | DE | 3726719 A1 | 2/1989 |
| 2008/0292261 | A1 | 11/2008 | Kowalczyk et al. | DE | 4030301 A1 | 3/1992 |
| 2008/0298763 | A1 | 12/2008 | Appenzeller et al. | DE | 4231181 C1 | 8/1993 |
| 2008/0304803 | A1 | 12/2008 | Krampotich et al. | DE | 10338848 A1 | 3/2005 |
| 2008/0310810 | A1 | 12/2008 | Gallagher | DE | 202005009932 U1 | 11/2005 |
| 2009/0010607 | A1 | 1/2009 | Elisson et al. | EP | 0250900 A2 | 1/1988 |
| 2009/0016685 | A1 | 1/2009 | Hudgins et al. | EP | 0408266 A2 | 1/1991 |
| 2009/0022470 | A1 | 1/2009 | Krampotich | EP | 0474091 A1 | 8/1991 |
| 2009/0060439 | A1 | 3/2009 | Cox et al. | EP | 0468671 A1 | 1/1992 |
| 2009/0060440 | A1 | 3/2009 | Wright et al. | EP | 0490698 A1 | 6/1992 |
| 2009/0067800 | A1 | 3/2009 | Vazquez et al. | EP | 0529830 A1 | 3/1993 |
| 2009/0097813 | A1 | 4/2009 | Hill | EP | 0544004 A1 | 6/1993 |
| 2009/0136194 | A1 | 5/2009 | Barnes | EP | 0547778 A1 | 6/1993 |
| 2009/0136196 | A1 | 5/2009 | Trebesch et al. | EP | 0581527 A1 | 2/1994 |
| 2009/0148117 | A1 | 6/2009 | Laurisch | EP | 0620462 A1 | 10/1994 |
| 2009/0169163 | A1 | 7/2009 | Abbott, III et al. | EP | 0693699 A1 | 1/1996 |
| 2009/0175588 | A1 | 7/2009 | Brandt et al. | EP | 0720322 A2 | 7/1996 |
| 2009/0180749 | A1 | 7/2009 | Douglas et al. | EP | 0940700 A2 | 9/1999 |
| 2009/0185782 | A1 | 7/2009 | Parikh et al. | EP | 0949522 A2 | 10/1999 |
| 2009/0191891 | A1 | 7/2009 | Ma et al. | EP | 1041417 A2 | 10/2000 |
| 2009/0194647 | A1 | 8/2009 | Keith | EP | 1056177 A1 | 11/2000 |
| 2009/0196563 | A1 | 8/2009 | Mullsteff et al. | EP | 1065542 A1 | 1/2001 |
| 2009/0202214 | A1 | 8/2009 | Holmberg et al. | EP | 1203974 A2 | 5/2002 |
| 2009/0207577 | A1 | 8/2009 | Fransen et al. | EP | 1289319 A2 | 3/2003 |
| 2009/0208178 | A1 | 8/2009 | Kowalczyk et al. | EP | 1316829 A2 | 6/2003 |
| 2009/0208210 | A1 | 8/2009 | Trojer et al. | EP | 1777563 A1 | 4/2007 |
| 2009/0214171 | A1 | 8/2009 | Coburn et al. | FR | 2378378 A1 | 8/1978 |
| 2009/0220200 | A1 | 9/2009 | Wong et al. | GB | 2241591 A | 9/1991 |
| 2009/0220204 | A1 | 9/2009 | Ruiz | GB | 2277812 A | 11/1994 |
| 2009/0226142 | A1 | 9/2009 | Barnes et al. | JP | 3172806 A | 7/1991 |
| 2009/0238531 | A1 | 9/2009 | Holmberg et al. | JP | 5045541 A | 2/1993 |
| 2009/0245743 | A1 | 10/2009 | Cote et al. | JP | 06018749 A | 1/1994 |
| 2009/0252472 | A1 | 10/2009 | Solheid et al. | JP | 6018749 A | 1/1994 |
| 2009/0257726 | A1 | 10/2009 | Redmann et al. | JP | 7308011 A | 11/1995 |
| 2009/0257727 | A1 | 10/2009 | Laurisch et al. | JP | 8007308 A | 1/1996 |
| 2009/0263122 | A1 | 10/2009 | Helkey et al. | JP | 8248235 A | 9/1996 |
| 2009/0269018 | A1 | 10/2009 | Frohlich et al. | JP | 8248237 A | 9/1996 |
| 2009/0274429 | A1 | 11/2009 | Krampotich et al. | JP | 3487946 A | 10/1996 |
| 2009/0274430 | A1 | 11/2009 | Krampotich et al. | JP | 8254620 A | 10/1996 |
| 2009/0290842 | A1 | 11/2009 | Bran de Leon et al. | JP | 3279474 A | 10/1997 |
| 2009/0297111 | A1 | 12/2009 | Reagan et al. | JP | 9258033 A | 10/1997 |
| 2009/0304342 | A1 | 12/2009 | Adomeit et al. | JP | 9258055 A | 10/1997 |
| 2009/0324189 | A1 | 12/2009 | Hill et al. | JP | 2771870 B2 | 7/1998 |
| 2010/0054681 | A1 | 3/2010 | Biribuze et al. | JP | 3448448 A | 8/1998 |
| 2010/0054682 | A1 | 3/2010 | Cooke et al. | JP | 10227919 A | 8/1998 |
| 2010/0054685 | A1 | 3/2010 | Cooke et al. | JP | 3478944 A | 12/1998 |
| 2010/0061691 | A1 | 3/2010 | Murano et al. | JP | 10339817 A | 12/1998 |
| 2010/0061693 | A1 | 3/2010 | Bran de Leon et al. | JP | 11023858 A | 1/1999 |
| 2010/0074587 | A1 | 3/2010 | Loeffelholz et al. | JP | 2000098138 A | 4/2000 |
| 2010/0080517 | A1 | 4/2010 | Cline et al. | JP | 2000098139 A | 4/2000 |
| 2010/0086274 | A1 | 4/2010 | Keith | JP | 2000241631 A | 9/2000 |
| 2010/0111483 | A1 | 5/2010 | Reinhardt et al. | JP | 2001004849 A | 1/2001 |
| 2010/0119201 | A1 | 5/2010 | Smrha et al. | JP | 3160322 B2 | 4/2001 |

| | | | |
|---|---|---|---|
| JP | 2001133636 A | 5/2001 |
| JP | 3173962 B2 | 6/2001 |
| JP | 3176906 B2 | 6/2001 |
| JP | 2001154030 A | 6/2001 |
| JP | 2001159714 A | 6/2001 |
| JP | 2002022974 A | 1/2002 |
| JP | 2002169035 A | 6/2002 |
| JP | 3312893 B2 | 8/2002 |
| JP | 200133636 A | 8/2002 |
| JP | 2002305389 A | 10/2002 |
| JP | 3344701 B2 | 11/2002 |
| JP | 2003029054 A | 1/2003 |
| JP | 3403573 B2 | 5/2003 |
| JP | 2003169026 A | 6/2003 |
| JP | 2003215353 A | 7/2003 |
| JP | 2003344701 A | 12/2003 |
| JP | 3516765 B2 | 4/2004 |
| JP | 2004144808 A | 5/2004 |
| JP | 2004514931 A | 5/2004 |
| JP | 3542939 B2 | 7/2004 |
| JP | 2004246147 A | 9/2004 |
| JP | 2004361652 A | 12/2004 |
| JP | 2004361893 A | 12/2004 |
| JP | 3107704 U | 2/2005 |
| JP | 2005055748 A | 3/2005 |
| JP | 2005062569 A | 3/2005 |
| JP | 2005084241 A | 3/2005 |
| JP | 2005148327 A | 6/2005 |
| JP | 3763645 | 4/2006 |
| JP | 3763645 B2 | 4/2006 |
| JP | 3778021 B2 | 5/2006 |
| JP | 2006126513 A | 5/2006 |
| JP | 2006126516 A | 5/2006 |
| JP | 3794540 B2 | 7/2006 |
| JP | 2006227041 A1 | 8/2006 |
| JP | 3833638 B2 | 10/2006 |
| JP | 3841344 B2 | 11/2006 |
| JP | 3847533 B2 | 11/2006 |
| JP | 200747336 A | 2/2007 |
| JP | 3896035 B2 | 3/2007 |
| JP | 2007067458 A1 | 3/2007 |
| JP | 3934052 B2 | 6/2007 |
| JP | 3964191 B2 | 8/2007 |
| JP | 3989853 B2 | 10/2007 |
| JP | 4026244 B2 | 12/2007 |
| JP | 4029494 B2 | 1/2008 |
| JP | 4065223 B2 | 3/2008 |
| JP | 4093475 B2 | 6/2008 |
| JP | 4105696 B2 | 6/2008 |
| JP | 4112437 B2 | 7/2008 |
| JP | 4118862 B2 | 7/2008 |
| JP | 2008176118 A1 | 7/2008 |
| JP | 2008180817 A1 | 8/2008 |
| JP | 4184329 B2 | 11/2008 |
| JP | 2008542822 T | 11/2008 |
| JP | 2009503582 T | 1/2009 |
| WO | 9105281 A1 | 4/1991 |
| WO | 9326070 A1 | 12/1993 |
| WO | 9520175 A1 | 7/1995 |
| WO | 9636896 A1 | 11/1996 |
| WO | 9712268 A1 | 4/1997 |
| WO | 9744605 A1 | 11/1997 |
| WO | 9825416 A1 | 6/1998 |
| WO | 0005611 A2 | 2/2000 |
| WO | 0127660 A2 | 4/2001 |
| WO | 0242818 A1 | 5/2002 |
| WO | 03009527 A2 | 1/2003 |
| WO | 2004052066 A1 | 6/2004 |
| WO | 2007050515 A1 | 5/2007 |
| WO | 2007079074 A2 | 7/2007 |
| WO | 2007149215 A2 | 12/2007 |
| WO | 2008063054 A2 | 5/2008 |
| WO | 2009120280 A2 | 10/2009 |

OTHER PUBLICATIONS

Non-final Office Action for U.S. Appl. No. 12/732,487 mailed Sep. 19, 2012, 22 pages.
Final Office Action for U.S. Appl. No. 12/394,114 mailed Oct. 25, 2012, 8 pages.
Non-final Office Action for U.S. Appl. No. 12/915,682 mailed Oct. 24, 2012, 8 pages.
Non-final Office Action for U.S. Appl. No. 12/818,986 mailed Feb. 3, 2012, 12 pages.
Final Office Action for U.S. Appl. No. 12/818,986 mailed Oct. 18, 2012, 13 pages.
Non-final Office Action for U.S. Appl. No. 12/952,960 mailed Oct. 4, 2012, 11 pages.
Non-final Office Action for U.S. Appl. No. 12/953,134 mailed Sep. 25, 2012, 8 pages.
Non-final Office Action for U.S. Appl. No. 12/953,039 mailed Jan. 11, 2013, 6 pages.
Non-final Office Action for U.S. Appl. No. 12/952,912 mailed Dec. 28, 2012, 9 pages.
Non-final Office Action for U.S. Appl. No. 12/953,118 mailed Jan. 7, 2013, 9 pages.
Non-final Office Action for U.S. Appl. No. 12/953,536 mailed Jan. 2, 2013, 20 pages.
Non-final Office Action for U.S. Appl. No. 12/707,889 mailed Jan. 2, 2013, 7 pages.
European Search Report for patent application 10790017.17 mailed Nov. 8, 2012, 7 pages.
Examination Report for European patent application 09789090.9-2216 mailed Aug. 29, 2011, 4 pages.
Examination Report for European patent application 09789090.9-2216 mailed Mar. 30, 2012, 6 pages.
Written Opinion of the International Searching Authority for International patent application PCT/US2009004548, mailed Apr. 5, 2011, 6 pages.
European Search Report for European patent application 09789090.9-2217 mailed Jan. 24, 2013, 5 pages.
Non-final Office Action for U.S. Appl. No. 12/946,139 mailed Jul. 26, 2012, 12 pages.
Final Office Action for U.S. Appl. No. 12/946,139 mailed Feb. 15, 2013, 17 pages.
Non-final Office Action for U.S. Appl. No. 12/751,884 mailed Feb. 15, 2013, 5 pages.
Non-final Office Action for U.S. Appl. No. 12/394,114 mailed Feb. 27, 2013, 8 pages.
Non-final Office Action for U.S. Appl. No. 12/819,065 mailed Mar. 4, 2013, 7 pages.
Final Office Action for U.S. Appl. No. 12/952,960 mailed Mar. 7, 2013, 13 pages.
Notice of Allowance for U.S. Appl. No. 12/732,487 mailed Mar. 19, 2013, 11 pages.
Non-final Office Action for U.S. Appl. No. 12/953,134 mailed Mar. 21, 2013, 9 pages.
Final Office Action for U.S. Appl. No. 12/641,617 mailed May 10, 2013, 21 pages.
Notice of Allowance for U.S. Appl. No. 13/090,621 mailed Apr. 22, 2013, 8 pages.
Final Office Action for U.S. Appl. No. 12/953,039 mailed May 1, 2013, 8 pages.
Final Office Action for U.S. Appl. No. 12/953,118 mailed May 3, 2013, 11 pages.
Final Office Action for U.S. Appl. No. 12/915,682 mailed Apr. 18, 2013, 9 pages.
Advisory Action for U.S. Appl. No. 12/952,960 mailed May 15, 2013, 2 pages.
Non-final Office Action for U.S. Appl. No. 12/952,960 mailed Jun. 20, 2013, 13 pages.
Non-final Office Action for U.S. Appl. No. 12/953,536 mailed Jun. 6, 2013, 21 pages.
Non-final Office Action for U.S. Appl. No. 11/820,300 mailed Apr. 25, 2012, 10 pages.
Final Office Action for U.S. Appl. No. 12/871,052 mailed Jul. 1, 2013, 12 pages.
Non-final Office Action for U.S. Appl. No. 12/940,699 mailed Jun. 26, 2013, 9 pages.
Notice of Allowance for U.S. Appl. No. 13/090,621 mailed Jun. 25, 2013, 8 pages.

Annex to Form PCT/ISA/2006, Communication Relating to the Results of the Partial International Search, for PCT/US2009/004549 mailed Feb. 10, 2010, 2 pages.
Annex to Form PCT/ISA/206, Communication Relating to the Results of the Partial International Search, for PCT/US2009/004548 mailed Jan. 19, 2010, 2 pages.
Corning Cable Systems, "Corning Cable Systems Products for BellSouth High Density Shelves," Jun. 2000, 2 pages.
Corning Cable Systems, "Corning Cable Systems Quick Reference Guide for Verizon FTTP FDH Products," Jun. 2005, 4 pages.
Conner, M. "Passive Optical Design for RFOG and Beyond," Braodband Properties, Apr. 2009, pp. 78-81.
Corning Evolant, "Eclipse Hardware Family," Nov. 2009, 1 page.
Corning Evolant, "Enhanced Management Frame," Dec. 2009, 1 page.
Corning Evolant, "Enhanced Management Frame (EMF)," Specification Sheet, Nov. 2009, 24 pages.
Corning Cable Systems, "Evolant Solutions for Evolving Networks: Fiber Optic Hardware," Oct. 2002, 2 pages.
Corning Cable Systems, "Fiber Optic Hardware with Factory-Installed Pigtails: Features and Benefits," Nov. 2010, 12 pages.
Corning Cable Systems, "FiberManager System 1- and 3-Position Compact Shelves," Jan. 2003, 4 pages.
Corning Cable Systems, "FiberManager System Frame and Components," Jan. 2003, 12 pages.
Corning Cable Systems, "High Density Frame," Jul. 2001, 2 pages.
Corning Cable Systems, "High Density Frame (HDF) Connector-Splice Shelves and Housings," May 2003, 4 pages.
International Search Report for PCT/US10/35529 mailed Jul. 23, 2010, 2 pages.
International Search Report for PCT/US10/35563 mailed Jul. 23, 2012, 1 page.
International Search Report for PCT/US2008/002514 mailed Aug. 8, 2008, 2 pages.
International Search Report for PCT/US2008/010317 mailed Mar. 4, 2008, 2 pages.
International Search Report for PCT/US2009/001692 mailed Nov. 24, 2009, 5 pages.
International Search Report for PCT/US2010/024888 mailed Jun. 23, 2010, 5 pages.
International Search Report for PCT/US2010/027402 mailed Jun. 16, 2010, 2 pages.
Corning Cable Systems, "MTX Frames and Accessories," Feb. 2006, 4 pages.
Panduit, "Lock-in LC Duplex Clip," Accessed Mar. 22, 2012, 1 page.
International Search Report for PCT/US06/49351 mailed Apr. 25, 2008, 1 page.
International Search Report for PCT/US09/57069 mailed Mar. 24, 2010, 2 pages.
International Search Report for PCT/US2009/057244 mailed Nov. 9, 2009 3 pages.
International Search Report for PCTUS2009004548 mailed Mar. 19, 2010, 5 pages.
International Search Report for PCTUS2009004549 mailed Apr. 20, 2010, 6 pages.
Siecor, "Single Shelf HDF with Slack Storage and Heat Shield (HH1-CSH-1238-1V-BS)," Jan. 1998, 12 pages.
Corning Cable Systems, "Mass Termination Xchange (MTX) Frame System Equipment Office Planning and Application Guide," SRP003-664, Issue 1, Mar. 2005, 57 pages.
Corning Cable Systems, "Mass Termination Xchange (MTX) Equipment Patch Cord Interbay Vertical Channel," SRP003-684, Issue 1, Mar. 2005, 8 pages.
Corning Cable Systems, "High Density Frame (HDF) Installation," SRP003-355, Issue 4, Sep. 2002, 18 pages.
Written Opinion for PCT/US2010/023901 mailed Aug. 25, 2011, 8 pages.
Advisory Action for U.S. Appl. No. 12/221,117 mailed Aug. 24, 2011, 3 pages.
Examiner's Answer to Appeal Brief for U.S. Appl. No. 12/221,117 mailed Mar. 29, 2012, 16 pages.
Final Office Action for U.S. Appl. No. 12/221,117 mailed Feb. 19, 2010, 7 pages.
Final Office Action for U.S. Appl. No. 12/221,117 mailed Jun. 10, 2011, 8 pages.
Non-final Office Action for U.S. Appl. No. 12/221,117 mailed Jul. 14, 2010, 7 pages.
Non-final Office Action for U.S. Appl. No. 12/221,117 mailed Jun. 9, 2009, 5 pages.
Non-final Office Action for U.S. Appl. No. 12/221,117 mailed Dec. 21, 2010, 7 pages.
Advisory Action for U.S. Appl. No. 12/394,483 mailed Feb. 16, 2012, 3 pages.
Final Office Action for U.S. Appl. No. 12/394,483 mailed Dec. 6, 2011, 14 pages.
Non-final Office Action for U.S. Appl. No. 12/394,483 mailed Jun. 17, 2011, 11 pages.
Advisory Action for U.S. Appl. No. 12/950,234 mailed Dec. 21, 2011, 3 pages.
Non-final Office Action for U.S. Appl. No. 12/950,234 mailed Jun. 17, 2011, 7 pages.
Non-final Office Action for U.S. Appl. No. 12/950,234 mailed Mar. 12, 2012, 10 pages.
Final Office Action for U.S. Appl. No. 12/950,234 mailed Oct. 14, 2011, 10 pages.
Advisory Action mailed May 12, 2011, for U.S. Appl. No. 12/323,423, 3 pages.
Final Rejection mailed Mar. 3, 2011, for U.S. Appl. No. 12/323,423, 17 pages.
Non-Final Rejection mailed Aug. 5, 2011, for U.S. Appl. No. 12/323,423, 13 pages.
International Search Report for PCT/US2009/066779 mailed Aug. 27, 2010, 3 pages.
"MPO Fiber Optic Rack Panels now available from L-com Connectivity Products," article dated Jun. 4, 2007, 16 pages, http://www.I-com.com/content/Article.aspx?Type=P&Id=438.
"19" Rack Panel with 16 MPO Fiber Optic Couplers—1U high, product page, accessed Oct. 23, 2012, 2 pages, http://www.I-com.com/item.aspx?id=9767#.UlbgG8XXay5.
"Drawing for L-com 1U Panel with 16 MTP couplers," May 15, 2007, 1 page, http://www.I-com.com/multimedia/eng_drawings/PR17516MTP.pdf.
Non-final Office Action for U.S. Appl. No. 12/819,034 mailed May 11, 2012, 7 pages.
Non-final Office Action for U.S. Appl. No. 12/819,081 mailed Aug. 21, 2012, 12 pages.
Notice of Allowance of for U.S. Appl. No. 12/819,034 mailed Sep. 11, 2012, 7 pages.
Notice of Allowance for U.S. Appl. No. 12/417,325 mailed Aug. 22, 2012, 7 pages.
Notice of Panel Decision for Pre-Appeal Brief for U.S. Appl. No. 12/417,325 mailed Aug. 8, 2012, 2 pages.
Advisory Action for U.S. Appl. No. 12/417,325 mailed Jun. 29, 2012, 3 pages.
Advisory Action for U.S. Appl. No. 12/417,325 mailed Jun. 12, 2012, 3 pages.
Final Office Action for U.S. Appl. No. 12/417,325 mailed Apr. 16, 2012, 6 pages.
Final Office Action for U.S. Appl. No. 12/417,325 mailed Feb. 7, 2012, 7 pages.
Non-final Office Action for U.S. Appl. No. 12/417,325 mailed Jun. 15, 2011, 6 pages.
Notice of Allowance for U.S. Appl. No. 12/487,929 mailed Sep. 12, 2012, 4 pages.
Notice of Allowance for U.S. Appl. No. 12/487,929 mailed Jun. 13, 2012, 8 pages.
Advisory Action for U.S. Appl. No. 12/487,929 mailed Apr. 17, 2012, 3 pages.
Final Office Action for U.S. Appl. No. 12/487,929 mailed Feb. 14, 2012, 6 pages.
Final Office Action for U.S. Appl. No. 12/487,929 mailed Dec. 5, 2011, 7 pages.
Non-final Office Action for U.S. Appl. No. 12/487,929 mailed May 23, 2011, 7 pages.
Notice of Allowance for U.S. Appl. No. 12/415,253 mailed Mar. 11, 2011, 7 pages.

Non-final Office Action for U.S. Appl. No. 12/415,253 mailed Jul. 12, 2010, 11 pages.
Final Office Action for U.S. Appl. No. 12/415,253 mailed Apr. 16, 2010, 9 pages.
Non-final Office Action for U.S. Appl. No. 12/415,253 mailed Sep. 30, 2009, 8 pages.
Non-final Office Action for U.S. Appl. No. 12/641,617 mailed Oct. 5, 2012, 21 pages.
Final Office Action for U.S. Appl. No. 12/630,938 mailed Jun. 1, 2012, 18 pages.
Non-final Office Action for U.S. Appl. No. 12/630,938 mailed Dec. 19, 2011, 15 pages.
Non-final Office Action for U.S. Appl. No. 12/751,884 mailed Jul. 2, 2012, 9 pages.
Non-final Office Action for U.S. Appl. No. 12/871,052 mailed Aug. 13, 2012, 8 pages.
Non-final Office Action for U.S. Appl. No. 12/576,806 mailed Dec. 13, 2011, 6 pages.
Notice of Allowance for U.S. Appl. No. 12/576,806 mailed Apr. 18, 2012, 5 pages.
International Search Report for PCT/US2010/023901 mailed Jun. 11, 2010, 3 pages.
Notice of Allowance for U.S. Appl. No. 12/576,769 mailed May 31, 2012, 9 pages.
Non-Final Rejection mailed Sep. 7, 2010, for U.S. Appl. No. 12/323,423, 18 pages.
Notice of Allowance for U.S. Appl. No. 12/323,423 mailed Jan. 24, 2012, 8 pages.
Examiner's Answer mailed Mar. 4, 2011, for U.S. Appl. No. 12/323,415, 11 pages.
Final Rejection mailed Jun. 25, 2010, for U.S. Appl. No. 12/323,415, 10 pages.
Non-Final Rejection mailed Aug. 5, 2011, for U.S. Appl. No. 12/323,415, 41 pages.
Non-final Office Action for U.S. Appl. No. 12/323,415 mailed Apr. 23, 2012, 11 pages.
Non-Final Rejection mailed Dec. 10, 2009, for U.S. Appl. No. 12/323,415, 7 pages.
Examiner's Answer to Appeal Brief for U.S. Appl. No. 11/320,062 mailed Dec. 8, 2011, 8 pages.
Final Office Action for U.S. Appl. No. 11/320,062 mailed Mar. 8, 2011, 8 pages.
Non-final Office Action for U.S. Appl. No. 11/320,062 mailed Jan. 15, 2010, 11 pages.
Non-final Office Action for U.S. Appl. No. 12/320,062 mailed Sep. 30, 2010, 7 pages.
Final Office Action for U.S. Appl. No. 11/439,086 mailed Feb. 4, 2010, 14 pages.
Non-final Office Action for U.S. Appl. No. 11/439,086 mailed May 3, 2010, 11 pages.
Non-final Office Action for U.S. Appl. No. 11/439,086 mailed Sep. 21, 2009, 10 pages.
Final Office Action for U.S. Appl. No. 12/079,481 mailed Mar. 18, 2010, 10 pages.
Non-final Office Action for U.S. Appl. No. 12/079,481 mailed Dec. 26, 2008, 9 pages.
Non-final Office Action for U.S. Appl. No. 12/079,481 mailed Sep. 16, 2009, 10 pages.
Notice of Allowance for U.S. Appl. No. 12/079,481 mailed Jun. 3, 2010, 6 pages.
Notice of Allowance for U.S. Appl. No. 12/079,481 mailed Oct. 4, 2010, 4 pages.
Notice of Allowance for U.S. Appl. No. 12/415,454 mailed Jun. 19, 2012, 5 pages.
Non-final Office Action for U.S. Appl. No. 12/323,373 mailed May 3, 2012, 7 pages.
Non-final Office Action for U.S. Appl. No. 11/809,474 mailed Apr. 8, 2008, 13 pages.
Non-final Office Action for U.S. Appl. No. 11/809,474 mailed Nov. 13, 2008, 10 pages.
Notice of Allowance for U.S. Appl. No. 11/809,474 mailed Jul. 6, 2009, 6 pages.
Final Office Action for U.S. Appl. No. 11/320,031 mailed Mar. 8, 2011, 8 pages.
Non-final Office Action for U.S. Appl. No. 11/320,031 mailed Jan. 5, 2010, 16 pages.
Non-final Office Action for U.S. Appl. No. 11/320,031 mailed Sep. 30, 2010, 7 pages.
Notice of Allowance for U.S. Appl. No. 11/320,031 mailed Nov. 15, 2011, 7 pages.
Non-final Office Action for U.S. Appl. No. 12/157,622 mailed Mar. 31, 2009, 9 pages.
Non-final Office Action for U.S. Appl. No. 12/157,622 mailed Oct. 15, 2009, 9 pages.
Notice of Allowance for U.S. Appl. No. 12/157,622 mailed Apr. 22, 2010, 4 pages.
Non-final Office Action for U.S. Appl. No. 12/323,395 mailed Dec. 8, 2011, 7 pages.
Non-final Office Action for U.S. Appl. No. 12/415,454 mailed Mar. 2, 2012, 5 pages.
Non-final Office Action for U.S. Appl. No. 12/415,454 mailed Sep. 6, 2011, 7 pages.
Notice of Allowance for U.S. Appl. No. 12/415,454 mailed Jan. 13, 2012, 5 pages.
Non-final Office Action for U.S. Appl. No. 12/576,769 mailed Feb. 2, 2012, 23 pages.

* cited by examiner

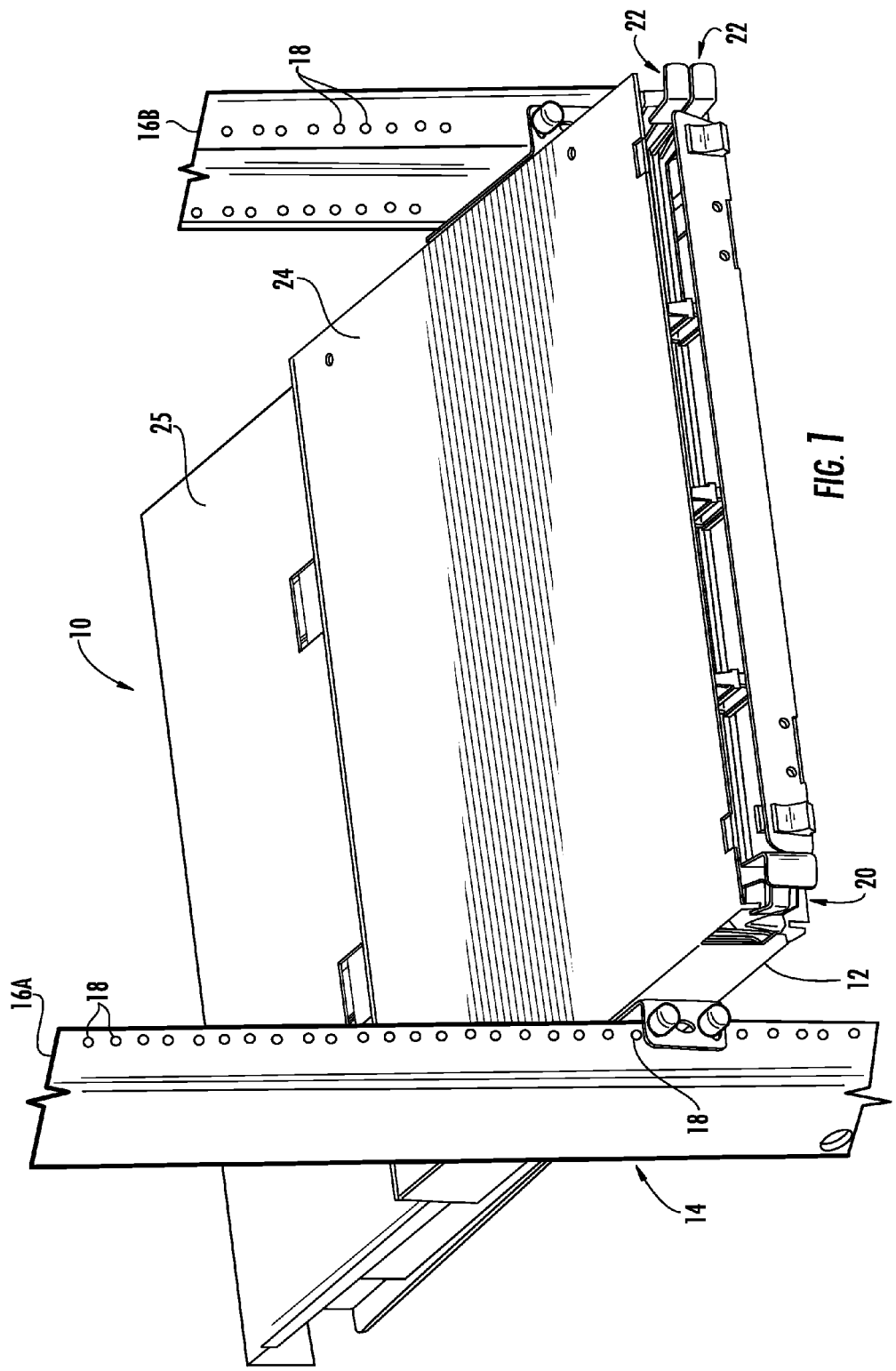

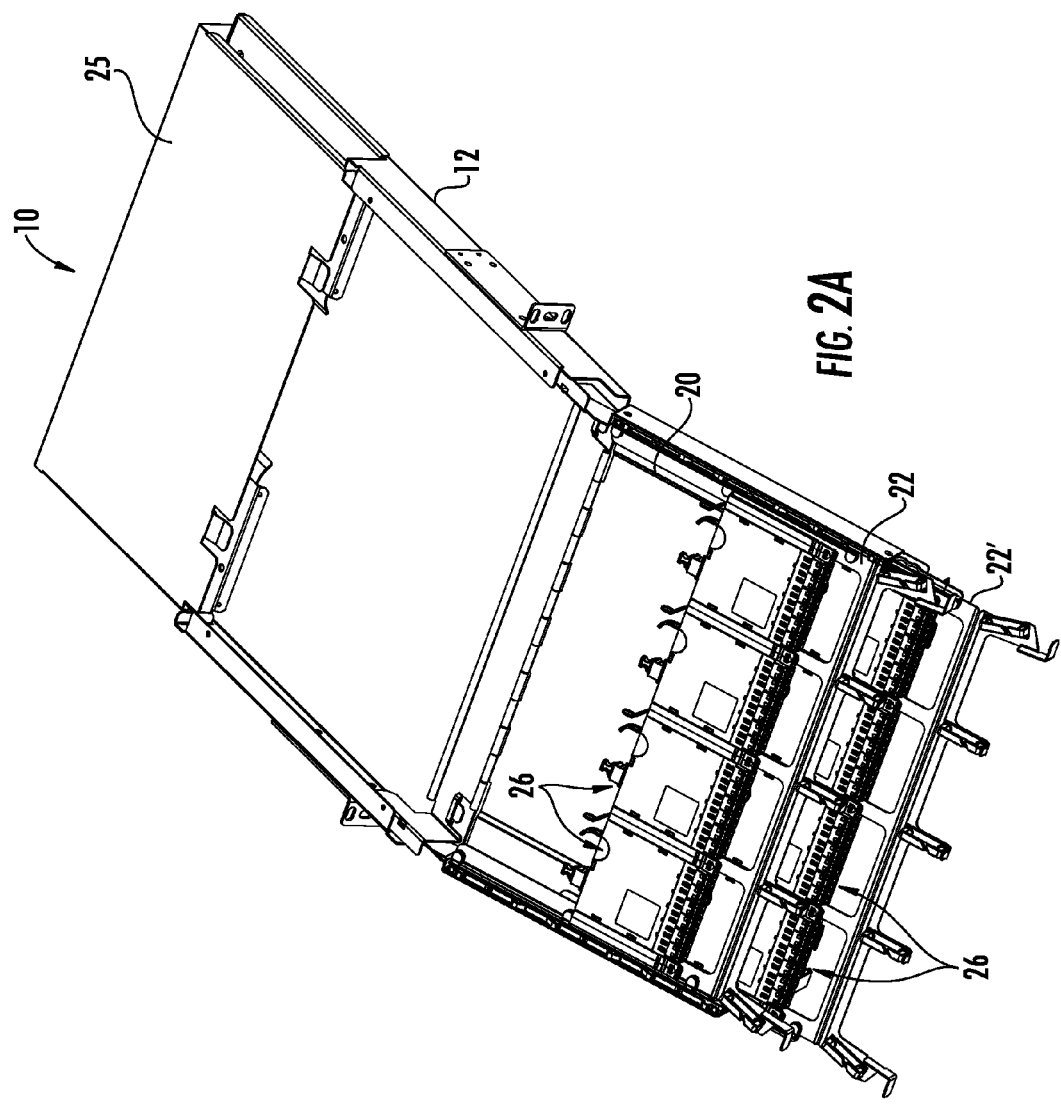

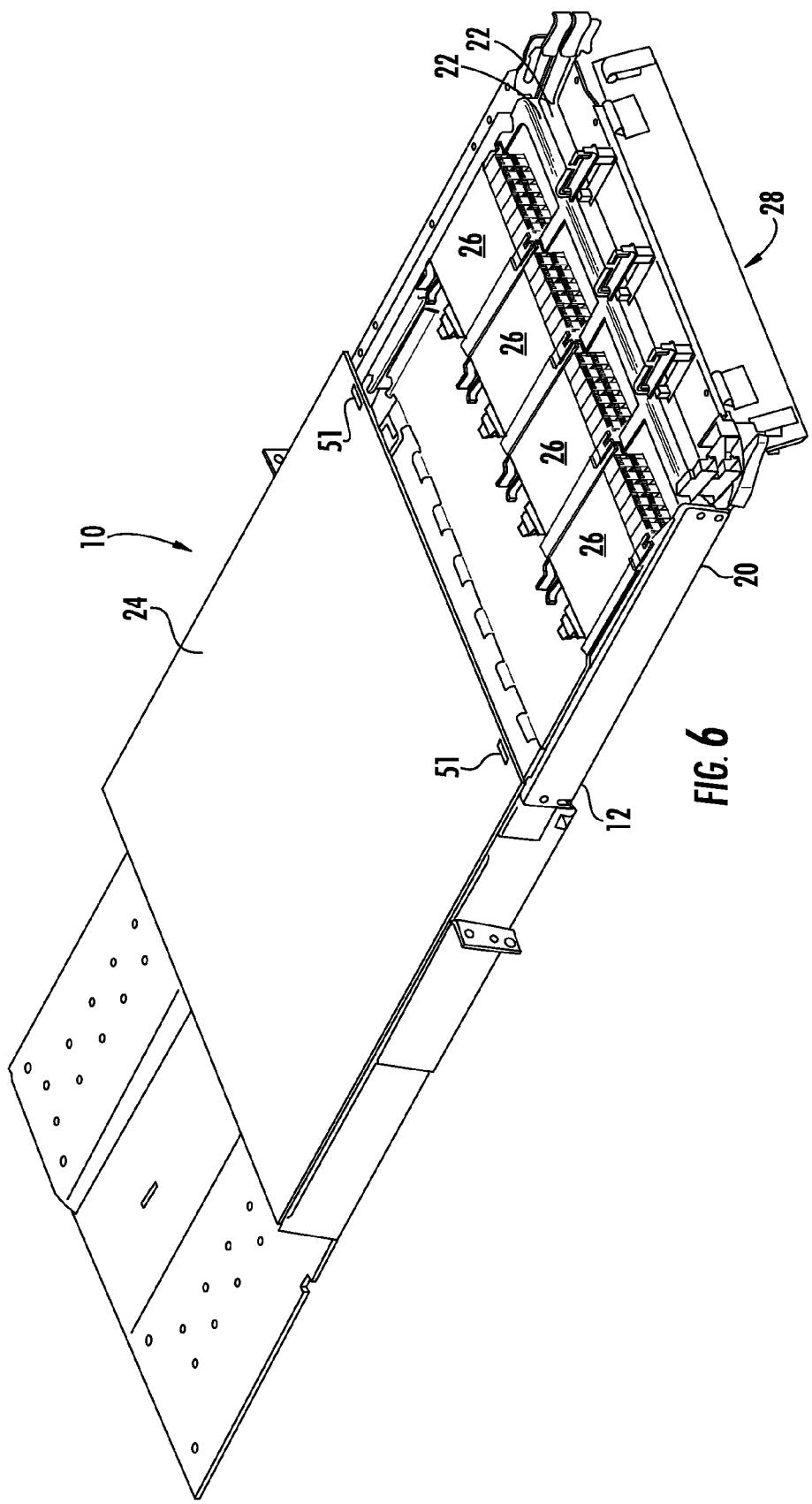

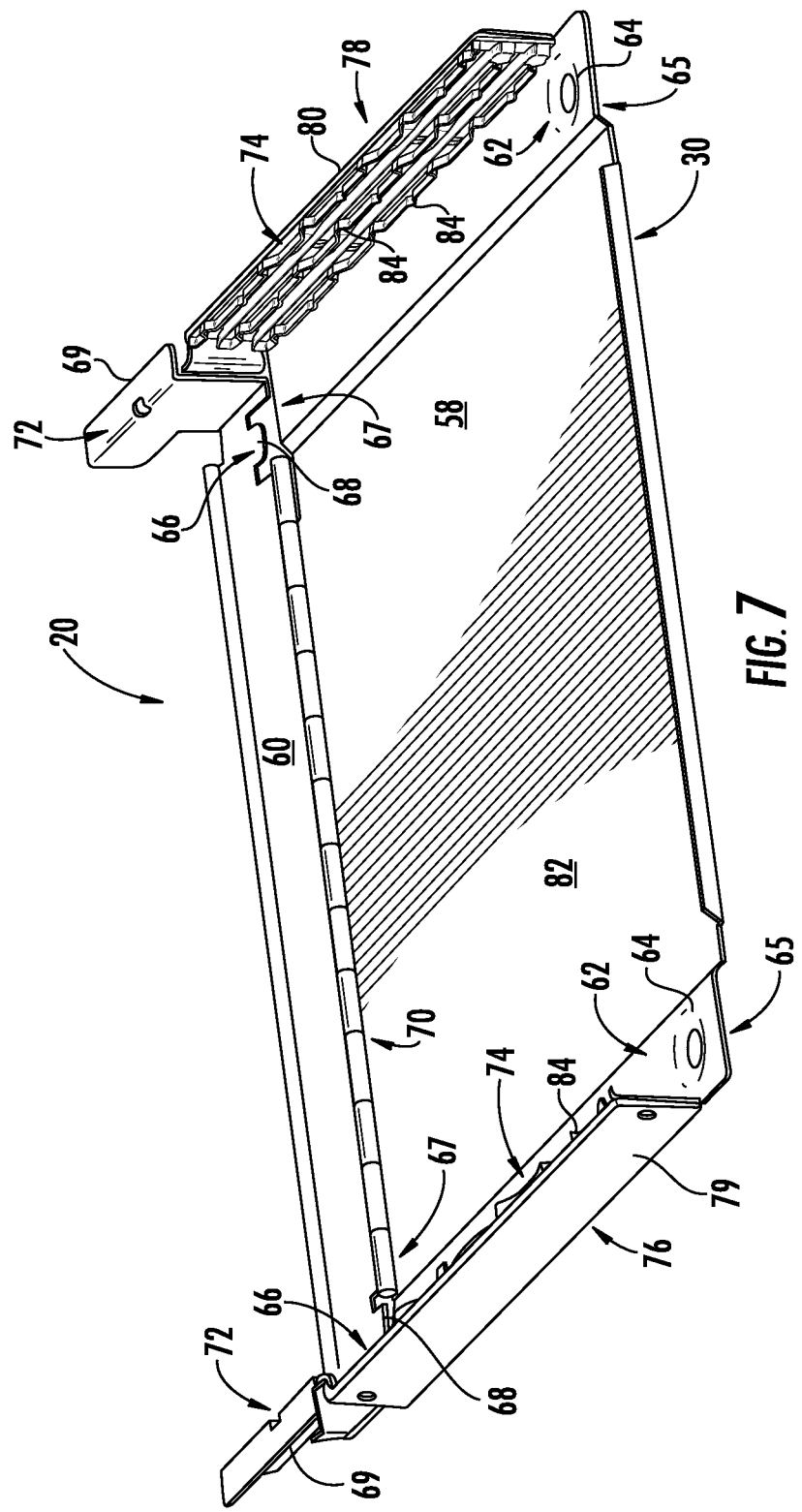

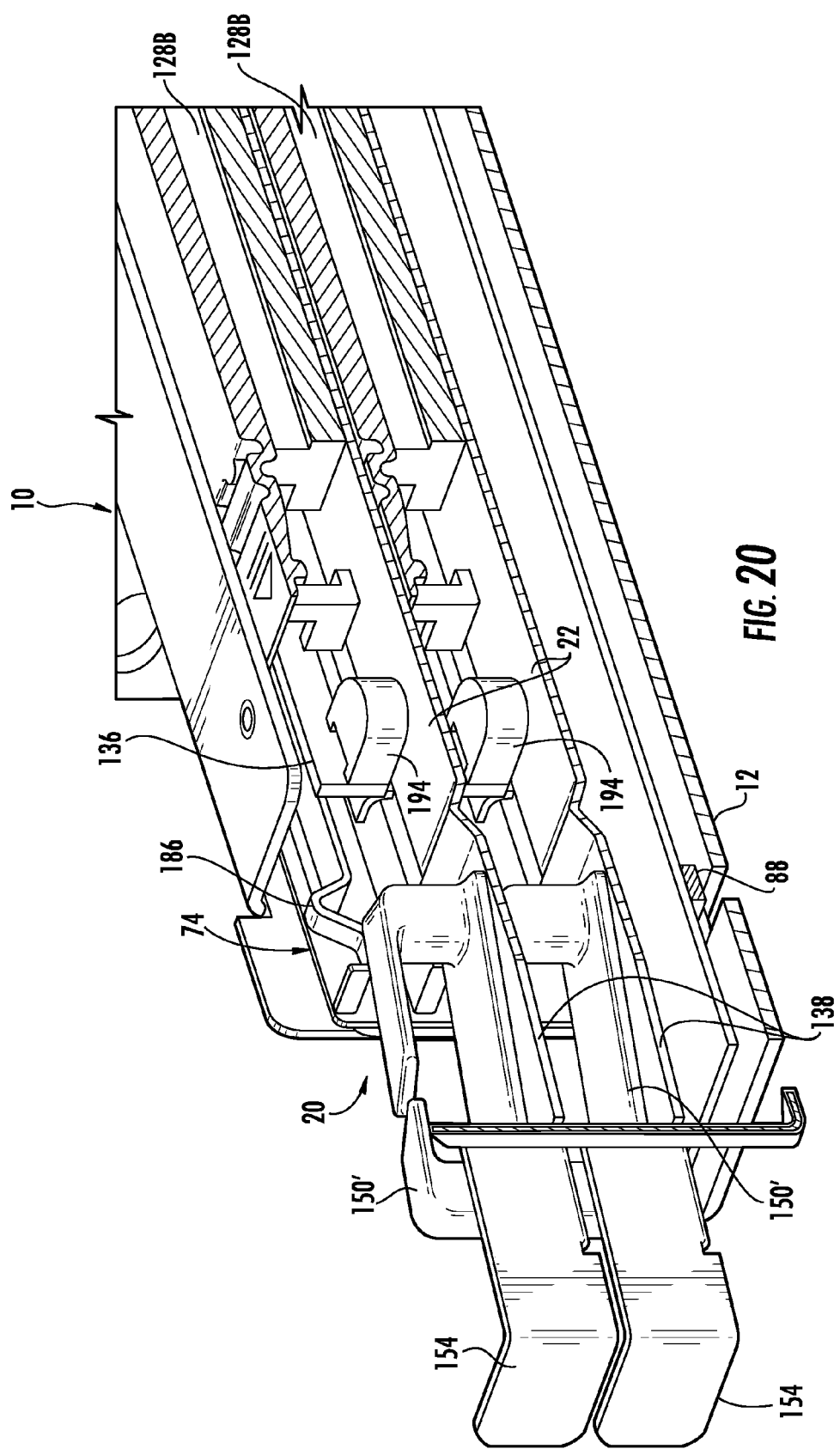

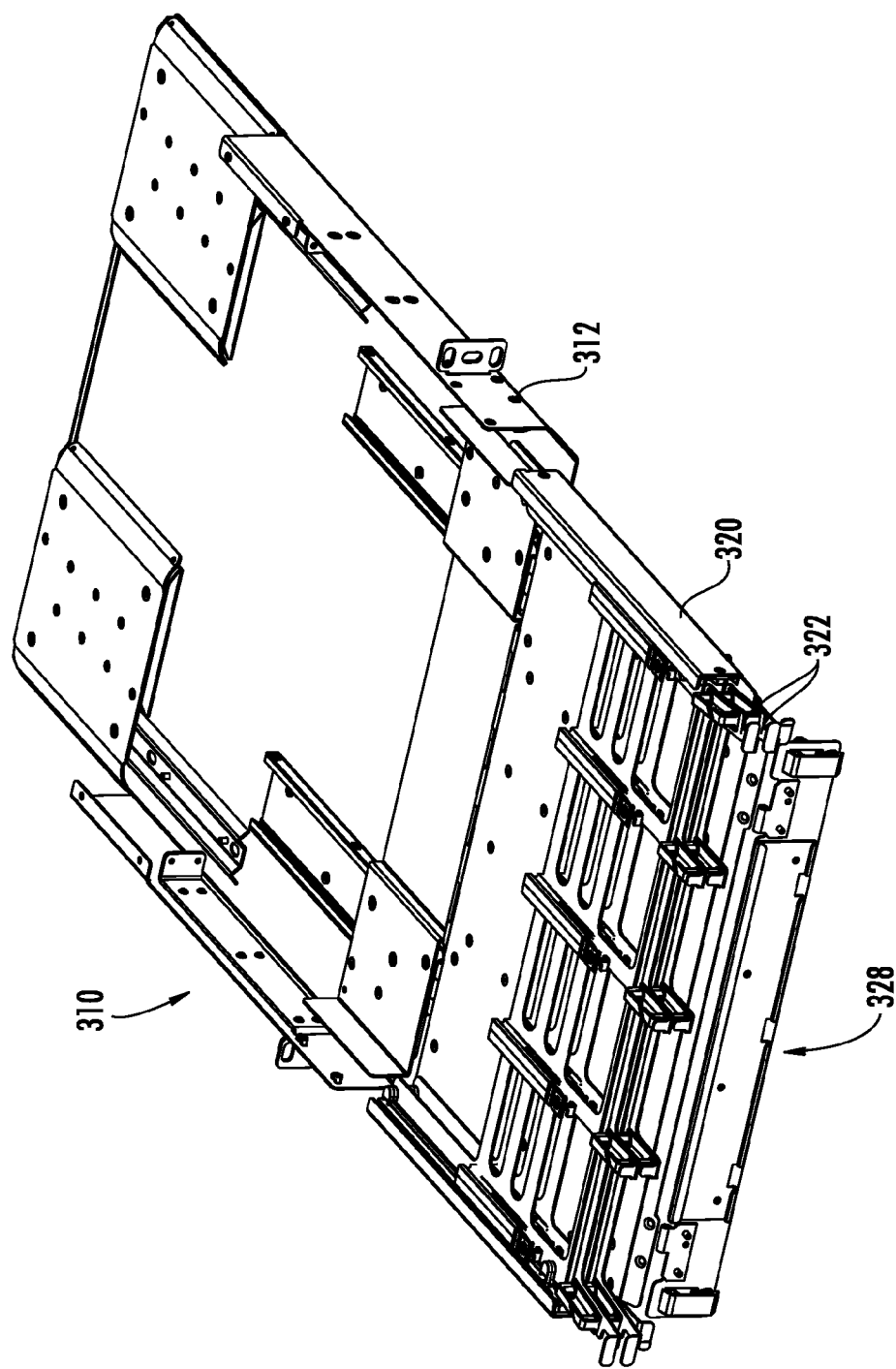

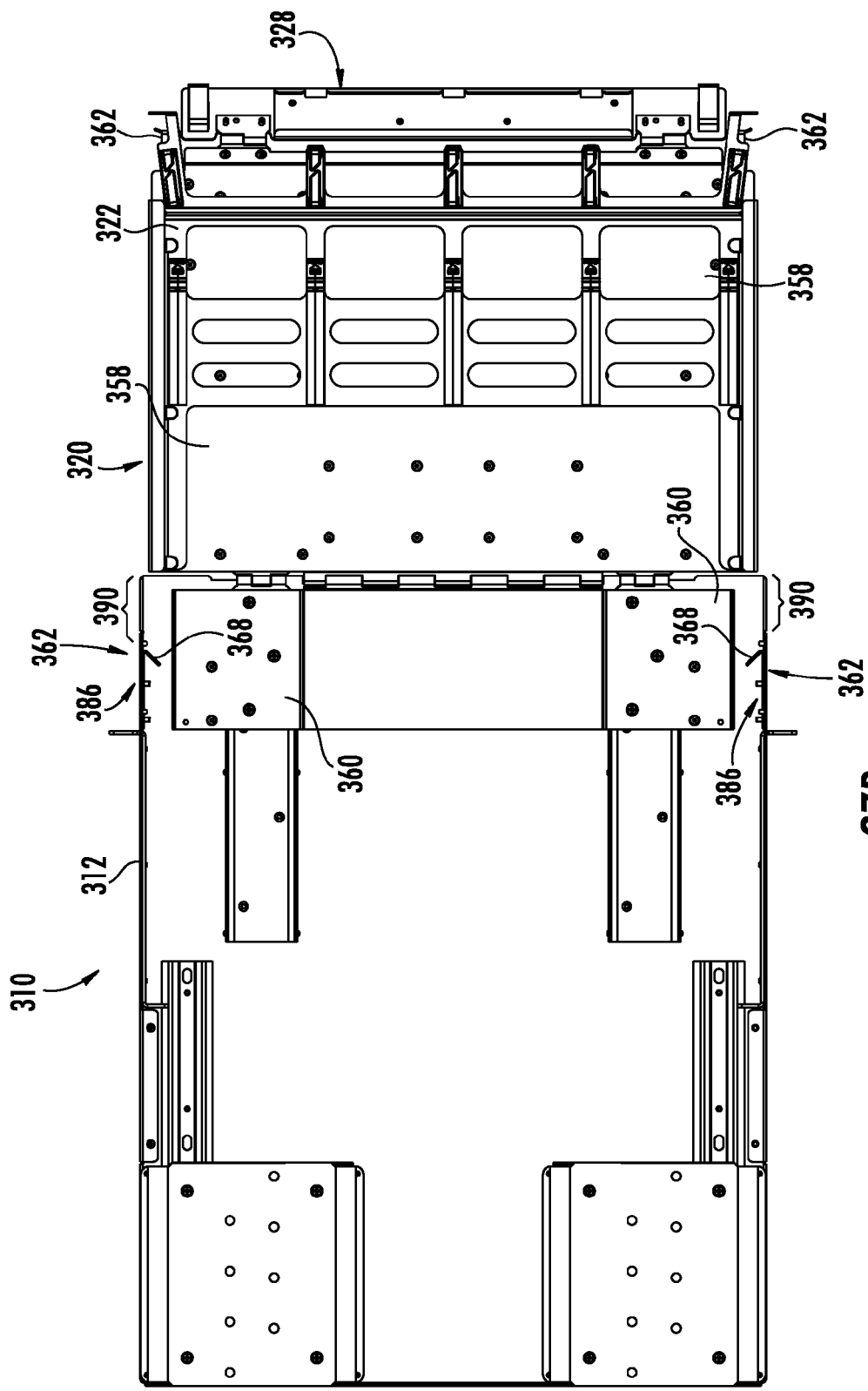

FIBER OPTIC EQUIPMENT GUIDES AND RAILS CONFIGURED WITH STOPPING POSITION(S), AND RELATED EQUIPMENT AND METHODS

RELATED APPLICATIONS

The present application claims priority to U.S. Provisional Patent Application Ser. No. 61/180,331, filed May 21, 2009, entitled "Fiber Optic Equipment Guides and Rails Configured With Stopping Position(s), and Related Equipment," which is incorporated herein by reference in its entirety.

The present application also claims priority to U.S. Provisional Patent Application Ser. No. 61/219,233, filed Jun. 22, 2009, entitled "Fiber Optic Equipment Guides and Rails Configured With Stopping Position(s), and Related Equipment," which is incorporated herein by reference in its entirety.

The present application is related to U.S. Provisional Patent Application Ser. No. 61/180,334, filed May 21, 2009, entitled "Fiber Optic Equipment Supporting Moveable Fiber Optic Equipment Tray(s) and Module(s), and Related Equipment," which is incorporated herein by reference in its entirety.

The present application is also related to U.S. Provisional Patent Application Ser. No. 61/219,241, filed Jun. 22, 2009, entitled "Fiber Optic Equipment Supporting Moveable Fiber Optic Equipment Tray(s) and Module(s), and Related Equipment," which is incorporated herein by reference in its entirety.

The present application is related to co-pending U.S. patent application Ser. No. 12/323,423, filed Nov. 25, 2008, entitled "Rear-Installable Fiber Optic Modules and Equipment," which is incorporated herein by reference in its entirety.

The present application is also related to co-pending U.S. patent application Ser. No. 12/323,415, filed Nov. 25, 2008, entitled "Independently Translatable Modules and Fiber Optic Equipment Trays In Fiber Optic Equipment," which is incorporated herein by reference in its entirety.

The present application is also related to co-pending U.S. patent application Ser. No. 12/394,483, filed Feb. 27, 2009, entitled "Rear-Slidable Extension in a Fiber Optic Equipment Tray," which is incorporated herein by reference in its entirety.

BACKGROUND

1. Field of the Disclosure

The technology of the disclosure relates to fiber optic modules provided in fiber optic equipment to support fiber optic connections.

2. Technical Background

Benefits of optical fiber include extremely wide bandwidth and low noise operation. Because of these advantages, optical fiber is increasingly being used for a variety of applications, including but not limited to broadband voice, video, and data transmission. Fiber optic networks employing optical fiber are being developed and used to deliver voice, video, and data transmissions to subscribers over both private and public networks. These fiber optic networks often include separated connection points linking optical fibers to provide "live fiber" from one connection point to another connection point. In this regard, fiber optic equipment is located in data distribution centers or central offices to support interconnections.

The fiber optic equipment is customized based on the application need. The fiber optic equipment is typically included in housings that are mounted in equipment racks to optimize use of space. One example of such fiber optic equipment is a fiber optic module. A fiber optic module is designed to provide cable-to-cable fiber optic connections and manage the polarity of fiber optic cable connections. A fiber optic module is typically mounted to a chassis or housing which is then mounted inside an equipment rack or cabinet. A technician establishes fiber optic connections to fiber optic equipment mounted in the equipment rack. A need still exists to improve access to optical components in a fiber optic equipment tray as well as provide neat routing and organization of jumper connections.

SUMMARY OF THE DETAILED DESCRIPTION

Embodiments disclosed in the detailed description include fiber optic equipment guides and/or fiber optic equipment rails and related equipment and methods. The fiber optic equipment guides and/or fiber optic equipment rails have at least one stopping member disposed therein to provide at least one stopping position during movement. The fiber optic equipment guides and/or fiber optic equipment rails can be included in fiber optic equipment to support movement or translation of the fiber optic equipment for access. Such fiber optic equipment can include, but is not limited to, fiber optic equipment chassis, drawers, equipment trays, and fiber optic modules. The fiber optic equipment guides and/or rails include at least one stopping member configured to provide at least one stopping position during movement of the fiber optic guides and/or rails. Stopping positions allow fiber optic equipment to be retained in a given position during access to the fiber optic equipment. The stopping positions are configured to be overcome with additional force to allow further movement of the fiber optic equipment.

In one embodiment, a fiber optic equipment guide is provided. The fiber optic equipment guide comprises a guide panel. At least one guide member is disposed in the guide panel and configured to receive at least one fiber optic equipment rail. At least one stopping member is disposed in the at least one guide member. The stopping member(s) is configured to provide at least one stopping position for the at least one fiber optic equipment rail during movement in the at least one guide member.

In another embodiment, a fiber optic equipment rail is provided. The fiber optic equipment rail comprises an elongated member. The elongated member is configured to be attached to fiber optic equipment. The elongated member is further configured to be received in a fiber optic equipment guide to move the fiber optic equipment about the fiber optic equipment guide. At least one stopping member is disposed in the elongated member. The stopping member(s) is configured to provide at least one stopping position for the fiber optic equipment during movement in the fiber optic equipment guide.

The fiber optic equipment guides and rails disclosed herein can be attached or disposed in any type of fiber optic equipment for movement and to provide stopping positions along the movement path. The fiber optic equipment guides can be attached or disposed, without limitation, in chassis, fiber optic equipment drawers, fiber optic equipment trays, and/or fiber optic modules. The fiber optic equipment rails can be attached or disposed, without limitation, in fiber optic equipment drawers, fiber optic equipment trays, and/or fiber optic modules.

Additional features and advantages will be set forth in the detailed description which follows, and in part will be readily apparent to those skilled in the art from that description or recognized by practicing the invention as described herein, including the detailed description that follows, the claims, as well as the appended drawings.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF THE FIGURES

FIG. 1 is a front perspective view of an exemplary fiber optic equipment drawer installed in a chassis and supporting independently moveable fiber optic equipment trays and modules, according to one embodiment;

FIG. 2A is a front perspective view of the fiber optic equipment drawer of FIG. 1 pulled fully open from the chassis and tilted downward, with one of the fiber optic equipment trays pulled out from the fiber optic equipment drawer;

FIG. 6 is a front perspective view of the fiber optic equipment drawer and chassis of FIG. 1 with the fiber optic equipment drawer extended out from the chassis and the drawer door lowered;

FIG. 7 is a front perspective view of the fiber optic equipment drawer of FIG. 1 without installed fiber optic equipment trays and modules;

FIG. 20 is a perspective, left-side cross-sectional view of the fiber optic equipment drawer and chassis of FIG. 1 illustrating the tray guide of FIGS. 19A and 19B receiving tray rails of the fiber optic equipment trays of FIG. 15;

FIG. 27A is a front perspective view of the fiber optic equipment drawer and chassis of FIG. 24 with the fiber optic equipment drawer extended out from the chassis and the drawer door lowered;

FIG. 27B is a top view of the fiber optic equipment drawer and chassis of FIG. 27A;

DETAILED DESCRIPTION OF THE EMBODIMENTS

Figure 2B:
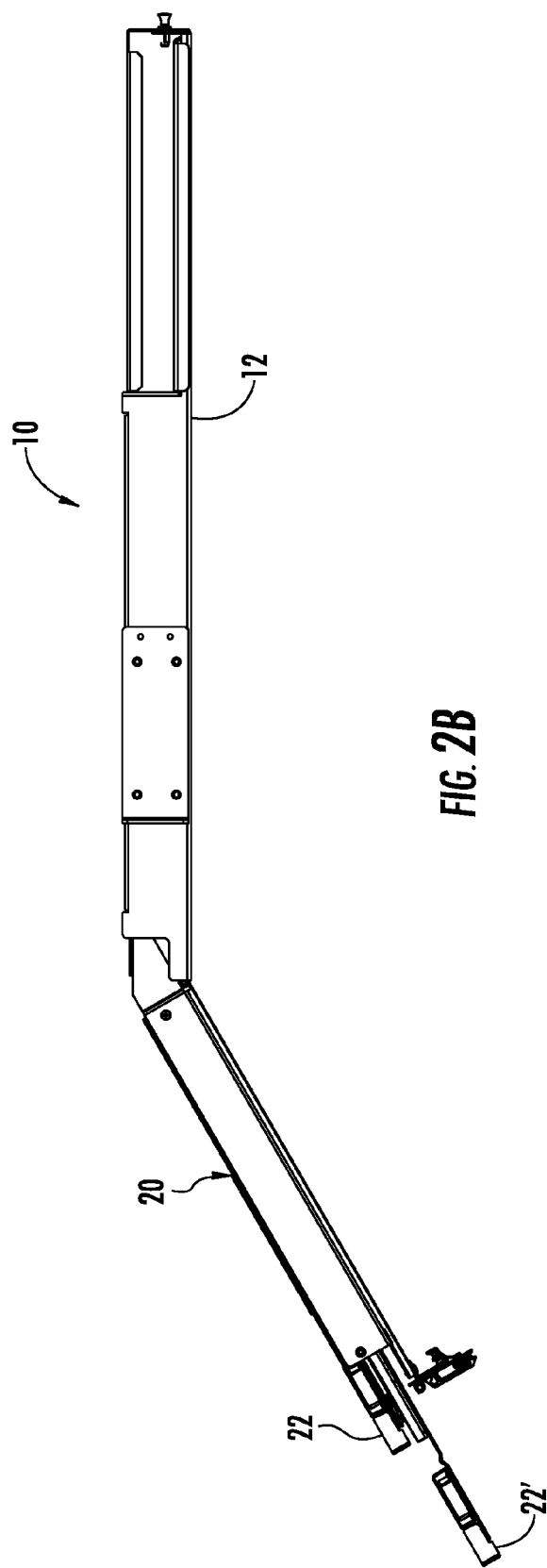
FIG. 2B is a side view of the fiber optic equipment drawer in FIG. 2A.

Reference will now be made in detail to certain embodiments, examples of which are illustrated in the accompanying drawings, in which some, but not all features are shown. Indeed, embodiments disclosed herein may be embodied in many different forms and should not be construed as limited to the embodiments set forth herein; rather, these embodiments are provided so that this disclosure will satisfy applicable legal requirements. Whenever possible, like reference numbers will be used to refer to like components or parts.

Embodiments disclosed in the detailed description include fiber optic equipment guides and/or fiber optic equipment rails and related equipment and methods. The fiber optic equipment guides and/or fiber optic equipment rails have at least one stopping member disposed therein to provide at least one stopping position during movement. The fiber optic equipment guides and/or fiber optic equipment rails can be included in fiber optic equipment to support movement or translation of the fiber optic equipment for access. Such fiber optic equipment can include, but is not limited to, fiber optic equipment chassis, drawers, equipment trays, and fiber optic modules. The fiber optic equipment guides and/or rails include at least one stopping member configured to provide at least one stopping position during movement of the fiber optic guides and/or rails. Stopping positions allow fiber optic equipment to be retained in a given position during access to the fiber optic equipment. The stopping positions are configured to be overcome with additional force to allow further movement of the fiber optic equipment.

Embodiments disclosed in the detailed description also include fiber optic apparatuses that support fiber optic equipment. In one embodiment, the fiber optic apparatus comprises a fiber optic equipment drawer. The fiber optic equipment drawer is installed in and movable about a chassis. At least one fiber optic equipment tray is received in at least one tray guide disposed in the fiber optic equipment drawer. The fiber optic equipment tray(s) is moveable about the tray guide(s) to be movable about the fiber optic equipment drawer. At least one fiber optic module is received in at least one module guide disposed in a fiber optic equipment tray. The fiber optic module(s) is movable about the module guide(s) to be movable about a fiber optic equipment tray. In this manner, enhanced access can be provided to the fiber optic module(s) disposed in the fiber optic equipment drawer and its fiber optic connections. The fiber optic equipment drawer can be moved out from the chassis to provide access to the fiber optic equipment tray(s) and fiber optic module(s) supported therein. The fiber optic equipment tray(s) can be moved out from the fiber optic equipment drawer to provide enhanced access to the fiber optic module(s) supported therein. The fiber optic module(s) can be moved out from the fiber optic equipment tray(s) to provide further enhanced access to the fiber optic module(s). Enhanced access may be useful for installing or re-installing, re-configuring, and/or removing fiber optic modules and accessing fiber optic connections made therein.

In this regard, FIG. 1 illustrates exemplary fiber optic equipment 10. The exemplary fiber optic equipment 10 may be provided at a data distribution center or central office to support cable-to-cable fiber optic connections and to manage a plurality of fiber optic cable connections. The fiber optic equipment 10 includes a fiber optic equipment chassis 12 ("chassis 12"). The chassis 12 is shown as being installed in a fiber optic equipment rack 14. The fiber optic equipment rack 14 contains two vertical rails 16A, 16B that extend vertically and include a series of apertures 18. The apertures 18 facilitate attachment of the fiber optic equipment 10 inside the fiber optic equipment rack 14. The fiber optic equipment 10 is attached and supported by the fiber optic equipment rack 14 in the form of shelves that are stacked on top of each other within the vertical rails 16A, 16B. As illustrated, the fiber optic equipment 10 is attached to the vertical rails 16A, 16B. The fiber optic equipment rack 14 may support 1U-sized shelves, any other U-size, with "U" equaling a standard 1.75 inches in height, or any other height desired.

As illustrated in FIG. 1 and discussed in greater detail below in this description, the chassis 12 includes a fiber optic equipment drawer 20 supporting one or more extendable fiber optic equipment trays 22. The fiber optic equipment trays 22 can be moved and extended from the fiber optic equipment drawer 20 and retracted back into the fiber optic equipment drawer 20. Any number of fiber optic equipment trays 22 can be provided. Each fiber optic equipment tray 22 supports one or more fiber optic modules (illustrated in FIG. 2A as element 26) that each support one or more fiber optic connections. The view of the fiber optic modules in FIG. 1 is obstructed by a front chassis cover 24 placed in front of the fiber optic equipment drawer 20 as part of the chassis 12. The front chassis cover 24 is attached to a rear chassis cover 25 to form a cover over the chassis 12. The fiber optic equipment drawer 20 is extendable out from the chassis 12 to access the fiber optic equipment trays 22 and the fiber optic modules 26 supported therein.

In the example of the fiber optic equipment 10 in FIG. 1, two fiber optic equipment trays 22 are supported by the fiber optic equipment drawer 20 with each fiber optic equipment tray 22 supporting four (4) fiber optic modules 26. Each fiber optic module 26 supports twelve (12) optical fiber connections. Thus, a total of up to ninety-six (96) optical fiber connections can be provided by the fiber optic equipment drawer 20, although the fiber optic equipment drawer 20 is not limited to this density.

FIGS. 2A and 2B are provided to summarize certain capabilities and features of the fiber optic equipment 10 and fiber optic equipment drawer 20 of FIG. 1. Embodiments of these capabilities and features will be described in more detail in this description. FIG. 2A is a front perspective view of the chassis 12 and fiber optic equipment drawer 20. FIG. 2B is a side view of the chassis 12 and fiber optic equipment drawer 20. As illustrated in FIG. 2A, the fiber optic equipment drawer 20 is pulled out from the chassis 12. The fiber optic modules 26 supported by the fiber optic equipment trays 22 inside the fiber optic equipment drawer 20 can be seen. The fiber optic equipment drawer 20 can be extended out from the chassis 12 to provide access to the fiber optic equipment trays 22. The fiber optic equipment trays 22 can be extended out from the fiber optic equipment drawer 20 to provide access to fiber optic modules 26 supported in the fiber optic equipment trays 22 and fiber optic connections supported therein. As illustrated in FIGS. 2A and 2B, the fiber optic equipment drawer 20 is pulled or extended fully from the chassis 12 and tilted downward. The fiber optic equipment drawer 20 can be tilted downward to tilt the fiber optic modules 26 installed in the fiber optic equipment drawer 20 downward if desired, as illustrated in FIGS. 2A and 2B. Tilting the fiber optic equipment drawer 20 downward for access may be particularly useful if the fiber optic equipment drawer 20 is located higher in a fiber optic equipment rack. The fiber optic modules 26 can be accessed by pulling out the fiber optic equipment tray 22 supporting the fiber optic module 26 from the fiber optic equipment drawer 20, as illustrated in FIGS. 2A and 2B. Further, the fiber optic modules 26 can be removed from the fiber optic equipment trays 22, if desired.

As will be described in more detail below, each fiber optic equipment tray 22 is also independently translatable from the fiber optic equipment drawer 20, whether or not the fiber optic equipment drawer 20 is extended out from the chassis 12 or tilted downward. This is illustrated by example in FIGS. 2A and 2B. As illustrated therein, one of the fiber optic equipment trays 22' is pulled out from the extended fiber optic equipment drawer 20. In this manner, enhanced access can be provided to the fiber optic modules 26. Access may be used for installing, configuring, re-configuring, re-installing, and removing the fiber optic modules 26 and the fiber optic connections provided therein as an example. As will be also described in more detail below, each particular fiber optic module 26 in this embodiment can be translated or removed independent from other fiber optic modules 26 in a given fiber optic equipment tray 22 for further access, if desired.

FIGS. 3-23 will now be referenced to describe the various capabilities and features of the fiber optic equipment 10 and fiber optic equipment drawer 20 of FIG. 1 by example in more detail.

Figure 3:
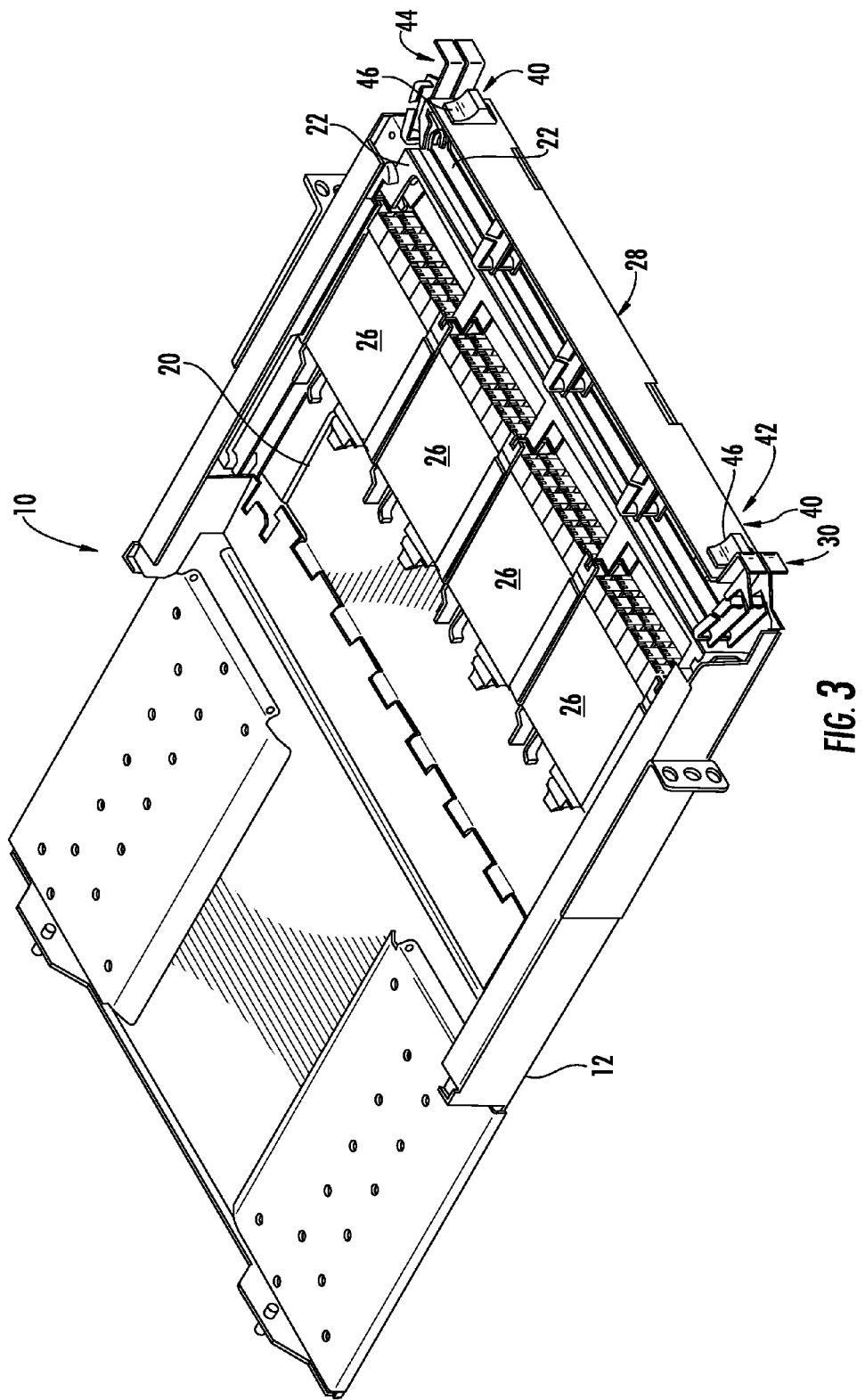
FIG. 3 is a front perspective view of the fiber optic equipment drawer and chassis of FIG. 1 with a chassis cover removed.
Figure 4:
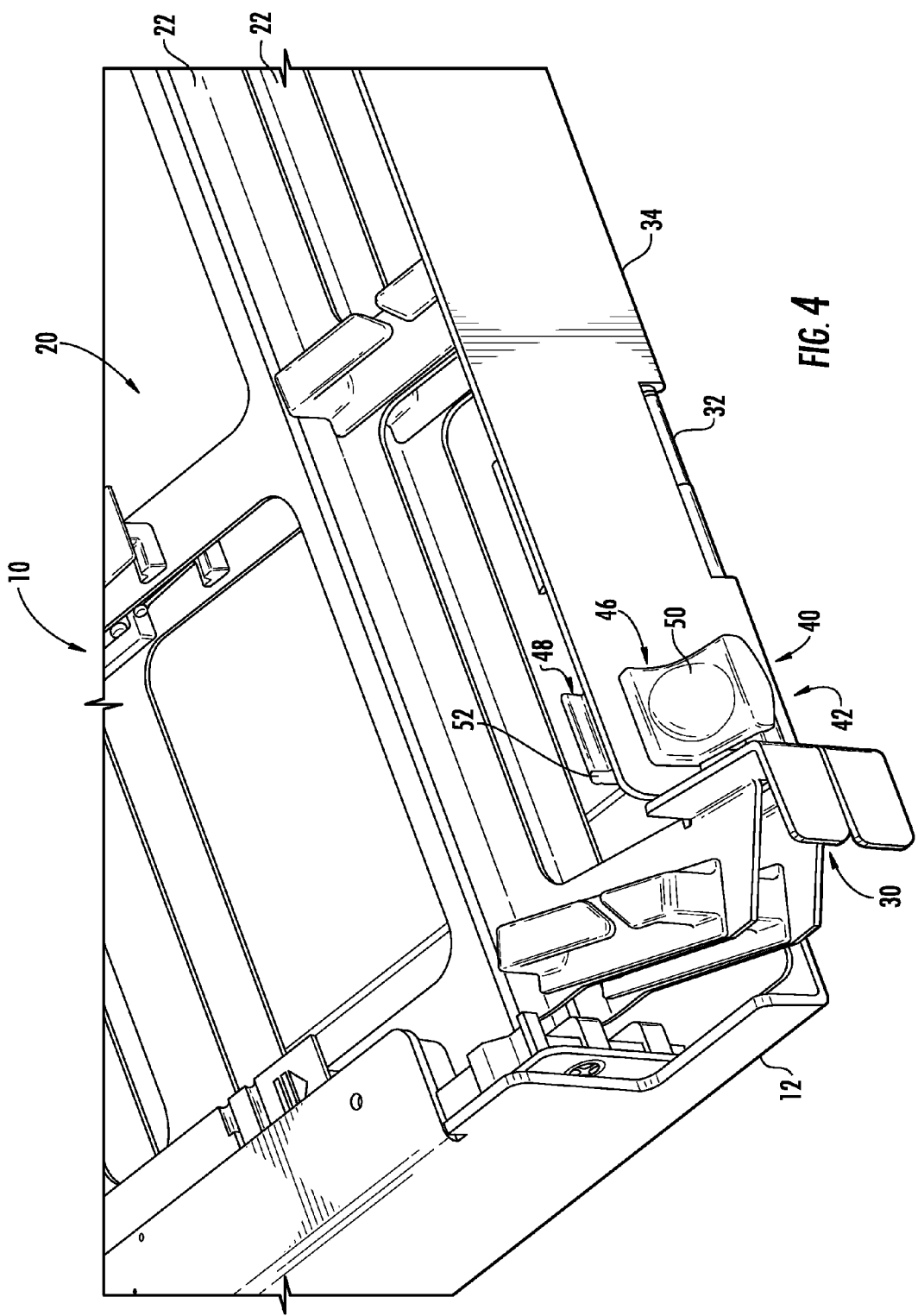
FIG. 4 is a close-up view of the drawer door of the fiber optic equipment drawer of FIG. 3.
Figure 5:
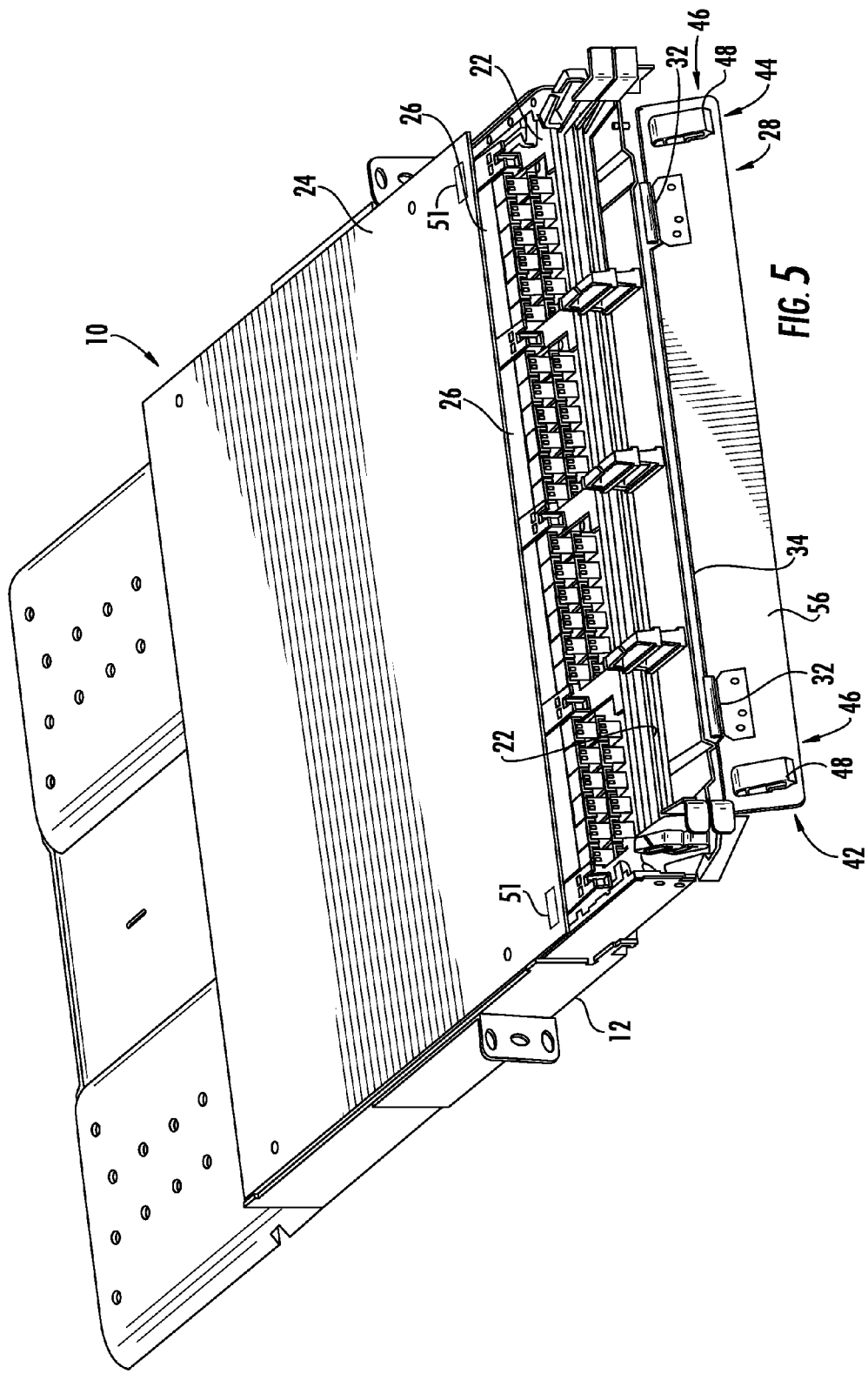
FIG. 5 is a front perspective view of the fiber optic equipment drawer and chassis of FIG. 1 with the drawer door lowered according to one embodiment.

FIG. 3 is a front perspective view of the fiber optic equipment 10 and fiber optic equipment drawer 20 of FIG. 1 with the fiber optic equipment drawer 20 fully retracted into the chassis 12. The front chassis cover 24 and the rear chassis cover 25 are removed to facilitate discussion of the components of and inside the fiber optic equipment drawer 20. As illustrated in FIG. 3, the fiber optic equipment drawer 20 includes a drawer door 28 in this embodiment. When the fiber optic equipment trays 22 are fully retracted into the fiber optic equipment drawer 20, as illustrated in FIG. 3, the drawer door 28 can be closed and locked to the chassis 12 to close off access to the fiber optic equipment trays 22. In this embodiment, the drawer door 28 is hingedly attached to the front end 30 of the fiber optic equipment drawer 20. FIG. 4 is a close-up view of FIG. 3 illustrating a portion of the drawer door 28 and a hinge 32 attaching a bottom portion 34 of the drawer door 28 to the front end 30 of the fiber optic equipment drawer 20 in this embodiment. In this manner, the drawer door 28 is retained with the fiber optic equipment drawer 20 when the drawer door 28 is opened, as illustrated in FIG. 5.

To retain the drawer door 28 closed to the chassis 12 in this embodiment, a drawer door locking mechanism 40 is provided. The drawer door locking mechanism 40 is configured to releasably retain the drawer door 28 closed to the chassis 12, and more particularly to the front chassis cover 24. As illustrated in FIG. 3, two drawer door locking mechanisms 40 are provided; one for a left side end 42 and one for a right side end 44 of the drawer door 28. FIG. 4 illustrates a close-up view of the drawer door locking mechanism 40. In this embodiment, the drawer door locking mechanism 40 is comprised of a push button latch 46. The push button latch 46 is configured to engage a latch 48 with a latch orifice 51 disposed in the front chassis cover 24 to retain the drawer door 28 closed. Push button latches 46 are each disposed in the drawer door 28, one on the left side end 42 and one on the right side end 44, in this embodiment as illustrated in FIG. 5. Two latch orifices 51 are disposed in the front chassis cover 24 and configured to receive the latches 48 to lock the drawer door 28, as also illustrated in FIG. 5. The push button latches 46 in this embodiment are spring-loaded such that when a force is not applied to push buttons 50, the latches 48 are biased upward to retain the latches 48 engaged with the latch orifices 51 when the drawer door 28 is closed.

When it is desired to pull out one or more of the fiber optic equipment trays 22, the drawer door 28 can be unlocked from the front chassis cover 24 and opened. The push buttons 50 are configured to move the latches 48 downward to overcome the spring-loaded force in the push button latches 46 when a downward force is applied to the push buttons 50. When the push buttons 50 are pushed downward, the latches 48 are disengaged from the latch orifices 51 in the front chassis cover 24 to unlock the drawer door 28. The drawer door 28 can then be opened from the front chassis cover 24. When opened, the drawer door 28 can swing downward about the hinges 32.

As previously discussed, the fiber optic equipment drawer 20 in the fiber optic equipment 10 of FIG. 1 is configured to be pulled out from the chassis 12 for enhanced access to the fiber optic equipments trays 22 and/or to the fiber optic modules 26 contained therein. In this regard, FIG. 6 provides a front perspective view of the fiber optic equipment 10 and fiber optic equipment drawer 20 of FIG. 1 with the drawer door 28 opened and lowered and the fiber optic equipment drawer 20 extended out from the chassis 12.

To further illustrate the fiber optic equipment drawer 20 and its various features and components, a perspective view of the fiber optic equipment drawer 20 which has been removed from the chassis 12 and does not include fiber optic equipment trays 22 and fiber optic modules 26 is illustrated in FIG. 7. The fiber optic equipment drawer 20 is configured to provide several features, some or all which can be provided. In this embodiment, the fiber optic equipment drawer 20 includes a front panel 58 attached to a rear panel 60. The front panel 58 and rear panel 60 may be formed from sheet metal or any other form or type of material desired. The front panel 58 is configured to support one or more fiber optic equipment trays 22 and fiber optic modules 26 disposed in the fiber optic equipment trays 22, as previously discussed and illustrated in FIG. 6.

With continuing reference to FIG. 7, the fiber optic equipment drawer 20 includes two drawer retention members 62 disposed in the front panel 58. The drawer retention members 62 are configured to releasably retain the fiber optic equipment drawer 20 in the chassis 12 until a sufficient and purposeful force is applied to release the fiber optic equipment drawer 20. In this embodiment, the drawer retention members 62 are provided in the form of embosses or dimples 64 disposed in the front panel 58 adjacent the front end 30 of the fiber optic equipment drawer 20. The embosses 64 are configured to align with and interfere with protrusions provided in the form of protruding lances (illustrated in FIG. 8A as element 88) disposed in the chassis 12 when the fiber optic equipment drawer 20 is retracted into the chassis 12. To release the fiber optic equipment drawer 20 to be extended from the chassis 12, a force is applied to the fiber optic equipment drawer 20. The embosses 64 will abut against the lances 88. To clear the interference between the embosses 64 and the lances 88, a force is applied to the fiber optic equipment drawer 20 sufficient to allow the embosses 64 to be pulled up across and over the lances 88 in the chassis 12 to release the fiber optic equipment drawer 20 from the chassis 12. A force is likewise applied to the fiber optic equipment drawer 20 to push the embosses 64 across and back over the lances 88 to retain the fiber optic equipment drawer 20 retracted into the chassis 12. The embosses 64 in this embodiment are disposed in raised sections 65 in the front panel 58 extending from the front end 30 to a rear end 67 of the front panel 58. One or more than two drawer retention members 62 may also be provided. More detail regarding the drawer retention members 62 in this embodiment is described below with regard to FIGS. 8A-9B.

Also in this embodiment as illustrated in FIG. 7, two drawer pull-out limiting members 66 are disposed in the rear panel 60 of the fiber optic equipment drawer 20. The drawer pull-out limiting members 66 limit the pull out distance of the fiber optic equipment drawer 20 from the chassis 12. Flanges 69 are provided as part of the rear panel 60 to ride along the inside of the chassis 12 as the fiber optic equipment drawer 20 is pulled out from the chassis 12. The drawer pull-out limiting members 66 each include tabs 68 that are configured to also engage with lances 88 disposed in the chassis 12. Once the tabs 68 engage with the lances 88, the fiber optic equipment drawer 20 is prevented from further extending out from the chassis 12. One or more than two drawer pull-out limiting members 66 may also be provided. More detail regarding the drawer pull-out limiting members 66 in this embodiment is described below with regard to FIGS. 10A-10B.

With continuing reference to FIG. 7, the front panel 58 and rear panel 60 in this embodiment allow the fiber optic equipment drawer 20 to be tilted downward when pulled out from the chassis 12. The front panel 58 is configured to tilt about the rear panel 60 and the chassis 12 via a hinge 70 formed and disposed between the front panel 58 and the rear panel 60. Any fiber optic equipment, including fiber optic equipment trays 22 and fiber optic modules 26 disposed in the front panel 58, will also tilt downward as a result of the front panel 58 being tilted downward. The flanges 69 provided as part of the rear panel 60 each contain a tilt limiting member 72 to limit the downward tilting of the fiber optic equipment drawer 20 about the rear panel 60 and the chassis 12. One or more than two tilt drawer limiting members 72 may also be provided. More detail regarding the tilting ability of the fiber optic equipment drawer 20 and the drawer tilt limiting members 72 to limit the tilt angle of the fiber optic equipment drawer 20 is described below with regard to FIGS. 11A-14.

With continuing reference to FIG. 7, the fiber optic equipment drawer 20 in this embodiment also includes two tray guides 74 each disposed on a left side end 76 and a right side end 78 of the fiber optic equipment drawer 20. The tray guides 74 are disposed on left and right side members 79, 80 disposed generally orthogonally to a base 82 of the front panel 58. The tray guides 74 are configured to receive one or more fiber optic equipment trays 22 each supporting one or more fiber optic modules 22, as previously discussed and illustrated in FIG. 6. The tray guides 74 in this embodiment are comprised of a plurality of tray rail guides 84 each configured to receive a tray rail of a fiber optic equipment tray 22. In this manner, the fiber optic equipment trays 22 can be moved in and out of the fiber optic equipment drawer 20 by moving the tray rails about the tray rail guides 84. More detail regarding the tray guides 74 included in the fiber optic equipment drawer 20 to support fiber optic equipment trays 22 is described below with regard to FIGS. 15-20.

Figure 8A:
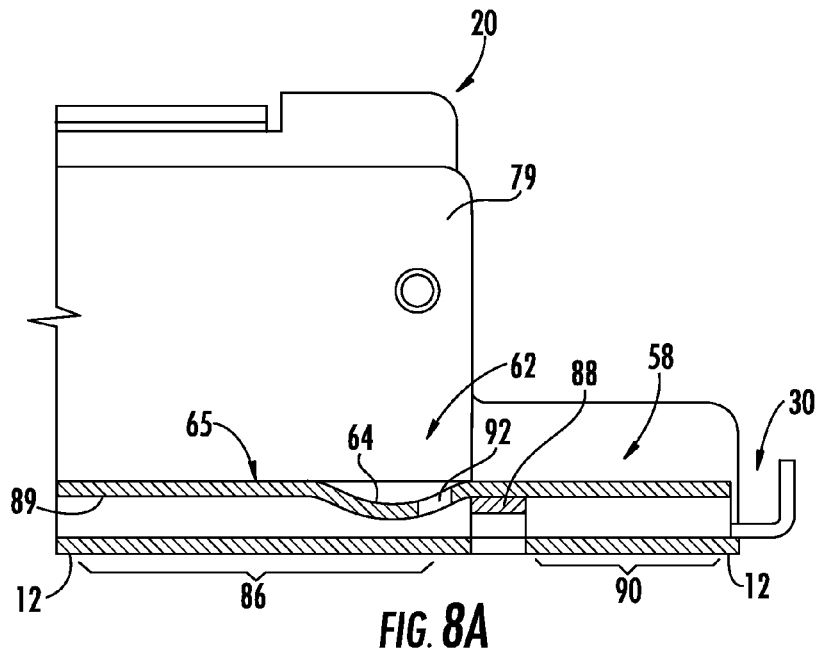
FIG. 8A is a left side, cross-section view of an exemplary drawer retention member in the fiber optic equipment drawer of FIG. 1 retained in the chassis.
Figure 8B:
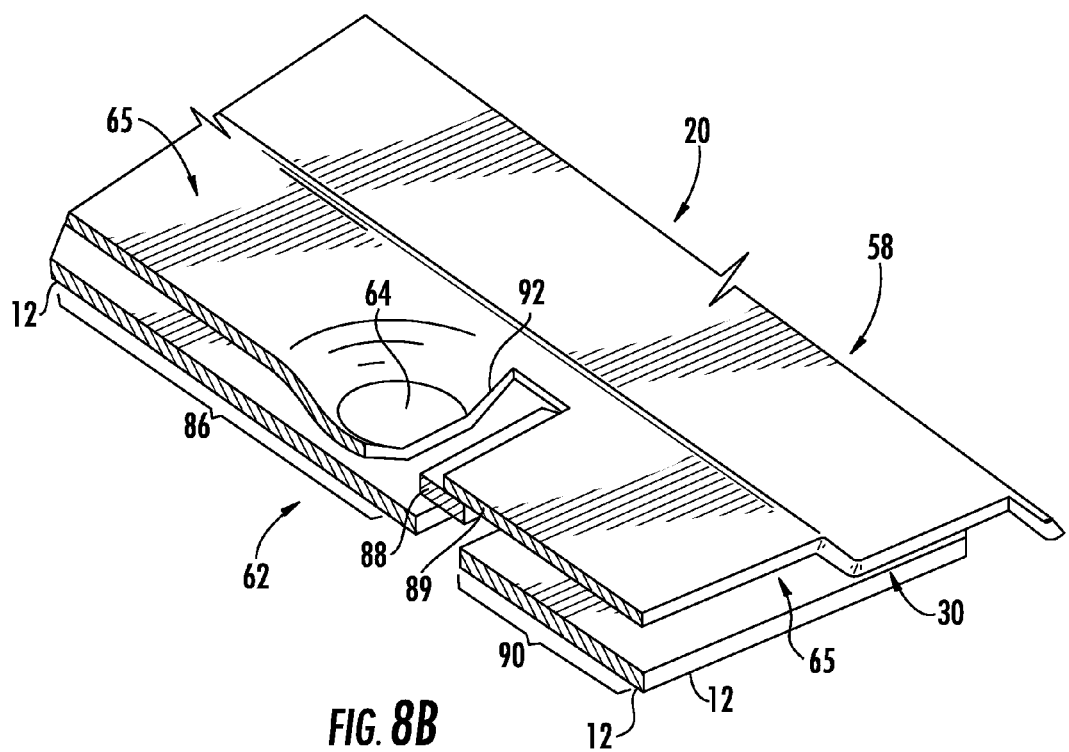
FIG. 8B is a top perspective, cross-section view of the drawer retention member illustrated in FIG. 8A.
Figure 9A:
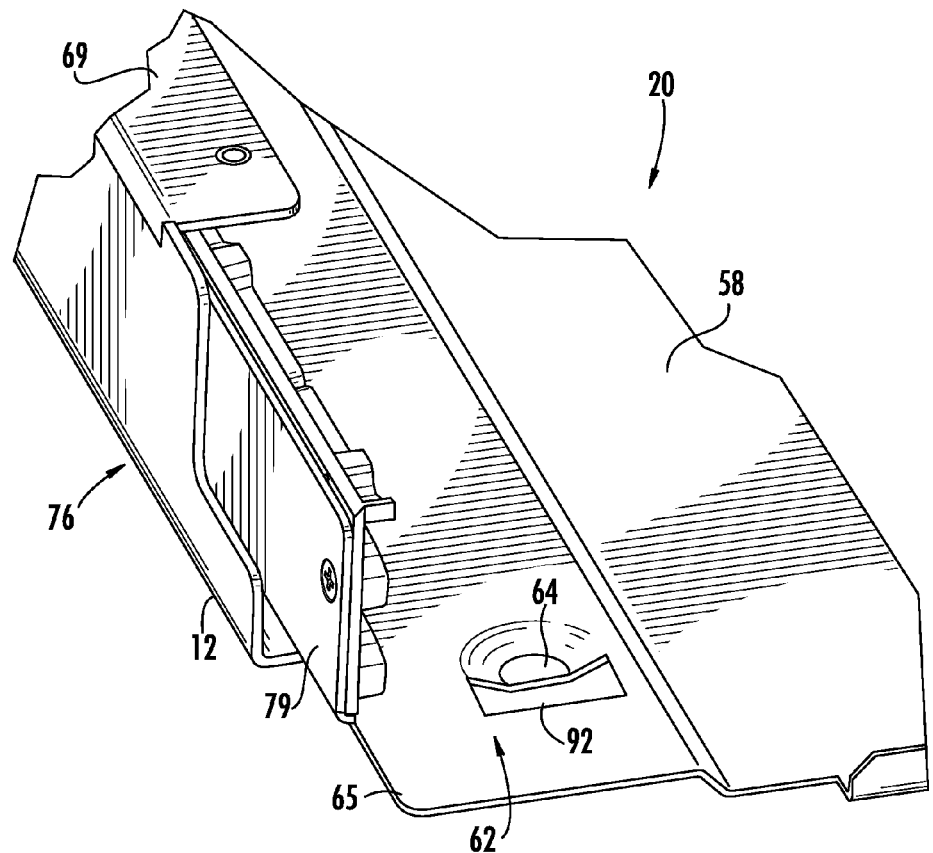
FIG. 9A is a top perspective, close-up view of the drawer retention member of the fiber optic equipment drawer of FIG. 1 pulled out from the chassis.
Figure 9B:
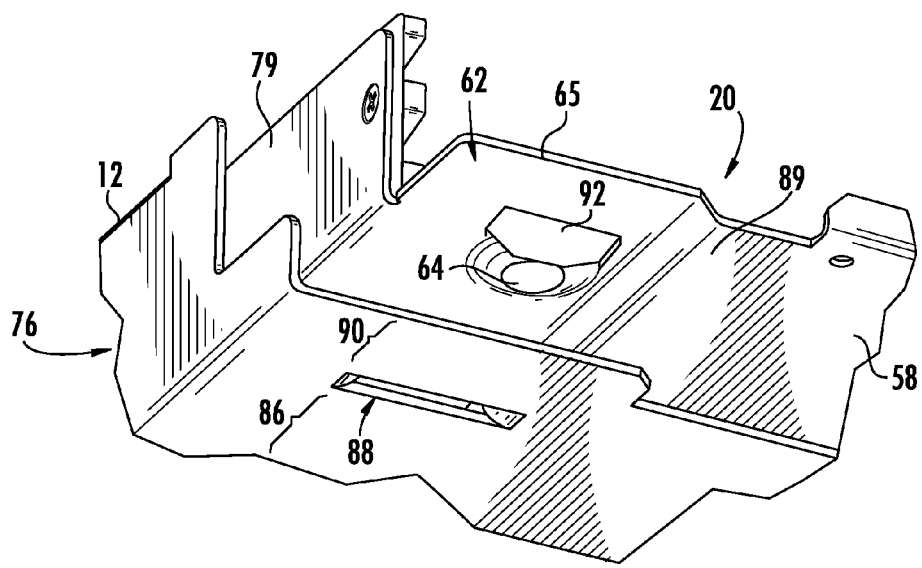
FIG. 9B is a bottom perspective, close-up view of the drawer retention member illustrated in FIG. 9A.

FIGS. 8A-9B illustrate more detail regarding the drawer retention members 62 disposed in the fiber optic equipment drawer 20. The drawer retention members 62 retain the fiber optic equipment drawer 20 in the chassis 12 when retracted in the chassis 12. FIGS. 8A and 8B illustrate side and perspective cross-section views, respectively, of one drawer retention member 62 and the surrounding front panel 58 of the fiber optic equipment drawer 20 and chassis 12 when the fiber optic equipment drawer 20 is refracted and retained in the chassis 12. As illustrated, the emboss 64 is disposed on the raised section 65 of the front panel 58 on the left side end 76 of the fiber optic equipment drawer 20. Note that another emboss 64 not illustrated in FIGS. 8A and 8B is also disposed on the right side end 78 of the fiber optic equipment drawer 20, as illustrated in FIG. 6. In FIGS. 8A and 8B, the emboss 64 is located on a rearward side 86 of a lance 88 retaining the fiber optic equipment drawer 20 in the chassis 12. The lance 88 is disposed in the chassis 12 to protrude above the chassis 12 adjacent to a bottom side 89 of the front panel 58. When it is desired to pull the fiber optic equipment drawer 20 out from the chassis 12, a pulling force can be applied such that the emboss 64 will be pulled into the lance 88. With enough pulling force, the emboss 64 will drag across the lance 88 raising the front panel 58 over the lance 88 until the emboss 64 is pulled on a frontward side 90 of the lance 88, as illustrated in FIGS. 9A-9B. The fiber optic equipment drawer 20 will thereafter be released from the chassis 12. In this embodiment, optional keys 92 are cut into the emboss 64 to reduce the pulling force necessary for the emboss 64 to clear the interference with the lances 88. The keys 92 can also serve to interfere with the lances 88 to retain the fiber optic equipment drawer 20 in a closed position. Also note in this embodiment, the embosses 64 are disposed in the raised sections 65 of the front panel 58 so the front panel 58 is clear of interference with the lances 88 when the fiber optic equipment drawer 20 is pulled out from the chassis 12.

Figure 10A:
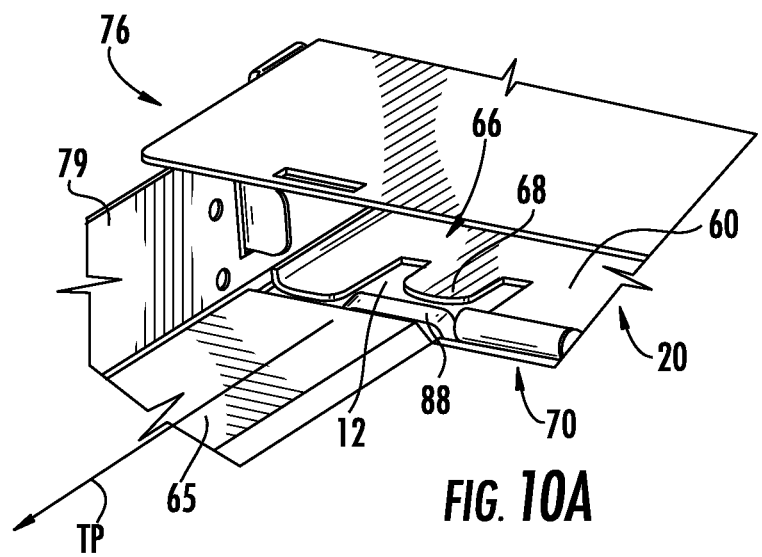
FIG. 10A is a front perspective view of a rear panel of the fiber optic equipment drawer of FIG. 1 illustrating an exemplary drawer pull-out limiting member just prior to the fiber optic equipment drawer being fully pulled out from the chassis.
Figure 10B:
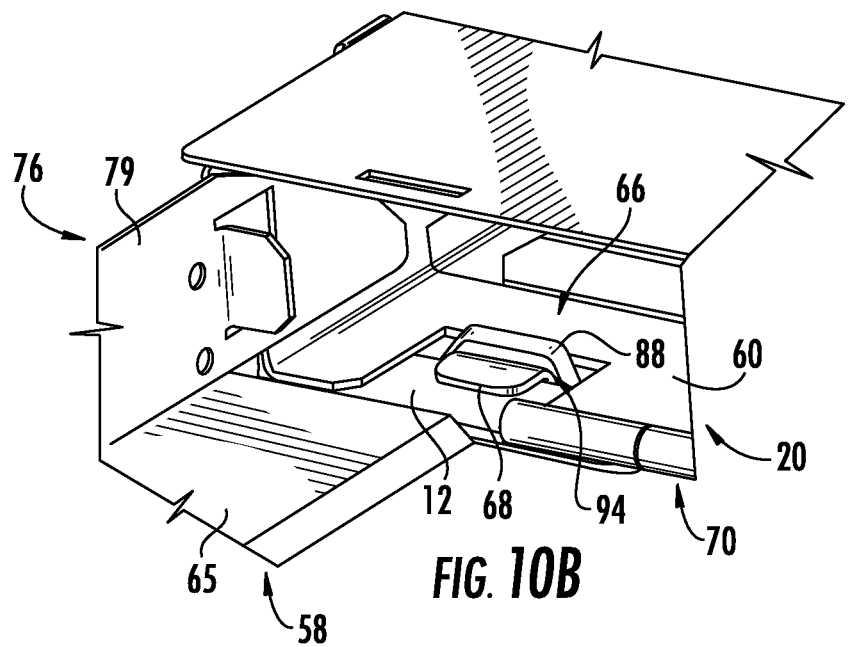
FIG. 10B is a front perspective view of a rear panel of the fiber optic equipment drawer of FIG. 1 illustrating the fiber optic equipment drawer pull-out limiting member of FIG. 10A when the fiber optic equipment drawer is fully pulled out from the chassis.

FIGS. 9A and 9B illustrate top and bottom perspective, close-up views of the drawer retention member 62 when the fiber optic equipment drawer 20 has been pulled outward from the chassis 12. After the emboss 64 is located on the frontward side 90 of the lance 88, the fiber optic equipment drawer 20 is free to be pulled out from the chassis 12. In this embodiment, the fiber optic equipment drawer 20 is limited to a certain pull out distance. In this regard, FIGS. 10A and 10B illustrate one of two drawer pull-out limiting members 66 provided in the fiber optic equipment drawer 20. The illustrated drawer pull-out limiting member 66 is disposed on the left side end 76 of the fiber optic equipment drawer 20. Note that another pull out drawer pull-out limiting member 66 not illustrated in FIGS. 10A and 10B is also disposed on the right side end 78 of the fiber optic equipment drawer 20, as illustrated in FIG. 6. FIG. 10A is a front perspective view of the drawer pull-out limiting member 66 disposed in the rear panel 60 of the fiber optic equipment drawer 20 just prior to the fiber optic equipment drawer 20 being fully extended from the chassis 12. As illustrated, the tab 68 disposed in the rear panel 60 of the fiber optic equipment drawer 20 is aligned with the lance 88 disposed in the chassis 12. The front and rear panels 58, 60 sit above the chassis 12 and are free to move about the chassis 12 once the fiber optic equipment drawer 20 is released from the drawer retention member 62. However, the lance 88 is disposed about the chassis 12 in the travel plane TP of the tab 68. When the rear panel 60 is almost fully extended as illustrated in FIG. 10A, the tab 68 is configured to enter an opening 94 disposed in the lance 88. The rear panel 60 and thus the fiber optic equipment drawer 20 is prevented from extending out further from the chassis 12 once the tab 68 is fully engaged with the opening 94 in the lance 88, as illustrated in FIG. 10B. In this manner, the tab 68 and lance 88 provide the drawer pull-out limiting member 66 to limit the pull out distance of the fiber optic equipment drawer 20.

Figure 11A:
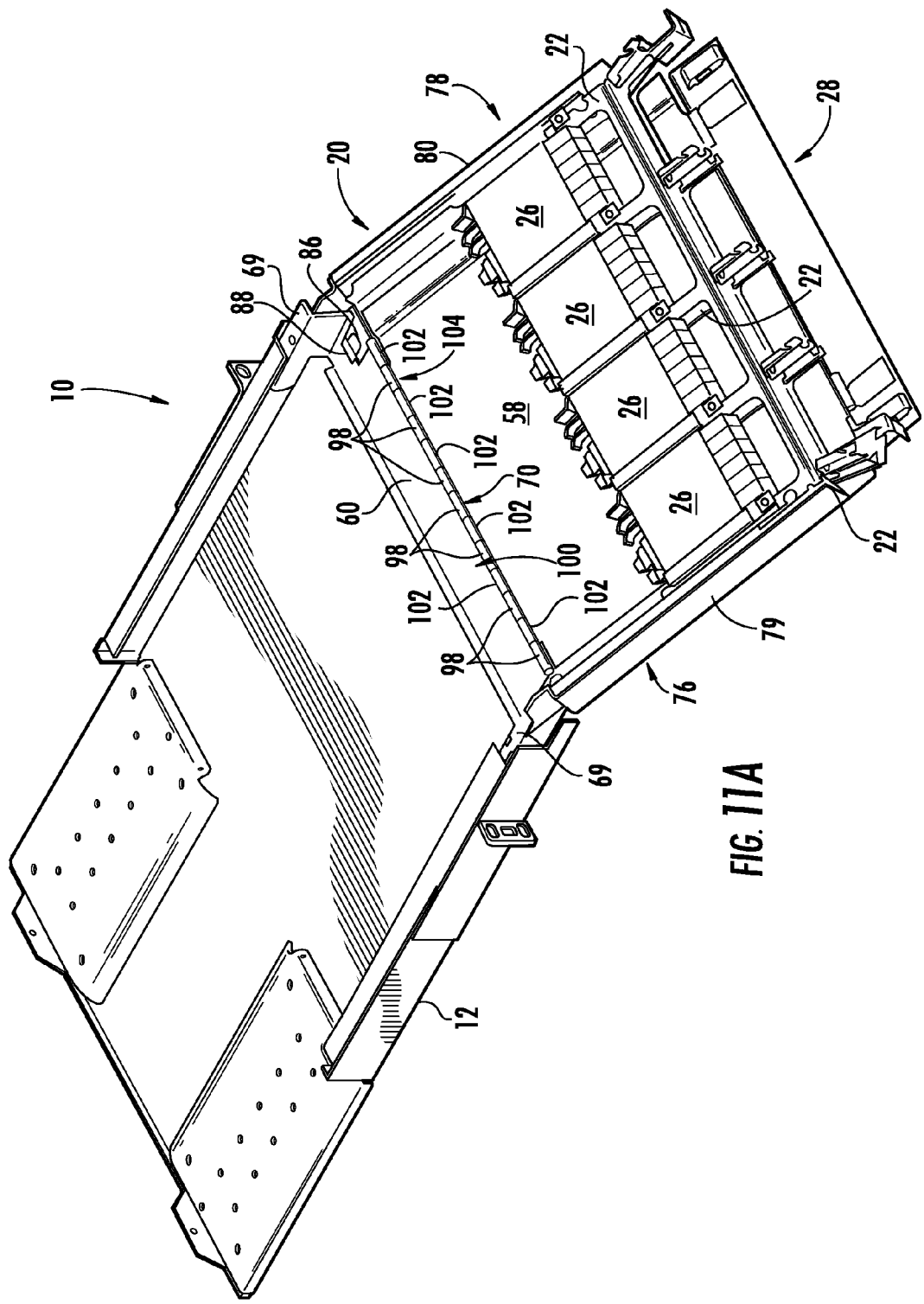
FIG. 11A is a front perspective view of the fiber optic equipment drawer of FIG. 1 fully pulled out from the chassis and tilted downward.
Figure 11B:
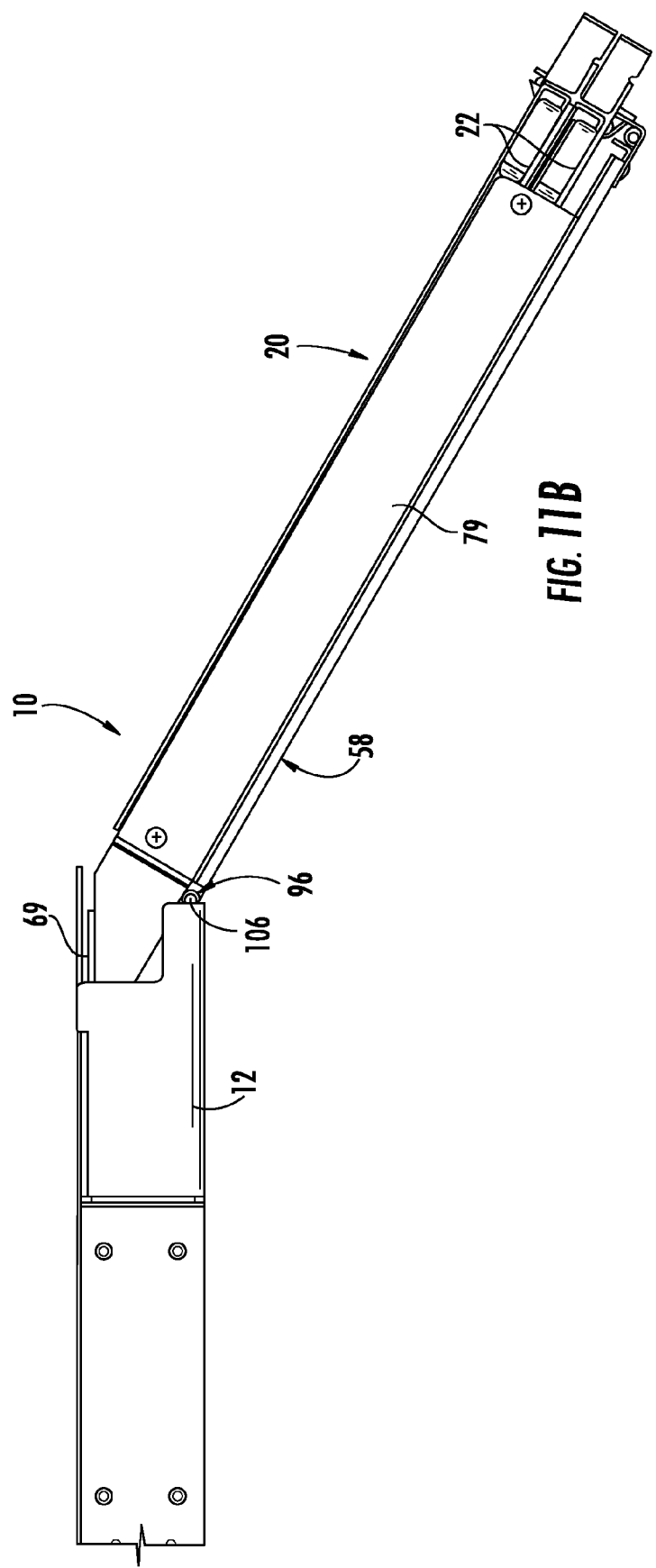
FIG. 11B is a side view of the fiber optic equipment drawer in FIG. 11A.

FIGS. 11A-14 illustrate tilt and tilt limiting features of the fiber optic equipment drawer 20 according to one embodiment. FIGS. 11A and 11B illustrate the fiber optic equipment drawer 20 pulled out from the chassis 12 and tilted downward about the chassis 12. As previously discussed, tilting the fiber optic equipment drawer 20 downward can provide enhanced access to the fiber optic equipment trays 22 and the fiber optic modules 26 disposed in the fiber optic equipment trays 22 and/or their fiber optic connections. FIG. 11A illustrates a front perspective view of the fiber optic equipment drawer 20 pulled out from the chassis 12 and tilted downward. FIG. 11B is a side view of the orientation of the fiber optic equipment drawer 20 illustrated in FIG. 11A. In this embodiment, the front panel 58 can tilt downward about the rear panel 60. The rear panel 60 remains oriented in a plane parallel or substantially parallel to the chassis 12. Because the fiber optic equipment trays 22 and fiber optic modules 26 contained therein are disposed in the front panel 58, tilting of the front panel 58 also tilts the fiber optic equipment trays 22 and fiber optic modules 26 for access.

The fiber optic equipment drawer 20 is configured to tilt downward via the hinge 70 disposed between the front panel 58 and the rear panel 60 of the fiber optic equipment drawer 20 in this embodiment. The hinge 70 is formed by rolled portions 98 on a front end 100 of the rear panel 60 interleaved with rolled portions 102 on a rear end 104 of the front panel 58. When interleaved, the rolled portions 98, 102 form a passage (not shown) therebetween extending from the left side end 76 to the right side end 78 of the front and rear panels 58, 60. A rod (not shown) is extended through a passage 106 (FIG. 11B) to maintain the rolled portions 98, 102 interleaved together to provide the hinge 70. When the fiber optic equipment drawer 20 is pulled out such that the front panel 58 is pulled out beyond the chassis 12, the front panel 58 is free to tilt downward about the hinge 70. The tilt angle is controlled by drawer tilt limiting members 72 as illustrated in FIGS. 12-14 and described below.

Figure 12:
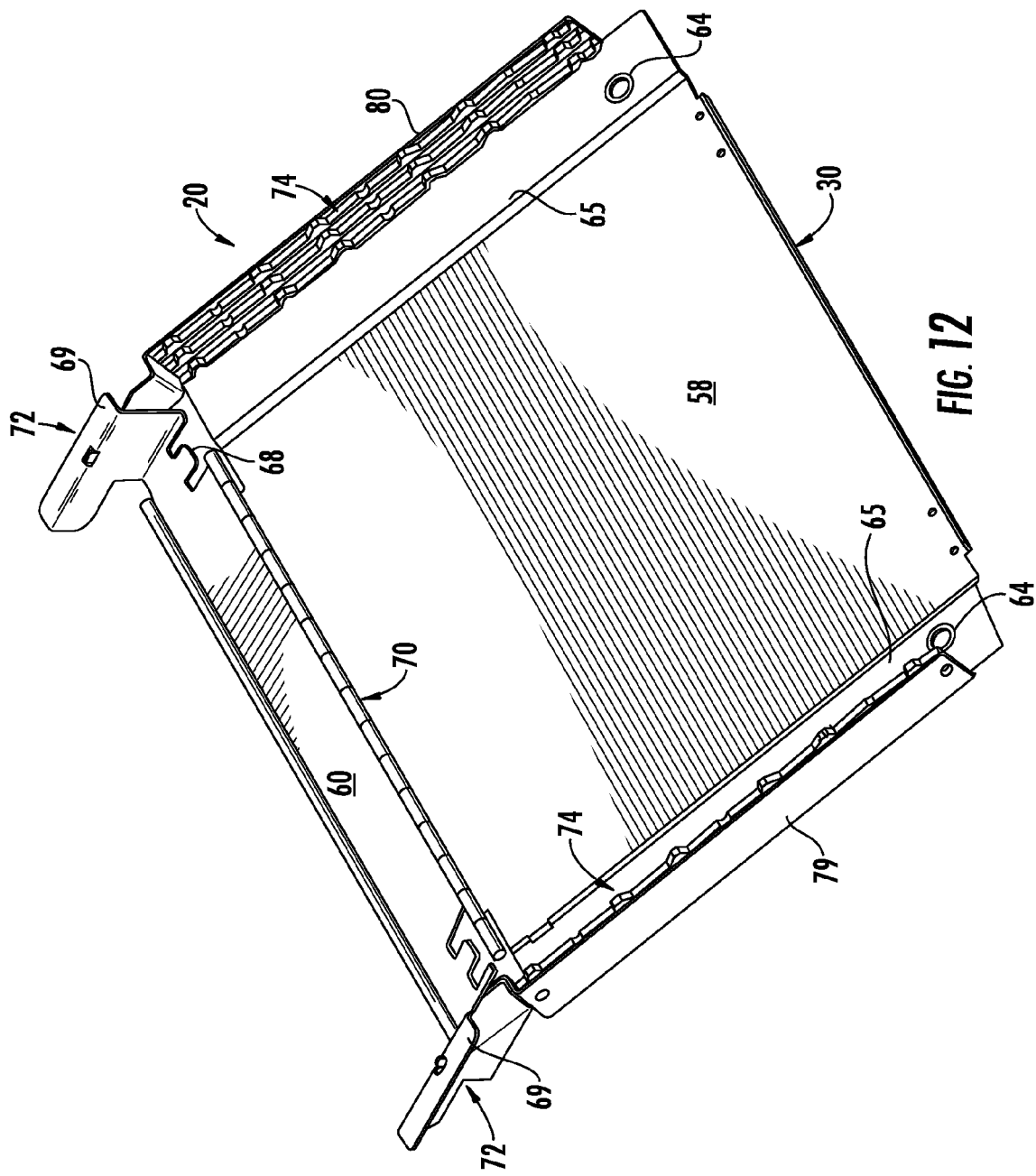
FIG. 12 is a front perspective view of the fiber optic equipment drawer of FIG. 1 without installed fiber optic equipment trays and modules and tilted downward.
Figure 13A:
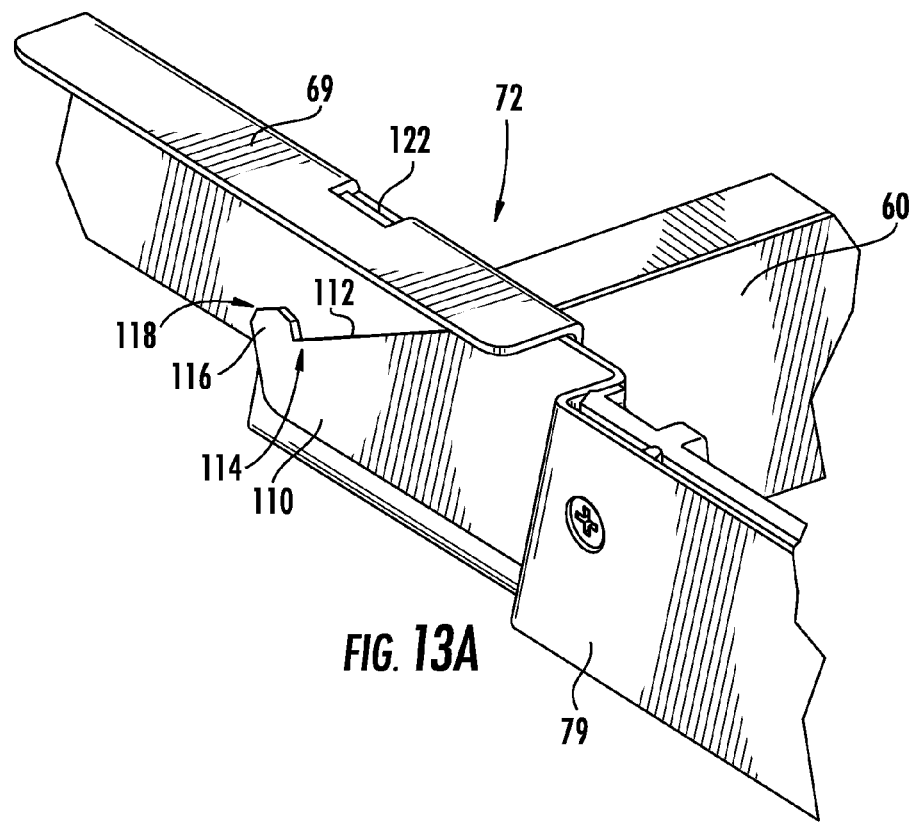
FIG. 13A is a top perspective close-up view of an exemplary tilt limiting member of the fiber optic equipment drawer of FIG. 1 when the fiber optic equipment drawer is pulled out from the chassis and not tilted.
Figure 13B:
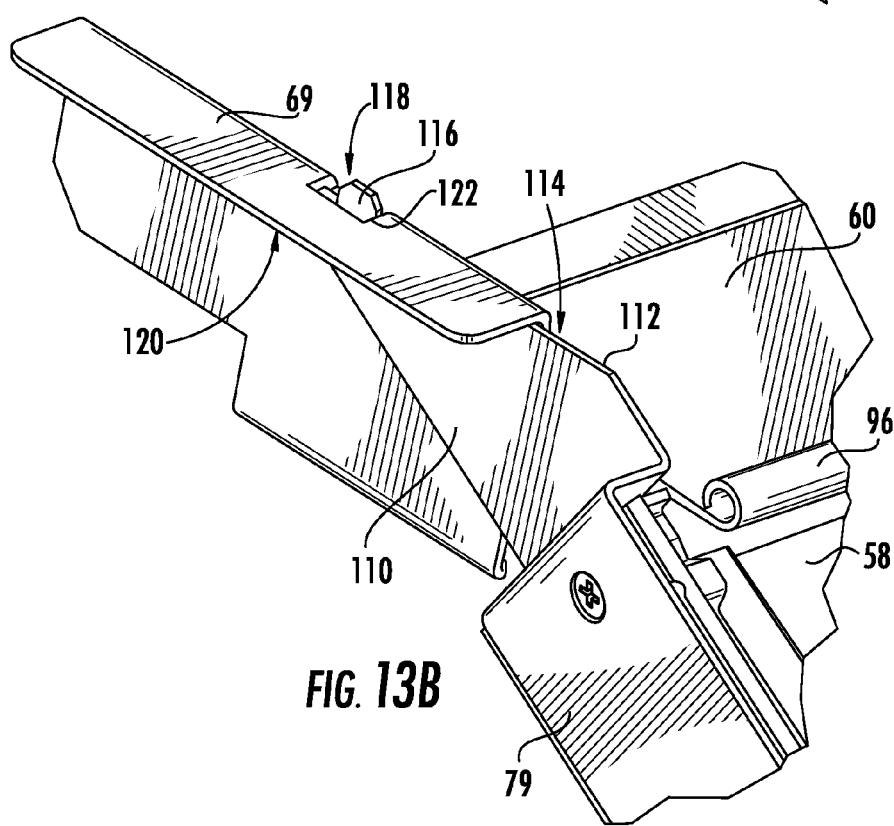
FIG. 13B is a top perspective close-up view of the tilt limiting member of FIG. 13A when the fiber optic equipment drawer is fully pulled out from the chassis and tilted downward.
Figure 13C:
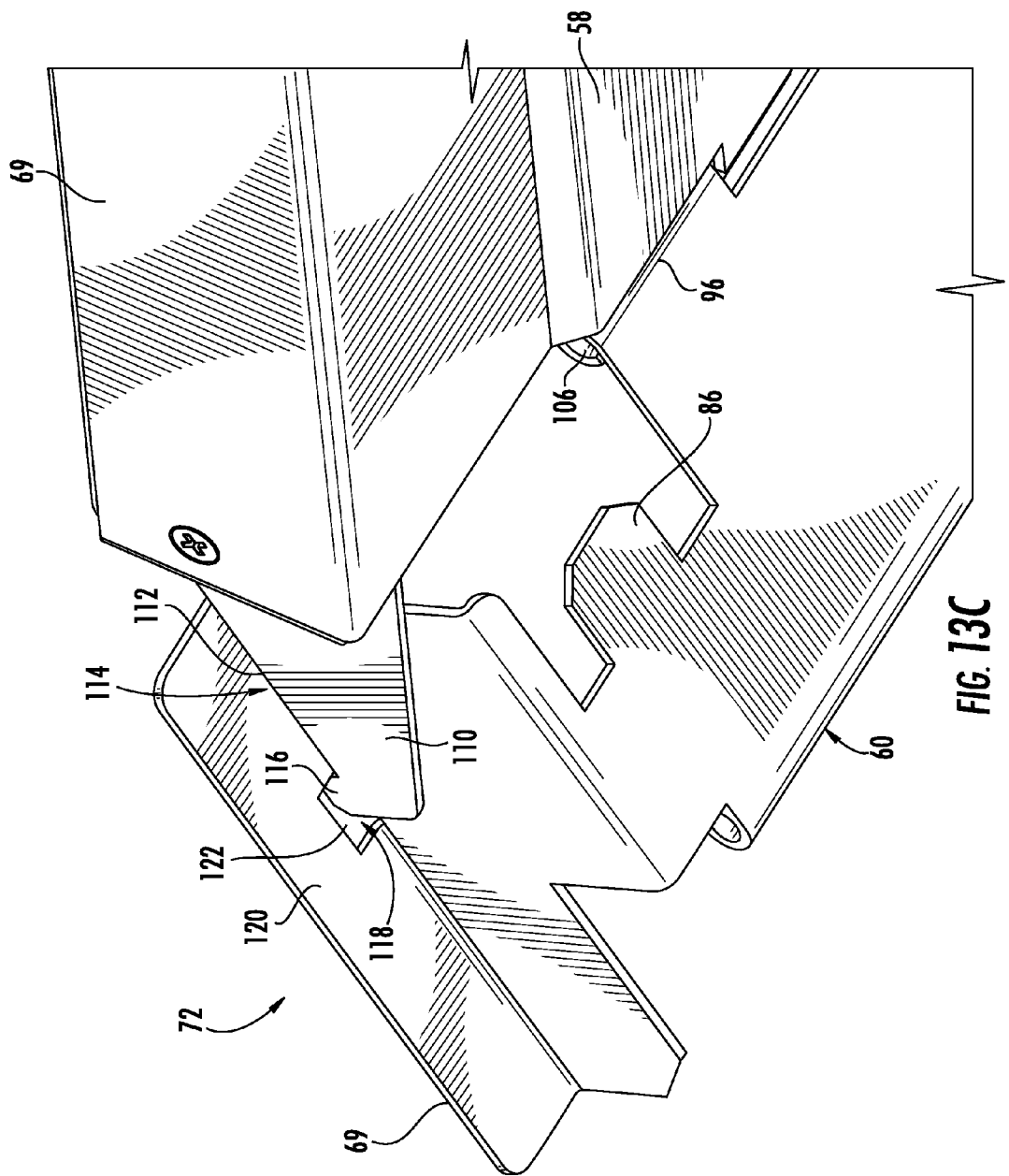
FIG. 13C is a bottom perspective close-up view of FIG. 13B.

FIG. 12 illustrates a front perspective view of the fiber optic equipment drawer 20 tilted downward without installed fiber optic equipment trays 22 and fiber optic modules 26. As illustrated therein, the tilt angle of the front panel 58 of the fiber optic equipment drawer 20 is limited by the drawer tilt limiting members 72 and the flanges 69. FIGS. 13A-13C illustrate the drawer tilting limiting members 72 in more detail. As illustrated in FIGS. 13A-13C, the illustrated drawer tilt limiting member 72 is provided on the left side end 76 of the fiber optic equipment drawer 20. Note that another drawer tilt limiting member 72 not illustrated in FIGS. 13A-13C is also disposed on the right side end 78 of the fiber optic equipment drawer 20, as illustrated in FIG. 12.

FIG. 13A is a top perspective close-up view of the drawer tilt limiting member 72 when the fiber optic equipment drawer 20 is fully pulled out from the chassis 12, but the front panel 58 is not yet tilted. The drawer tilt limiting member 72 includes a limiting member 110 fixedly attached or provided as a part of the front panel 58 as a single part and arranged orthogonal or substantially orthogonal to the base 82 (FIG. 7) of the front panel 58. The limiting member 110 contains an angle 112 disposed in a top surface 114 of the limiting member 110. A key 116 is disposed on an end section 118 of the limiting member 110 adjacent the angle 112. When the fiber optic equipment drawer 20 is pulled out fully such that the tab 68 is engaged with the lance 88 (FIG. 11A), the front panel 58 can tilt downward about the hinge 70. When the front panel 58 is tilted downward, the hinge 70 provides a fulcrum such that the limiting member 110 moves upward towards the flange 69. The tilt angle of the front panel 58 is limited by the angle 112 in the limiting member 110 and flange 69. The angle 112 in the limiting member 110 will eventually come into planar or substantially planar contact with a bottom side 120 of the flange 69, as illustrated in FIGS. 13B and 13C, to prevent further tilting of the front panel 58. FIG. 13C illustrates a bottom perspective view of the drawer tilt limiting member 72 of FIG. 13B.

To prevent the fiber optic equipment drawer 20 from inadvertently being pushed back into the chassis 12 when tilted, a notch 122 is disposed in the flange 69 as part of the drawer tilt limiting member 72. The notch 122 is configured to receive the key 116 disposed in the limiting member 110. When the key 116 is received in the notch 122, the fiber optic equipment drawer 20 cannot be pushed back into the chassis 12. When it is desired to retract the fiber optic equipment drawer 20 back into the chassis 12, a force is applied to pull up the front panel 58 to reduce the tilt angle thereby pushing the key 116 downward and out of the notch 122. While continuing to pull or hold up the front panel 58, the fiber optic equipment drawer 20 is free to be pushed back into the chassis 12. In this embodiment, the drawer tilt limiting members 72 are not provided as part of the chassis 12. The drawer tilt limiting members 72 are provided as part of the fiber optic equipment drawer 20 in both the front panel 58 and the rear panel 60. In this manner, the fiber optic equipment drawer 20 is not required to provide a fixed connection or linkage to the chassis 12. This may be advantageous to provide flexibility and reduced complexity, including in the installation of the fiber optic equipment drawers 20 in the chassis 12. The drawer tilt limiting members 72 are not required to be limited to the fiber optic equipment drawer 20.

Figure 13D:
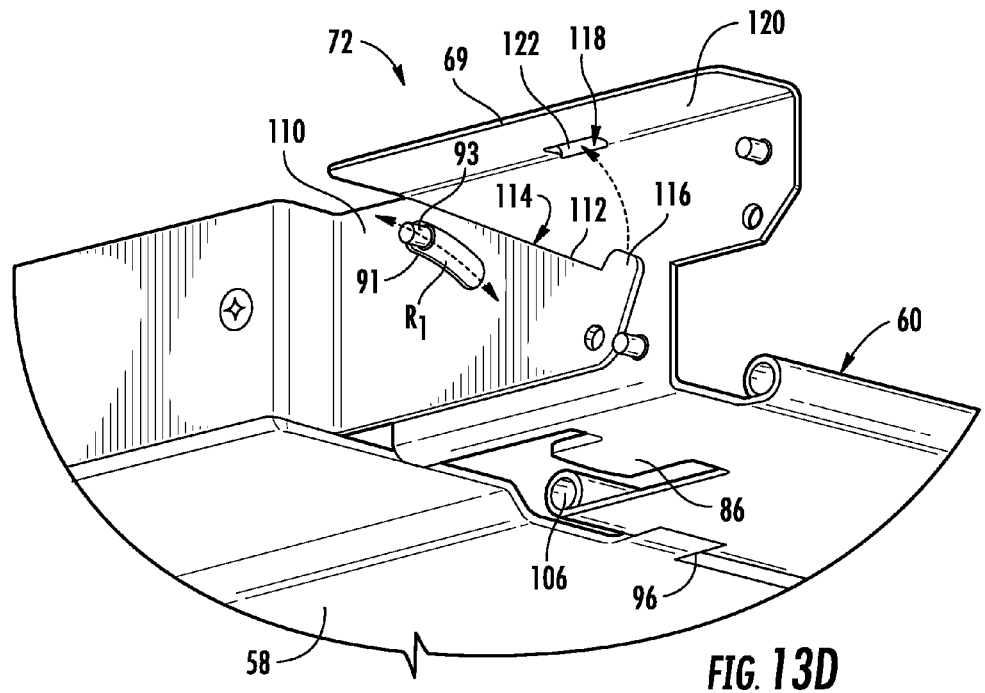
FIG. 13D is a close-up bottom perspective view of the tilt limiting member of FIG. 13A including a slot to further limit the tilt angle of the fiber optic equipment drawer.
Figure 13E:
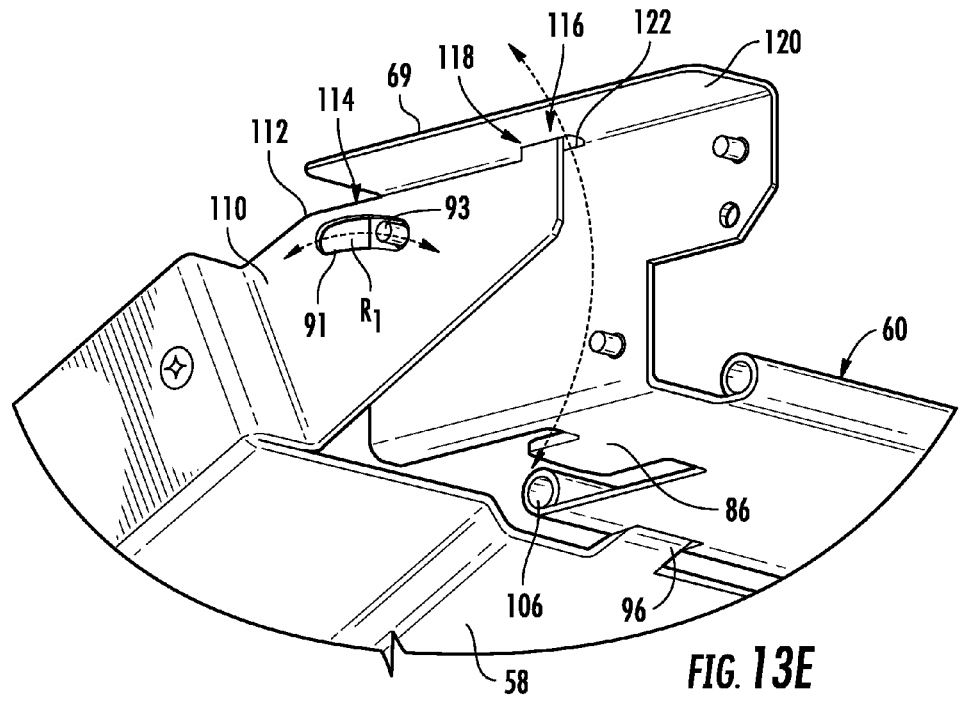
FIG. 13E is a bottom perspective view of FIG. 13D with the fiber optic equipment drawer tilted downward.

As discussed above, the key 116 and the angle 112 disposed in the tilt limiting member 72 limits the tilting of the front panel 58 about the rear panel 60 in the embodiments of FIG. 13A-13C. It may also be desired to provide an additional tilt limiting member to provide supplemental tilt limiting of the front panel 58 about the rear panel 60. In this regard, FIGS. 13D and 13E are close-up, bottom perspective views of the tilt limiting member 72 of FIGS. 13A-13C, but further including an optional slot 91 disposed in the limiting member 110. The slot 91 is configured to further limit the tilt angle of the front panel 58. The front panel 58 illustrated in FIG. 13D is not tilted. The front panel 58 illustrated in FIG. 13E is tilted. In this regard, a pin 93 is attached to and extends outward from the flange 69 in this embodiment. The pin 93 is configured to engage with the slot 91 disposed in the limiting member 110 when the fiber optic equipment drawer 20 is assembled. The slot 91 confines the boundary of movement of the pin 93, and thus also limits tilting of the front panel 58 about the rear panel 60 since the pin 93 is attached to the flange 69, which is part of the rear panel 60.

The slot 91 is radial in shape such that the pin 93 moves along the radius of the slot thus allowing the front panel 58 to tilt. The radial length $R_1$ of the slot 91, as illustrated in FIGS. 13D and 13E, controls the maximum tilt angle of the front panel 58 in addition to the angle 112 disposed in the limiting member 110. Note that the limiting member 110 does not require the slot 91 and pin 93 arrangement discussed herein to limit the tilt angle of the front panel 58. Further, the slot 91 and pin 93 arrangement could be provided in the fiber optic equipment drawer 20 in lieu of the key 116 and angle 112 disposed in the limiting member 110 arrangement.

As previously discussed above, the flanges 69 are provided as part of the rear panel 60 to ride along the inside of the chassis 12 as the fiber optic equipment drawer 20 is pulled out from the chassis 12. The flanges 69 provided as part of the rear panel 60 each contain the tilt limiting members 72 to limit the downward tilting of the fiber optic equipment drawer 20 about the rear panel 60 and the chassis 12. As the flanges 69 ride inside the chassis 12, the flanges 69 may move inward or outward from the rear panel 60, and splay with regard to the front panel 58. In this regard, optional control plate 95 may be provided as illustrated in FIGS. 13G-13L and discussed in more detail below.

Figure 13F:
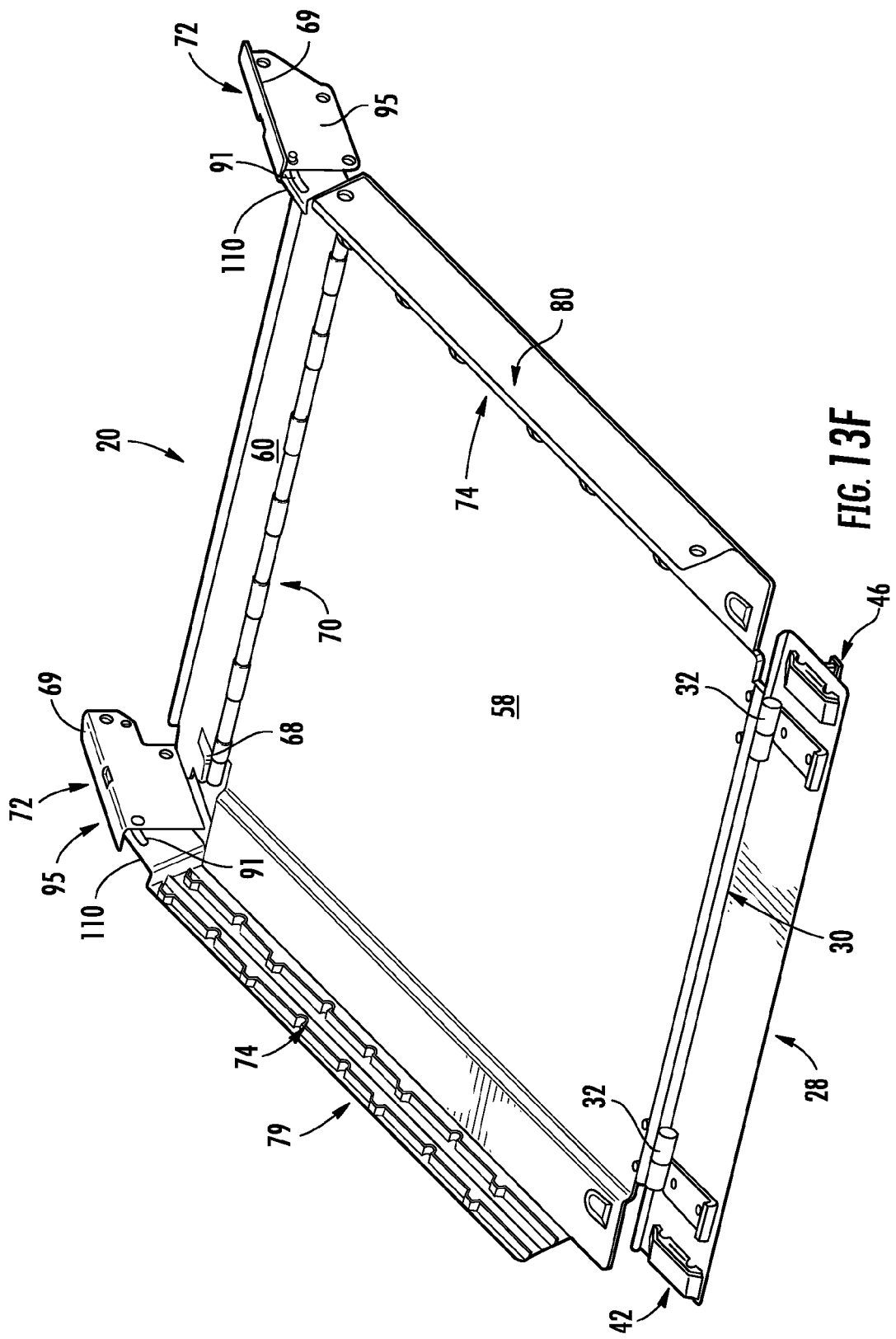
FIG. 13F is a front, right perspective view of the fiber optic equipment drawer of FIG. 7 including the tilt limiting members of FIGS. 13D and 13E disposed between a flange of the fiber optic equipment drawer and a control plate configured to provide splay control for the fiber optic equipment drawer.
Figure 13G:
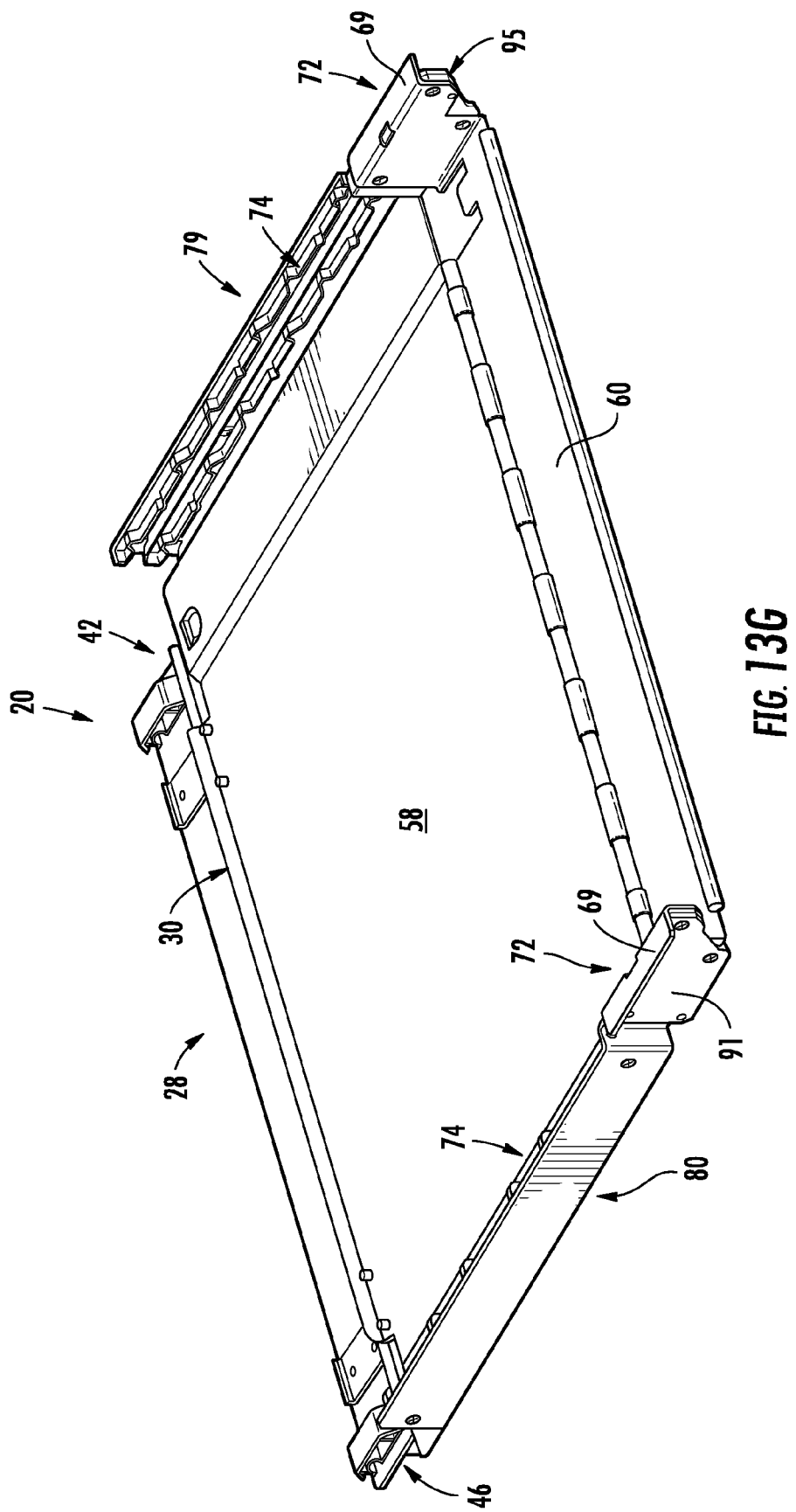
FIG. 13G is a rear, right perspective view of FIG. 13F.

FIGS. 13F and 13G are front and rear perspective views, respectively, of the fiber optic equipment drawer 20 of FIG. 7. The limiting members 110 of FIGS. 13D and 13E are disposed between the flange 69 and the control plate 95. The control plate 95 is configured to provide splay control for the flanges 69 as they move about the chassis 12. Thus, the control plates 95 provide splay control to prevent or reduce splaying of the rear panel 60 with regard to the front panel 58. Providing splay control may provide further stability between the fiber optic equipment drawer 20 and the chassis 12. FIGS. 13H-13L illustrate more detail regarding embodiments of the controls plates 95 and will be described below.

Figure 13H:
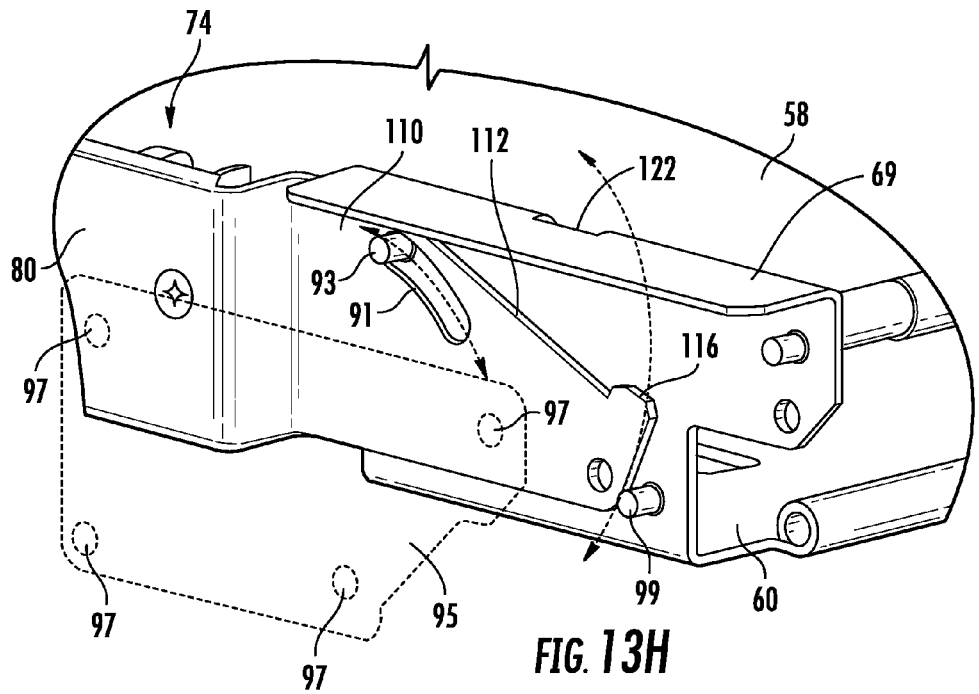
FIGS. 13H and 13I are close-up, left and right perspective views, respectively, of the fiber optic equipment drawer and the tilt limiting member in FIGS. 13F and 13G illustrating an example of how a control plate can be attached to the flanges of the fiber optic equipment drawer.
Figure 13I:
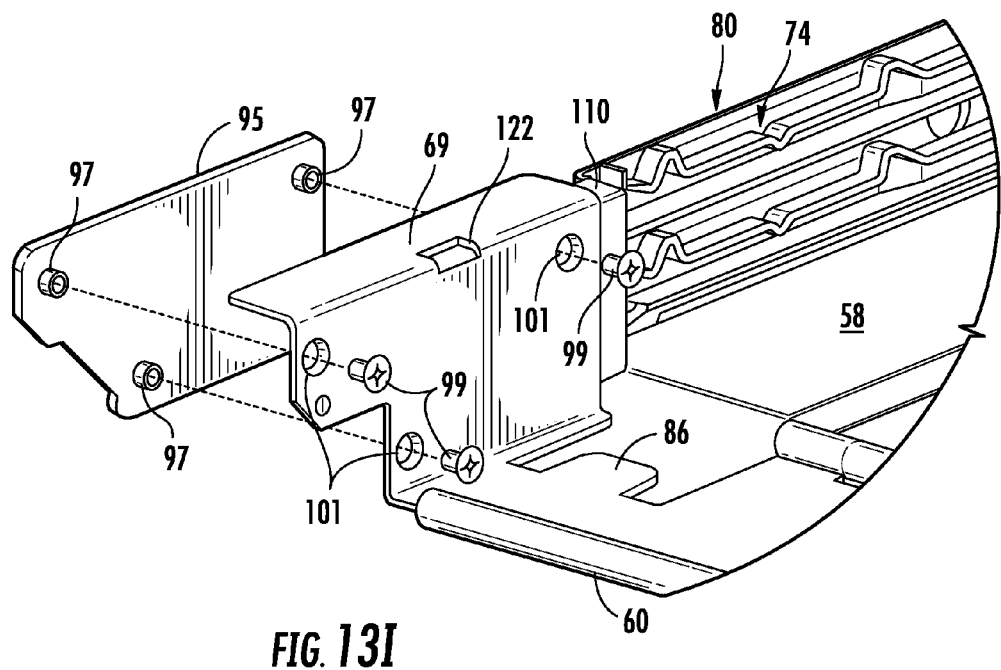

FIGS. 13H and 13I are close-up, left and right perspective views, respectively, of the fiber optic equipment drawer 20 and the tilt limiting member 72 in FIGS. 13F and 13G. FIGS. 13H and 13I illustrate an example of how the control plate 95 can be attached to the flanges 69 attached to the rear panel 60. FIG. 13H illustrates the control plate 95 in outline form so that the relationship of the control plate 95 to the limiting member 110 and the flange 69 can be easily viewed. FIG. 13I illustrates how the control plate 95 can be attached to the flange 69 in this embodiment. In this embodiment, the control plate 95 is attached to the flange 69 such that the limiting member 110 is disposed between the control plate 95 and the flange 69. If the limiting member 110 moves outward from the flange 69, such as when the front and rear panels 58, 60 are moving about the chassis 12, the control plate 95 will limit movement of the flange 69 in this direction. In this regard, the control plate 95 controls splaying of the rear panel 60 and thus the front panel 58. The flange 69 will limit the movement of the limiting member 110 in the inward direction.

Figure 13J:
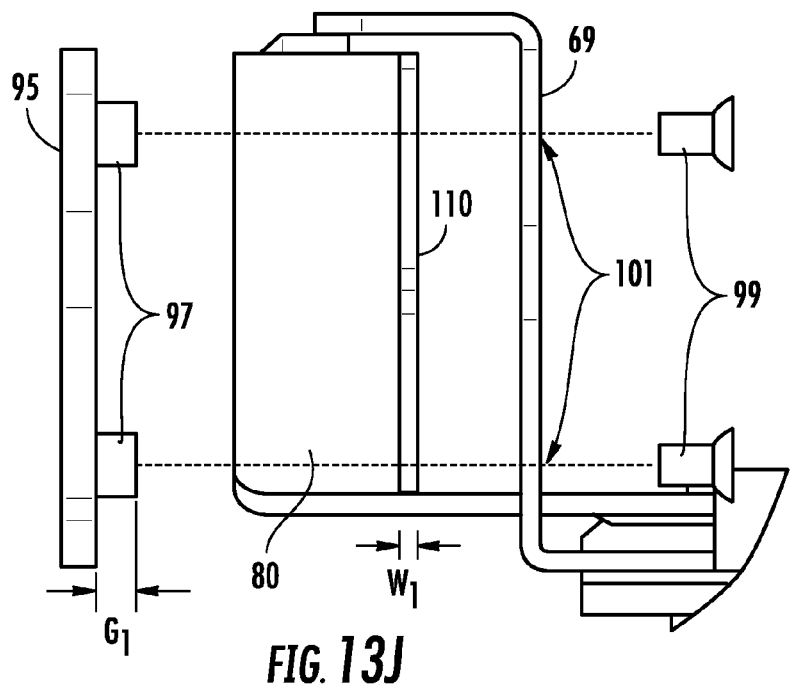
FIG. 13J is a close-up side view of the fiber optic equipment drawer and the tilt limiting member in FIGS. 13F and 13G illustrating an exemplary alignment of the control plate to the tilt limiting member and a flange of the fiber optic equipment drawer.
Figure 13K:
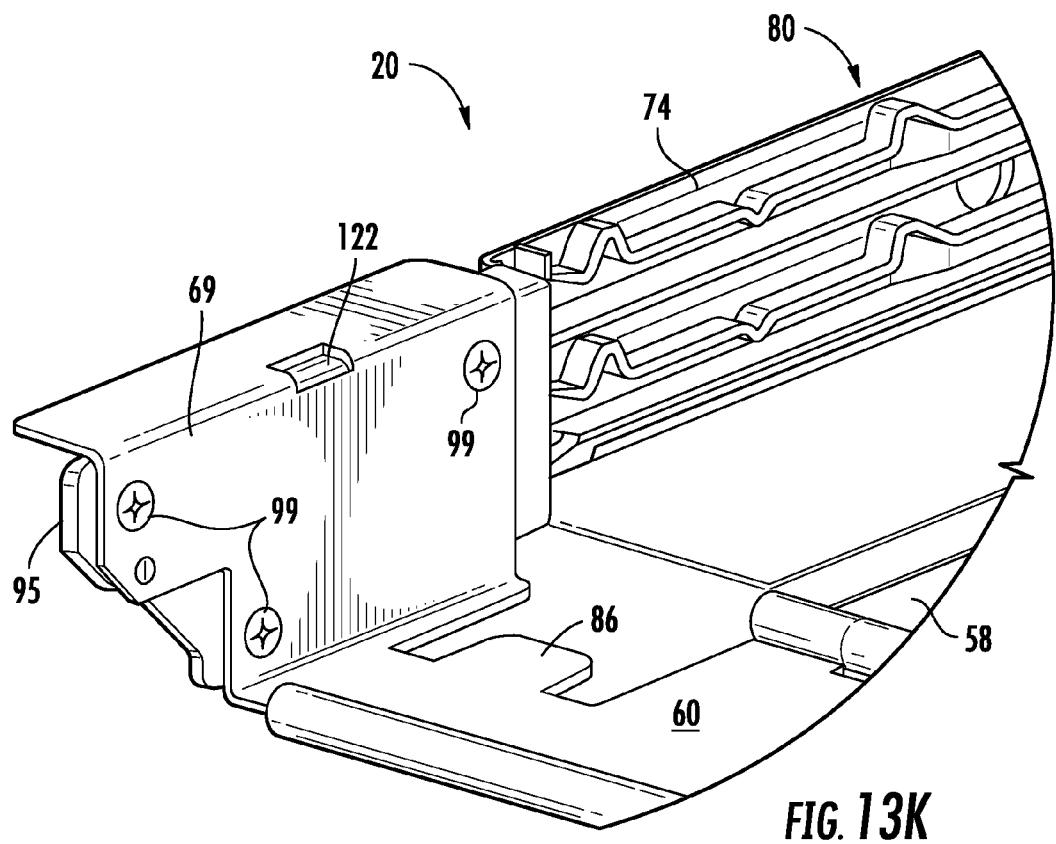
FIG. 13K is a close-up, right perspective view of the control plate attached to the flange of the fiber optic equipment drawer of FIGS. 13E and 13F.
Figure 13L:
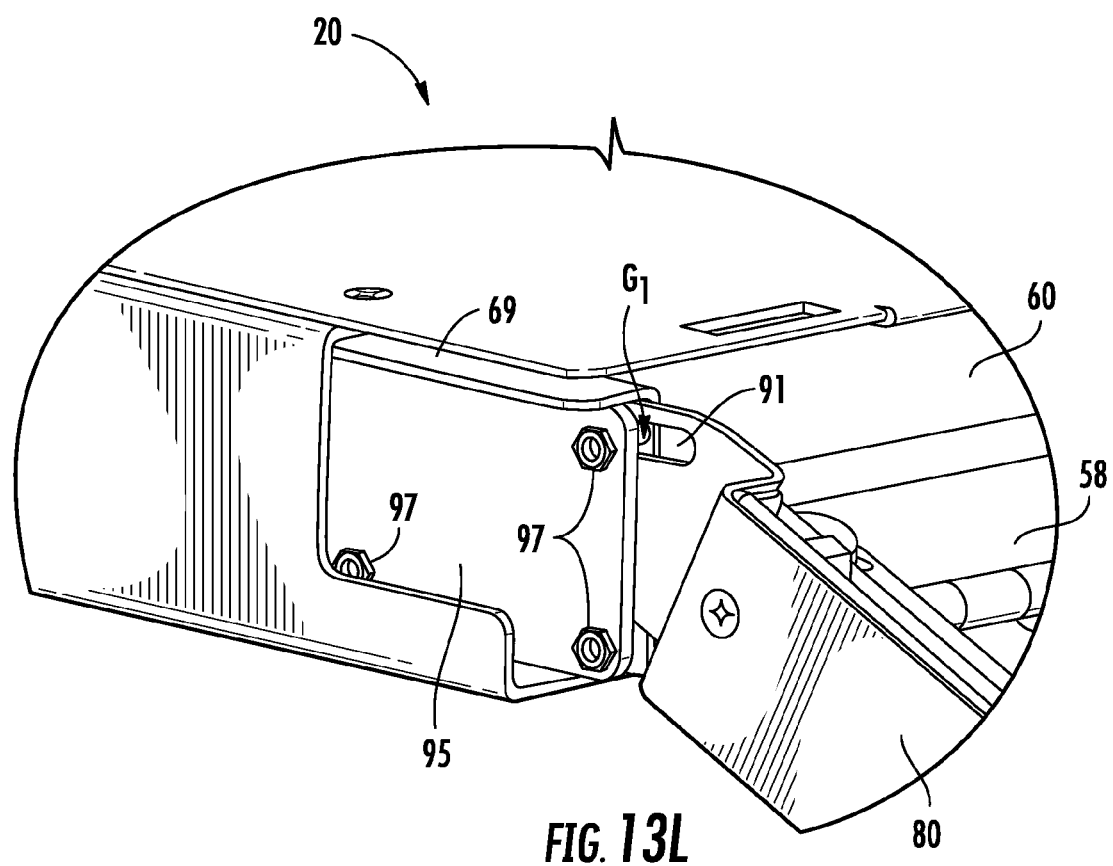
FIG. 13L is a close-up, left perspective view of the control plate attached to the fiber optic equipment drawer of FIGS. 13E and 13F with the fiber optic equipment drawer tilted downward.

As illustrated in FIGS. 13H and 13I, the control plate 95 contains a plurality of standoff receptacles 97 in this embodiment. The standoff receptacles 97 are configured to provide a gap $G_1$ between the control plate 95 and the flange 69, as illustrated in FIG. 13J illustrating the control plate 95, limiting member 110, and flange 69 in a side view. The control plate 95 is secured to the flange 69 via fasteners 99 disposed through orifices 101 in the flange 69 in this embodiment. This is further illustrated in the close-up, right and left perspective views of FIGS. 13K and 13J, respectively. As illustrated therein, the control plate 95 is attached to the flange 69 such that the limiting member 110 is disposed therebetween. With reference back to FIG. 13I, the standoff provided by the standoff receptacles 97 maintains the gap $G_1$ between the control plate 95 and the flange 69 so that the limiting member 110, and thus the front panel 58, is free to tilt downward and be returned in a non-tilting configuration. The gap $G_1$ can be controlled to provide the desired splay control. For example, in one embodiment, the gap $G_1$ may be 0.065 inches. As illustrated in FIG. 13J, the width $W_1$ of the limiting member 110, may be desired to be less than the gap $G_1$ so the limiting member 110 is free to rotate when the front panel 58 is tilted. For example, the width $W_1$ of the limiting member 110 may be 0.060 inches. Note that the control plate 95 is not required to be provided in the fiber optic equipment drawer 20. The control plate 95 can also be provided regardless of whether the slots 91 are provided in the limiting members 110.

Figure 14A:
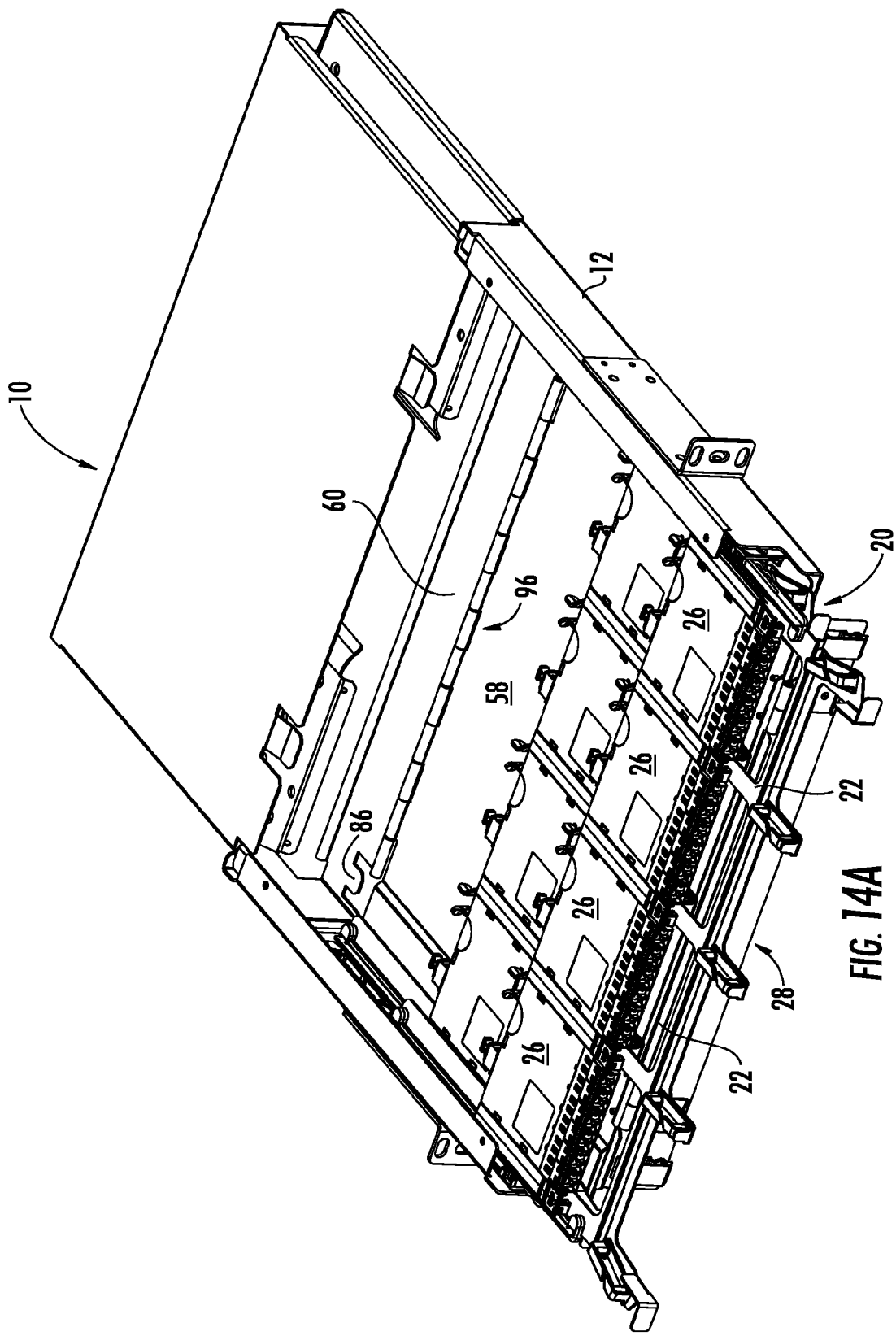
FIG. 14A is a front perspective view of an exemplary fiber optic equipment tray supported by the fiber optic equipment drawer of FIG. 1 and pulled out from the fiber optic equipment drawer.
Figure 14B:
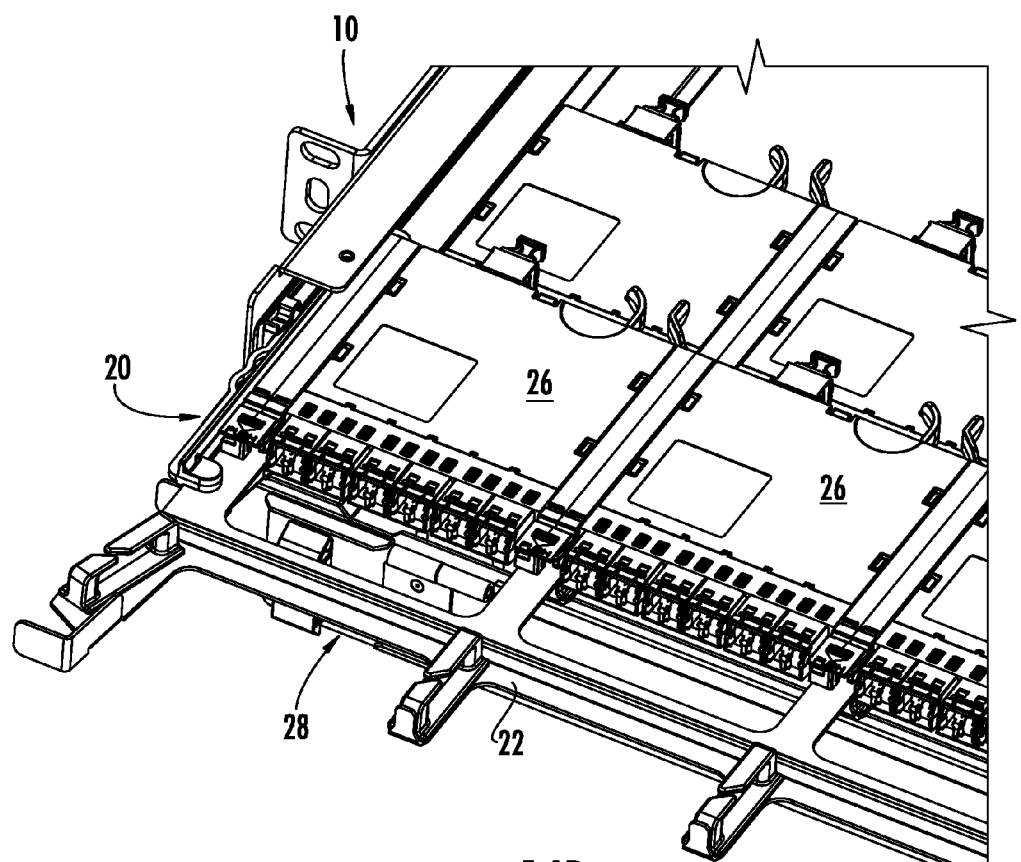
FIG. 14B is a close-up view of the fiber optic equipment tray of FIG. 14A.

Another feature of the fiber optic equipment drawer 20 is support of one or more fiber optic equipment trays 22 which are each configured to support one or more fiber optic modules 26. In this embodiment, the front panel 58 of the fiber optic equipment drawer 20 supports the fiber optic equipment trays 22. As illustrated in FIGS. 14A and 14B, the fiber optic equipment drawer 20 is configured so that each fiber optic equipment tray 22 can be independently moved about the fiber optic equipment drawer 20 to provide enhanced access to the fiber optic modules 26 supported therein. FIG. 14A illustrates a perspective view of the fiber optic equipment drawer 20 with one fiber optic equipment tray 22 pulled out from the fiber optic equipment drawer 20 to provide access to the fiber optic modules 26 contained therein. FIG. 14B illustrates a close-up view of FIG. 14A. More detail regarding the fiber optic equipment trays 22 and their retention in and pull out features from the fiber optic equipment drawer 20 are described below and illustrated in more detail in FIGS. 15-20.

Figure 15:
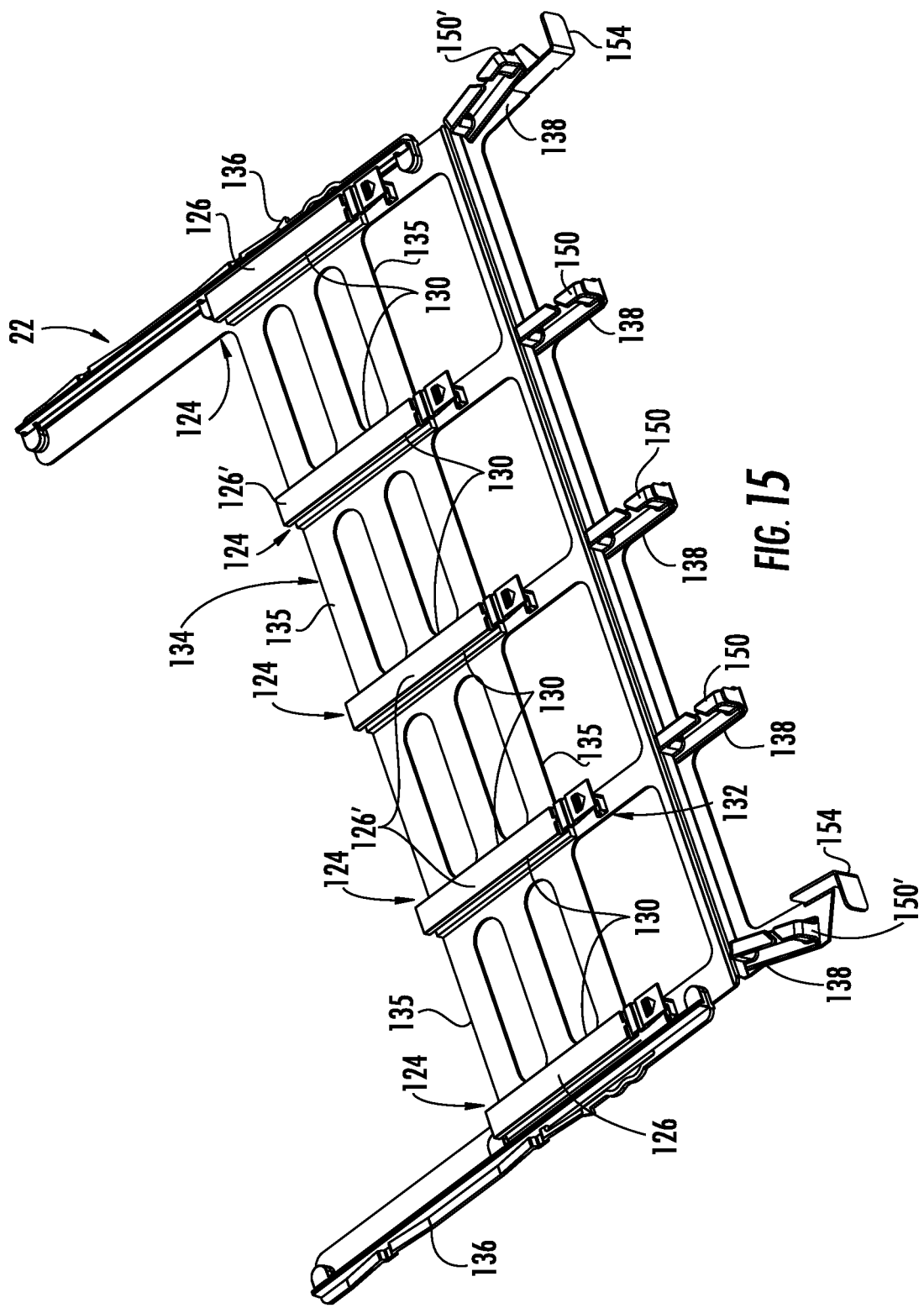
FIG. 15 is a front perspective view of the exemplary fiber optic equipment tray of FIG. 14A removed from the fiber optic equipment drawer of FIG. 1.

FIG. 15 is a front perspective view of the fiber optic equipment tray 22 removed from the fiber optic equipment drawer 20 and without installed fiber optic modules 26. As illustrated therein, the fiber optic equipment tray 22 contains a plurality of module guides 124 in the form of module rail guides 126 that support fiber optic modules 26 (not shown). As illustrated in right and left side perspective views in FIGS. 16A and 16B, the fiber optic modules 26 contain module rails 128A, 128B on each side 129A, 129B in this embodiment. The module rails 128A, 128B are configured to be inserted into tray channels 130 (FIG. 15) disposed within the module rail guides 126, as illustrated in FIG. 17. As illustrated in FIG. 15, the module rail guides 126 are disposed in a row arrangement if at least one intermediate module rail guide 126' is disposed in the fiber optic equipment tray 22. Fiber optic modules 26 can be independently moved within the module rail guides 126, 126' in the fiber optic equipment tray 22 either towards a front end 132 or a rear end 134 of the fiber optic equipment tray 22. Support members 135 may also be disposed in the fiber optic equipment trays 22 to support the weight of fiber optic modules 26 disposed in and between the module rail guides 126, 126'. The module rail guides 126, 126' will be referred to collectively hereinafter as element 126.

Figure 18:
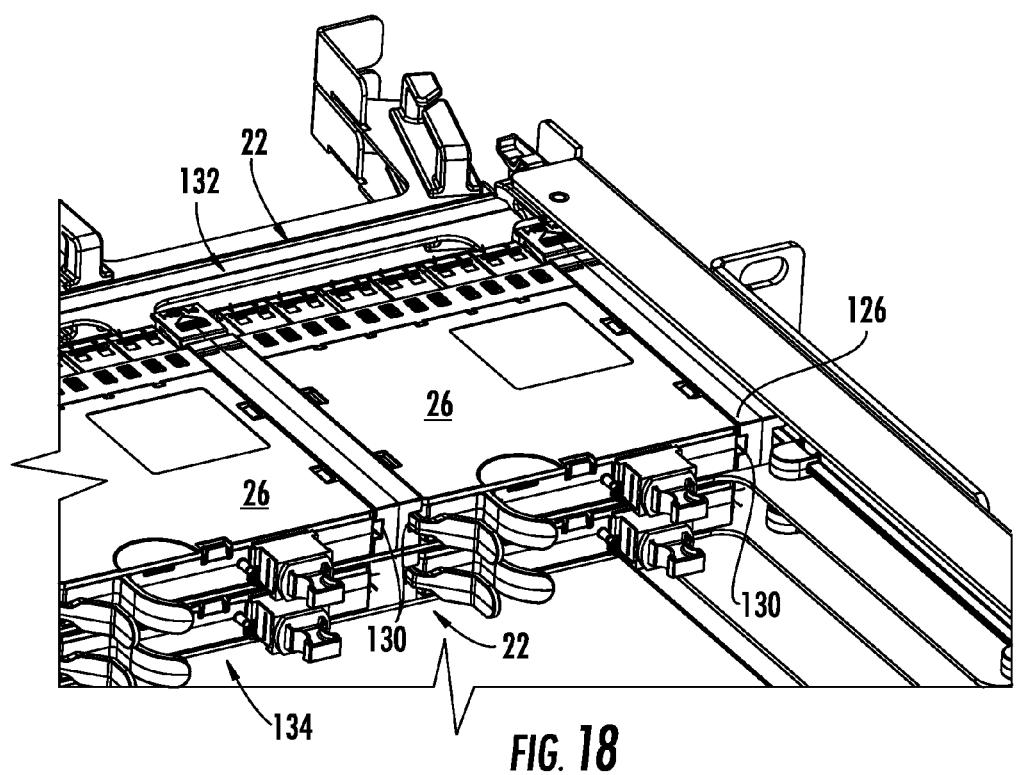
FIG. 18 is a rear perspective view of the fiber optic equipment drawer and chassis of FIG. 3 illustrating rear-installable fiber optic modules installed in the fiber optic equipment trays installed in the fiber optic equipment drawer.

Note that in the fiber optic equipment tray 22 of FIG. 15, five (5) module rail guides 126 are provided to support up to four (4) fiber optic modules 26 therebetween. The module rail guides 126 are configured such that the tray channels 130 are open on both the front end 132 and the rear end 134 of the fiber optic equipment trays 22 as illustrated in FIG. 18. This allows the fiber optic modules 26 to be either front-installable from the front end 132 or rear-installable from the rear end 134 into the fiber optic equipment trays 22, and thus installable from either the front or the rear of the fiber optic equipment drawer 20 and the chassis 12. Providing the capability of either front-installable or rear-installable fiber optic modules 26 may be advantageous in allowing a technician to more easily install fiber optic modules 26 in the fiber optic equipment drawer 20 and establish fiber optic connections therewith more efficiently and conveniently. For example, fiber optic modules 26 can be inserted into the rear end 134 of the fiber optic equipment tray 22 in the module rail guides 126 and pushed forward within the module rail guides 126 until the fiber optic modules 26 reach a front end 132 of each fiber optic equipment tray 22. A locking feature can be provided to prevent the fiber optic module 26 from extending beyond the front end 132 of the fiber optic equipment trays 22 unless a release is engaged. In this manner, the fiber optic modules 26 can be installed from the rear of the fiber optic equipment drawer 20 and chassis 12, but can also be extended and removed from the front end 132 of the fiber optic equipment tray 22.

As illustrated in FIGS. 15 and 17, the fiber optic equipment tray 22 also contains tray rails 136. The tray rails 136 are configured to be received in the tray guides 74 disposed in the fiber optic equipment drawer 20 (FIG. 6) to retain and allow the fiber optic equipment trays 22 to move about the fiber optic equipment drawer 20. The fiber optic equipment trays 22 can be moved in and out of the fiber optic equipment drawer 20 by their tray rails 136 moving within the tray guides 74. In this manner, the fiber optic equipment trays 22 can be independently movable about the tray guides 74 in the fiber optic equipment drawer 20. More detail regarding the tray rails 136 and their coupling to the tray guides 74 in the fiber optic equipment drawer 20 is discussed below with regard to FIGS. 19A-21.

With continuing reference to FIGS. 15 and 17, the fiber optic equipment tray 22 may also contain extension members 138. Routing guides 150 may be conveniently disposed on the extension members 138 to provide routing for optical fibers or fiber optic cables connected to fiber optic adapters 152 in the fiber optic modules 26 (FIG. 17). The routing guides 150' on the ends of the fiber optic equipment tray 22 may be angled with respect to the tray rails 136 to route optical fibers or fiber optic cables at an angle to the sides of the fiber optic equipment tray 22. Pull tabs 154 may also be connected to the extension members 138 to provide a means to allow the fiber optic equipment tray 22 to easily be pulled out from and pushed into the fiber optic equipment drawer 20.

Figure 16A:
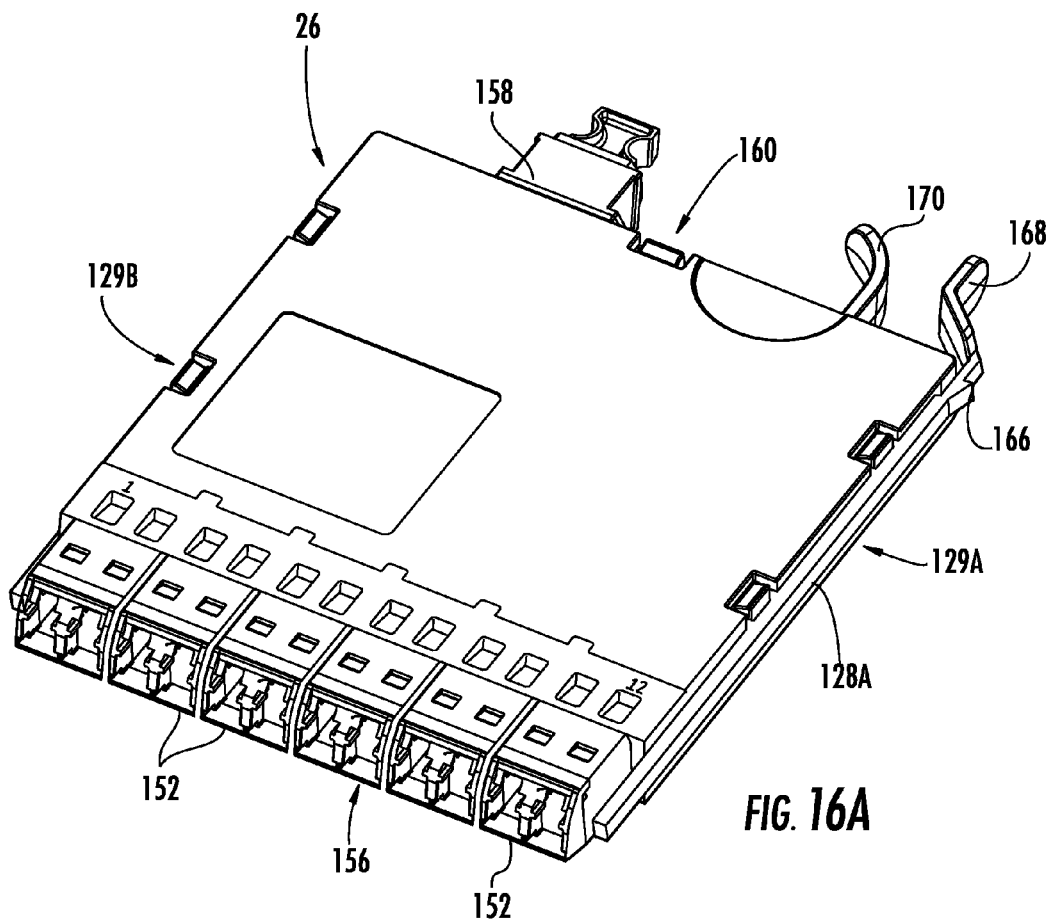
FIG. 16A is a front, right perspective view of an exemplary fiber optic module that can be supported by the fiber optic equipment tray of FIG. 15.
Figure 16B:
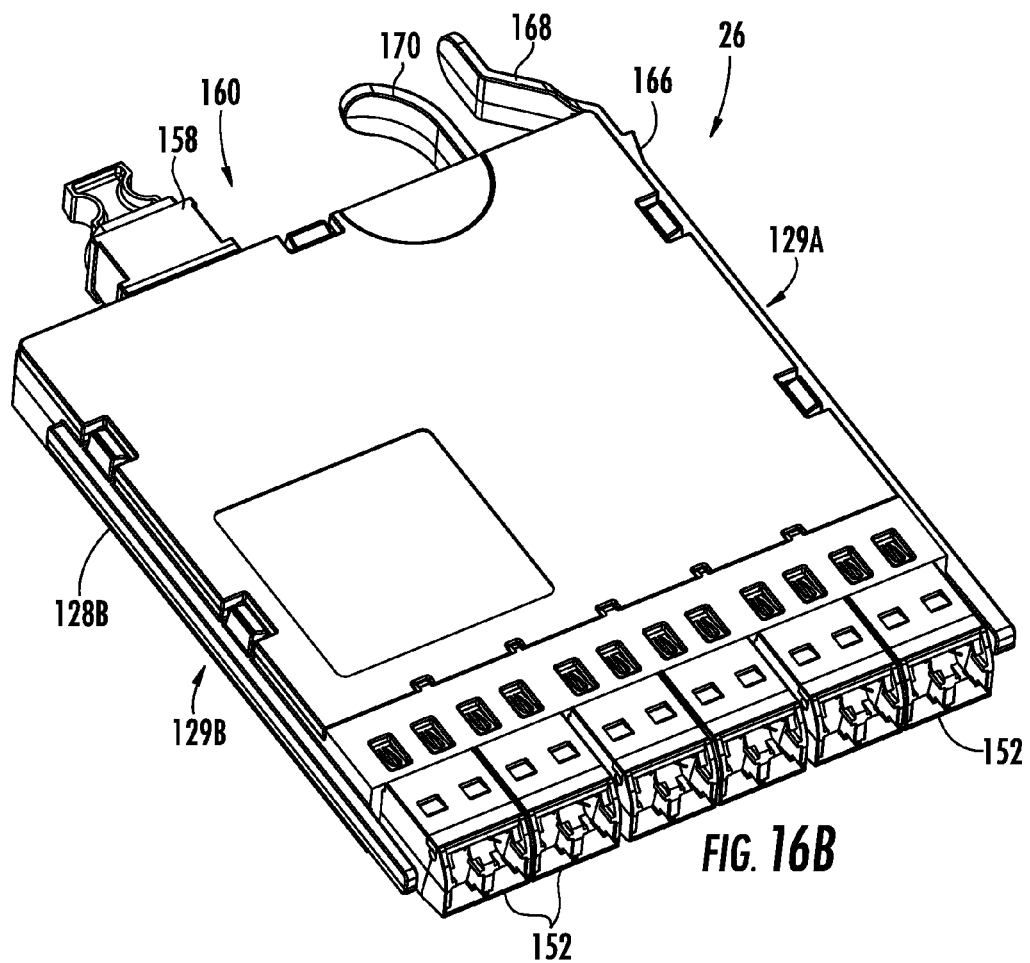
FIG. 16B is a front, left perspective view of the fiber optic module of FIG. 16A.
Figure 17:
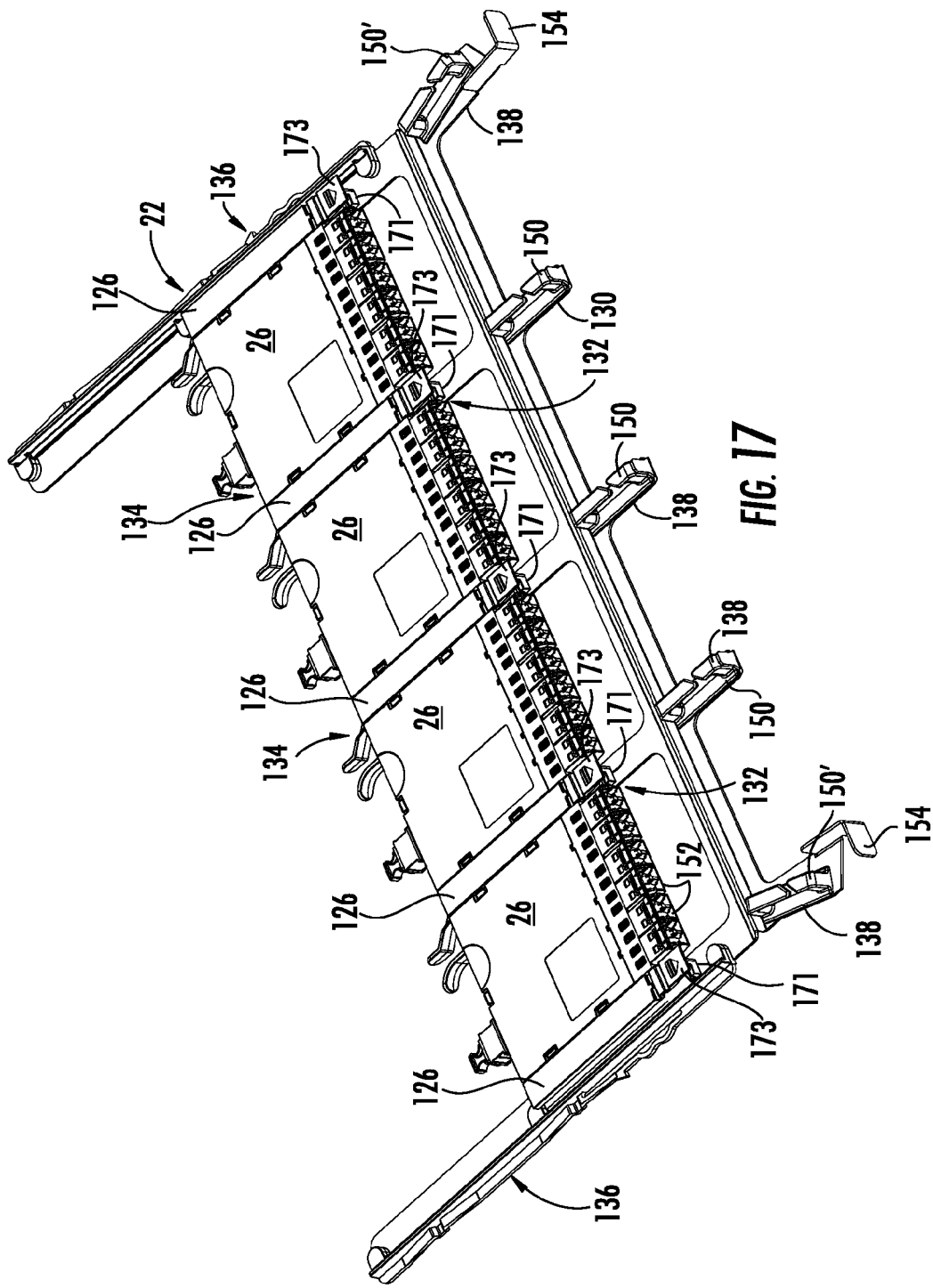
FIG. 17 is a front perspective view of fiber optic modules according to the fiber optic modules of FIG. 16A installed in the fiber optic equipment tray of FIG. 15.

FIGS. 16A and 16B illustrate an example of a fiber optic module 26 that can supported in the fiber optic equipment tray 22 to provide fiber optic connections in the fiber optic equipment drawer 20. FIG. 16A illustrates a right perspective view of the fiber optic module 26. FIG. 16B illustrates a left perspective view of the fiber optic module 26. As illustrated therein, the fiber optic module 26 is comprised of a number of fiber optic adapters 152 disposed on a front end 156 of the fiber optic module 26. In this example, the fiber optic adapters 152 accept duplex LC fiber optic connectors. However, any fiber optic connection type desired can be provided in the fiber optic modules 26. Another fiber optic adapter 158 is disposed on a rear end 160 of the fiber optic module 26. In this example, the fiber optic adapter 158 is a multi-fiber MTP fiber optic adapter equipped to establish connections to multiple optical fibers (e.g., twelve (12) optical fibers). The fiber optic module 26 may also manage polarity between the fiber optic adapters 152 disposed on the front end 156 of the fiber optic module 26 and the fiber optic adapter 158 disposed on the rear end 160 of the fiber optic module 26.

Module rails 128A, 128B are disposed on each side 129A, 129B of the fiber optic module 26. The module rails 128A, 128B are configured to be inserted within the module rail guides 126 in the fiber optic equipment tray 22, as previously discussed and illustrated in FIG. 17. In this manner, when it is desired to install a fiber optic module 26 in the fiber optic equipment tray 22, the front end 156 of the fiber optic module 26 can be inserted from either the front end 132 or the rear end 134 of the fiber optic equipment tray 22. For example, the front end 156 of module rails 128A, 128B of the fiber optic module 26 can be inserted into module rail guides 126 starting from the rear end 134 of the fiber optic equipment trays 22. In this manner, the fiber optic module 26 can be rear-installed in the fiber optic equipment tray 22 and the fiber optic equipment drawer 20. The fiber optic module 26 can then be pushed forward within the module rail guides 126 until the fiber optic module 26 reaches the front end 132 of the fiber optic equipment trays 22. In this manner, a technician can install a fiber optic connection to the fiber optic adapter 158 disposed on the rear end 160 of the fiber optic module 26 and can then install the fiber optic module 26 from the rear of the fiber optic equipment drawer 20 into the fiber optic equipment tray 22.

FIG. 18 illustrates a rear perspective view of the fiber optic modules 26 installed in fiber optic equipment trays 22 and the module rail guides 126 disposed therein. As illustrated therein, when the fiber optic module 26 is installed in the tray channel 130 of the module rail guides 126 from the rear end 134 of the fiber optic equipment tray 22, the module rails 128A, 128B of the fiber optic module 26 can then be moved towards the front end 132 until the fiber optic module 26 reaches a stop or locking feature disposed in the front end 132. A locking feature in the form of a latch 166 (FIGS. 16A and 16B) engages a complementary detent disposed in the tray channel 130 of the module rail guides 126. The latch 166 is inwardly biased such that the fiber optic module 26 can be installed in the module rail guides 126, but cannot be pulled back towards the rear section 134 until the latch 166 is disengaged.

If it is desired to remove the fiber optic module 26 from the fiber optic equipment tray 22, the fiber optic module 26 can be removed from either the front end 132 or the rear end 134 of the fiber optic equipment tray 22. To remove the fiber optic module 26 from the rear end 132 of the fiber optic equipment tray 22, the latch 166 is disengaged by pushing a lever 168 (FIGS. 16A and 16B) inward towards the fiber optic module 26 to release the latch 166 from the module rail guide 126. To facilitate pushing the lever 168 inward towards the fiber optic module 26, a finger hook 170 is provided adjacent to the lever 168 so the lever 168 can easily be squeezed into the finger hook 170.

The fiber optic module 26 can be locked into place in the fiber optic equipment tray 22 by pushing the fiber optic module 26 forward to the front end 132 of the fiber optic equipment tray 22. As illustrated in FIG. 17, a locking feature in the form of a front stop 171 disposed in the module rail guides 126. The front stop 171 prevents the fiber optic module 26 from extending beyond the front end 132. When it is desired to remove a fiber optic module 26 from the fiber optic equipment tray 22, a front module tab 173 also disposed in the module rail guides 126 and coupled to the front stop 171 can be pushed downward to engage the front stop 171. As a result, the front stop 171 will move outward away from the fiber optic module 26 such that the fiber optic modules 22 are not obstructed from being pulled forward. The fiber optic module 26, and in particular its module rails 128A, 128B (FIGS. 16A and 16B), can be pulled forward along the module rail guides 126 to remove the fiber optic module 26 from the fiber optic equipment tray 22.

Figure 19A:
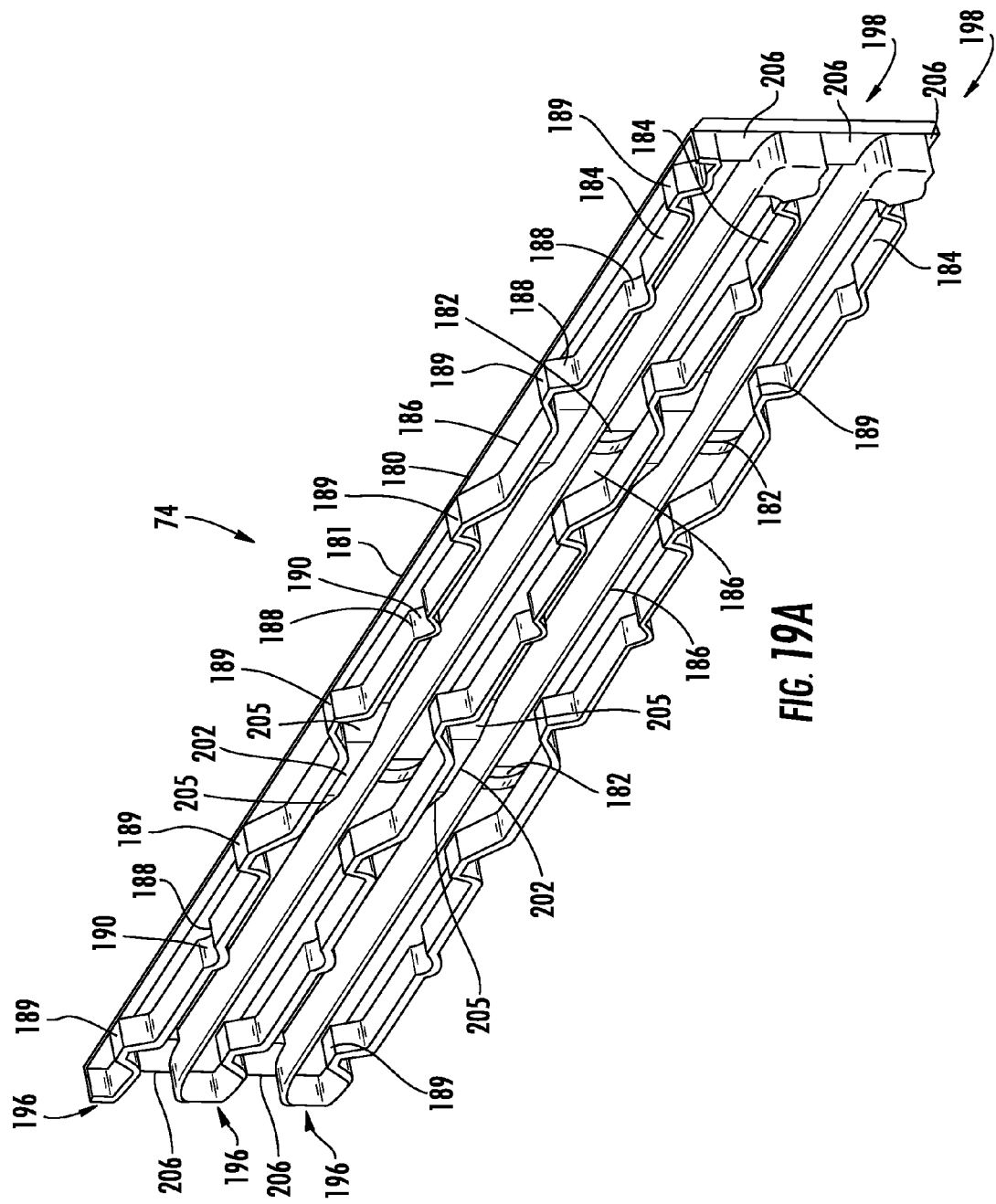
FIGS. 19A and 19B are left and right perspective views of an exemplary tray guide disposed in the fiber optic equipment drawer of FIG. 1 configured to receive the fiber optic equipment tray of FIG. 15.
Figure 19B:
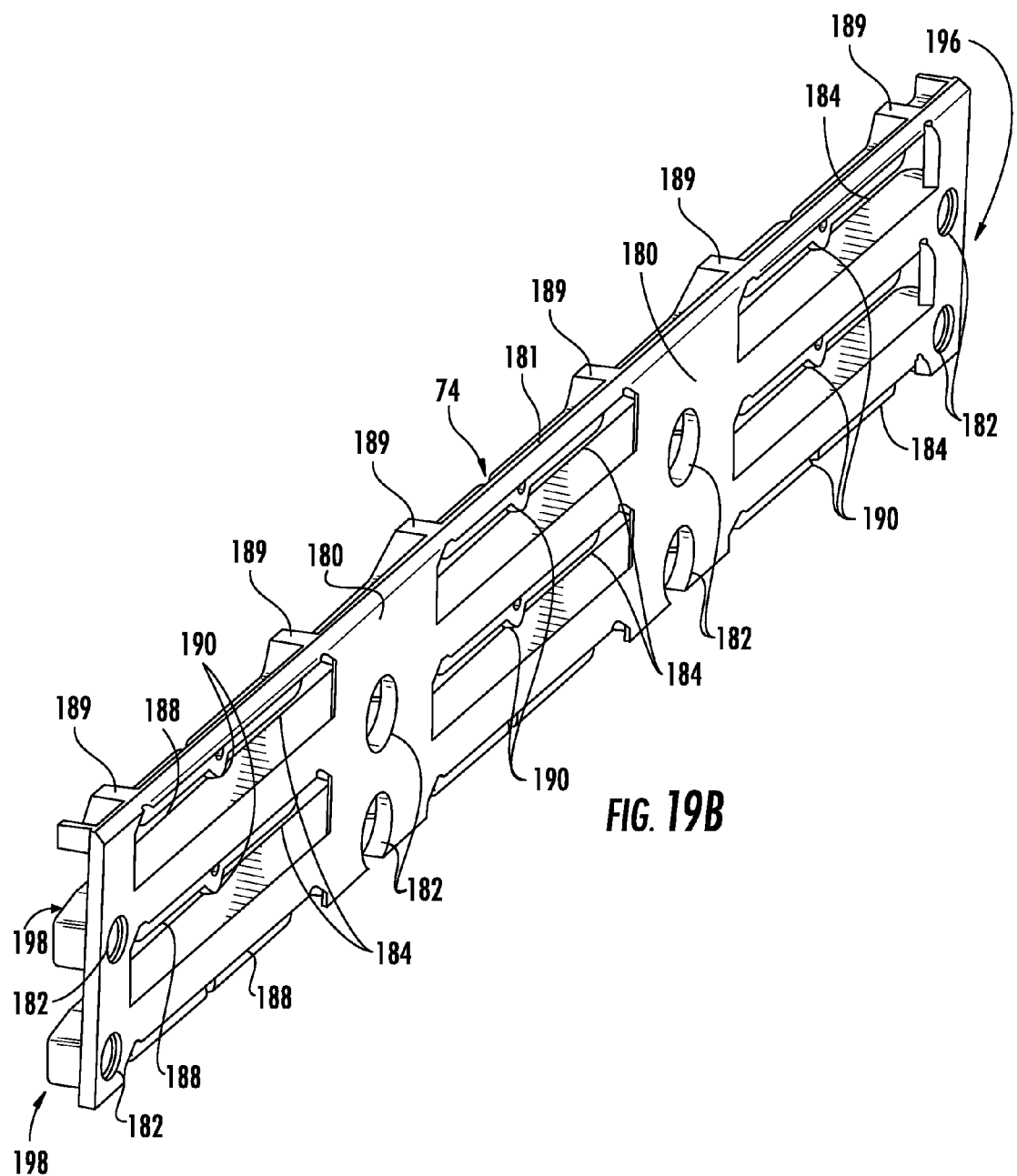

As previously discussed and illustrated in FIG. 7, the tray guides 74 are disposed in the fiber optic equipment drawer 20 to allow fiber optic equipment trays 22 to be supported in the fiber optic equipment drawer 20. More specifically, as illustrated in FIG. 15, the tray rails 136 attached or provided as part of the fiber optic equipment tray 22 are configured to be received by the tray guides 74 to allow the fiber optic equipment drawer 20 to support fiber optic equipment trays 22. The tray guides 74 allow the fiber optic equipment trays 22 to be moved in and out of the fiber optic equipment drawer 20 for enhanced access to fiber optic modules 26 supported by the fiber optic equipment trays 22. FIGS. 19A and 19B illustrate more detail regarding the exemplary tray guides 74 disposed in the fiber optic equipment drawer 20.

Figure 19C:
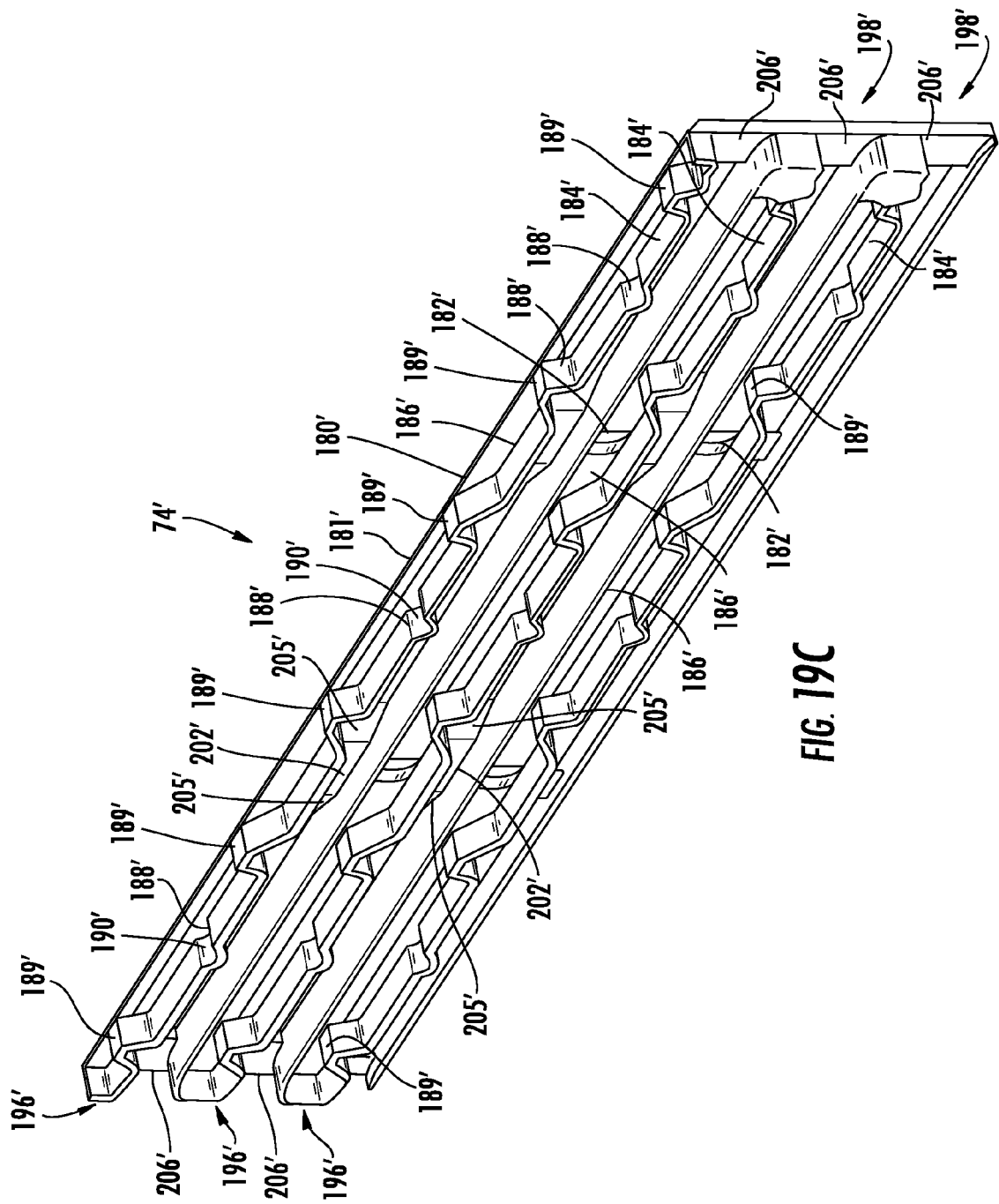
FIGS. 19C and 19D are left and right perspective views of another exemplary tray guide configured to receive tray rail(s) of the fiber optic equipment tray of FIG. 15.
Figure 19D:
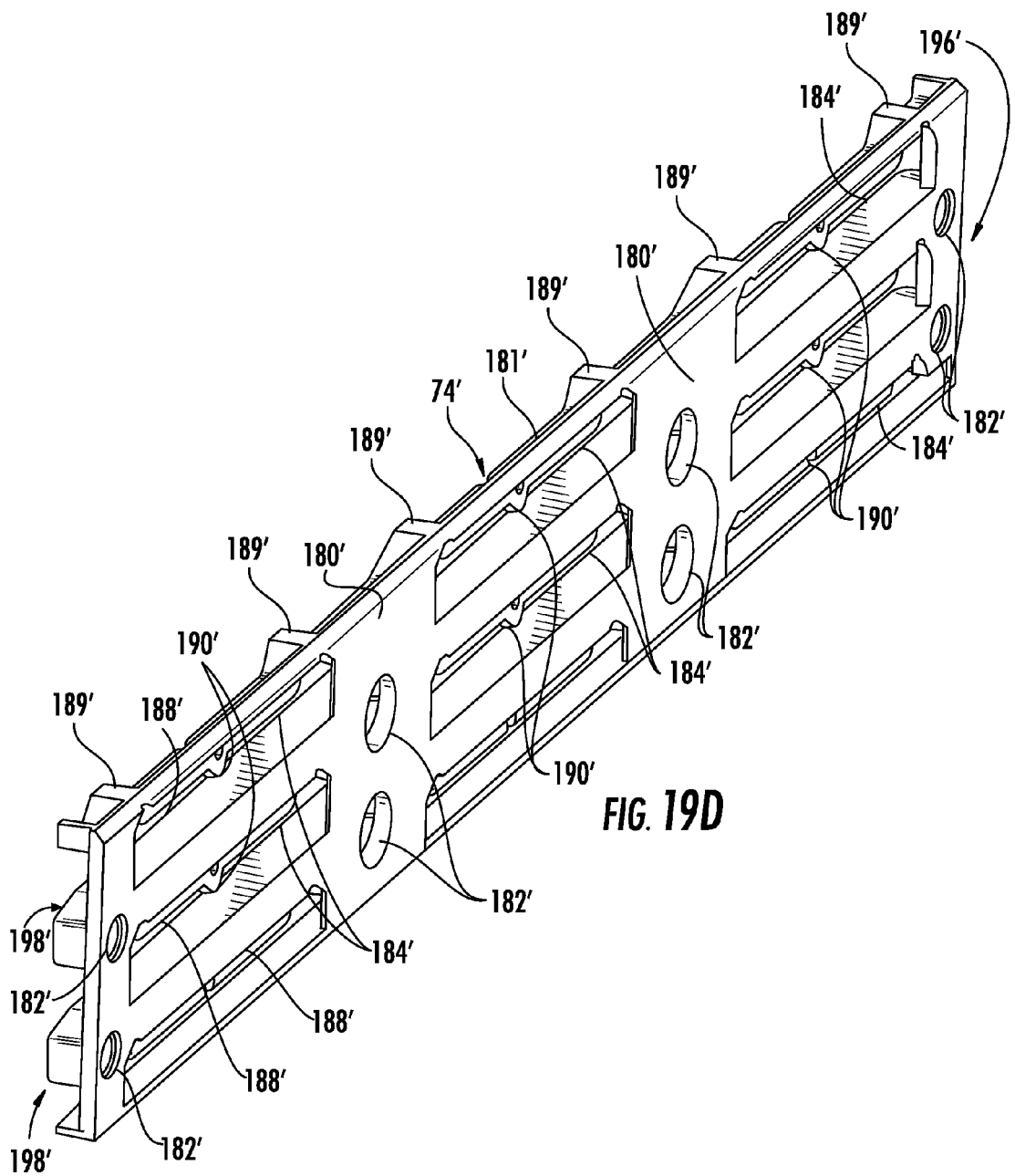

FIGS. 19A and 19B illustrate left and right perspective views of the tray guide 74 disposed in the fiber optic equipment drawer 20 to support up to two (2) tray rails 136 in a 1-U space. FIGS. 19C and 19D illustrate left and right perspective views of another embodiment of a tray guide 74' that may be employed to support up to three (3) tray rails 136 per 1-U space, as will be later described and illustrated with regard to FIGS. 33A-35. The tray guides 74, 74' contain like features and thus the description below with regard to tray guide 74 in FIGS. 19A and 19B is equally applicable to the tray guide 74' of FIGS. 19C and 19D. Like features or elements between tray guides 74, 74' are illustrated with common element numbers, except that such features in tray guide 74' will be appended with an apostrophe (').

As discussed above, the tray guides 74 are configured to receive fiber optic equipment trays 22 supporting one or more fiber optic modules 26 in the fiber optic equipment drawer 20. The tray guides 74 allow the fiber optic equipment trays 22 to be pulled out from the chassis 12, as illustrated in FIG. 14B. With continuing reference to FIGS. 19A and 19B, the tray guide 74 in this embodiment is comprised of a guide panel 180. The guide panel 180 is comprised of an elongated member 181. The guide panel 180 may be constructed out of any material desired, including but not limited to a polymer or metal. The guide panel 180 contains a series of apertures 182 to facilitate attachment of the guide panel 180 to the fiber optic equipment drawer 20, as illustrated in FIG. 12. Guide members 184 are disposed in the guide panel 180 and configured to receive the tray rail 136 of the fiber optic equipment tray 22, as illustrated in the cross-section diagram in FIG. 20. Three (3) guide members 184 are disposed in the guide panel 180 in the embodiment of FIGS. 19A and 19B to be capable of receiving up to three (3) tray rails 136 of three (3) fiber optic equipment trays 22. However, any number of guide members 184 desired may be provided. In this embodiment, the guide members 184 each include guide channels 186 configured to receive and allow tray rails 136 to move along the guide channels 186 for translation of the fiber optic equipment trays 22 about the fiber optic equipment drawer 20.

Leaf springs 188 are disposed in each of the guide members 184 of the tray guide 74 and are each configured to provide stopping positions for the tray rails 136 during movement of the fiber optic equipment tray 22 in the guide members 184. The leaf springs 188 are disposed between ends 189 disposed in the guide member 184 to give the leaf springs 188 spring action. The leaf springs 188 each contain protrusions 190 that are configured to be received in detents 192 (FIGS. 21A and 21B) disposed in the tray rails 136 to provide stopping or resting positions. The tray rails 136 contain mounting platforms 194 that are used to attach the tray rails 136 to the fiber optic equipment trays 22. It may be desirable to provide stopping positions in the tray guide 74 to allow the fiber optic equipment trays 22 to have stopping positions when moved in and out of the fiber optic equipment drawer 20. Stopping positions allow the requirement of a technician to impart a certain force to pull or push the fiber optic equipment tray 22 about the guide panel 180 so that the fiber optic equipment tray 22 is retained in place when not pulled or pushed. However, the force can also be designed to allow a technician to easily push in or pull out the fiber optic equipment tray 22 into and from the guide panel 180 when desired, especially when the fiber optic equipment tray 22 is located above the technician. In this regard and by example, two (2) detents 192 in the tray rail 136 receive two (2) protrusions 190 in the tray guide 74 at any given time. When the fiber optic equipment tray 22 is fully retracted into the fiber optic equipment drawer 20 in a first stopping position, the two (2) detents 192 of the tray rail 136 are received in the one protrusion 190 adjacent a rear end 196 of the guide channel 186 and the middle protrusion 190 disposed between the rear end 196 and a front end 198 of the guide channel 186. When the fiber optic equipment tray 22 is pulled out from the fiber optic equipment drawer 20, the two (2) detents 192 of the tray rail 136 are received in the one protrusion 190 adjacent the front end 198 of the guide channel 186 and the middle protrusion 190 disposed between the rear end 196 and the front end 198 of the guide channel 186. Thus, the stopping or resting positions provided by the engagement of the protrusions 190 of the leaf springs 188 with the detents 192 of the tray rail 136 in this embodiment are provided to require force on the guide panel 180 to overcome the stopping position to translate the tray rail 136 of a fiber optic equipment tray 22 disposed within the guide member 184.

In this embodiment, each leaf spring 188 is designed to require approximately two (2) pounds (lbs.) of pulling force to allow the protrusion 190 in the leaf spring 188 to overcome the detent 192 disposed in the tray rail 136 for a total of four (4) lbs. pulling force (i.e., two (2) detents 192 in the tray rail 136 are engaged with two (2) protrusions 190 disposed in two (2) leaf springs 188). The pulling force required to overcome the engagement of the protrusion 190 in the detents 192 could be designed to be any pulling force desired. For example, the pulling force required to overcome the engagement of the protrusion 190 in the detents 192 could be designed to be greater than the pulling force required to engage or disengage a fiber optic connector from a fiber optic module 26 supported by the fiber optic equipment tray 22. However, the pulling force required to overcome the engagement of the protrusion 190 in the detents 192 could be designed to be less than the pulling force required to clear interference with the lances 88 when the fiber optic equipment drawer 20 is pulled out from the chassis 12 (FIGS. 8A and 8B). The leaf springs 188 in this embodiment are designed to each provide the same force, but such does not have to be the case. Further, the guide panel 180 and tray rail 136 could be designed to provide fewer stopping positions or only provide that one protrusion 190 is engaged with one detent 192 in each stopping or resting position.

When the tray rail 136 is in a stopped position, two (2) protrusions 190 disposed in two (2) leaf springs 188 are engaged with two (2) protrusions in the tray rail 136, as previously discussed. In this embodiment, when the tray rail 136 is in a stopping position, the leaf springs 188 and their protrusions 190 and the complimentary detents 192 in the tray rail 136 are designed cooperatively such that the detents 192 do not impart a force on the protrusions 190. Thus, the leaf springs 188 are in an unstressed state when the tray rail 136 is in a stopped position. This may be advantageous if the leaf springs 188 are made out of a material, such as a polymer material for example, where creep can occur over time, thus reducing the effectiveness of the leaf spring 188 over time. However, this feature is not a requirement for the design.

Figure 21A:
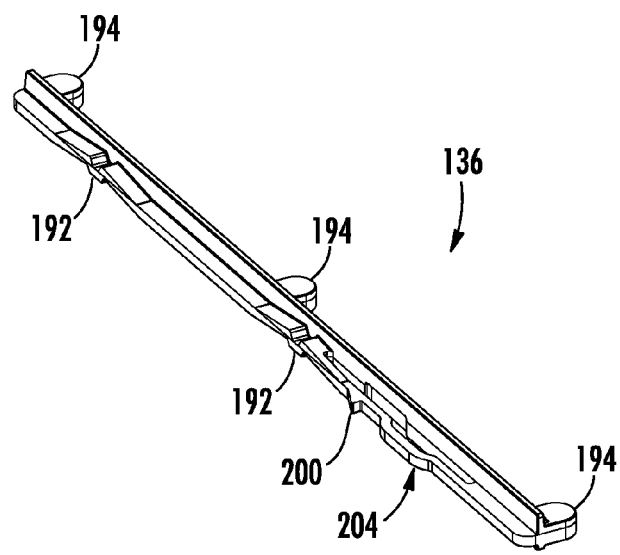
FIGS. 21A and 21B are perspective and top views, respectively, of an exemplary tray rail for the fiber optic equipment tray of FIG. 15 configured to be received by the tray guide of FIGS. 19A and 19B.
Figure 21B:
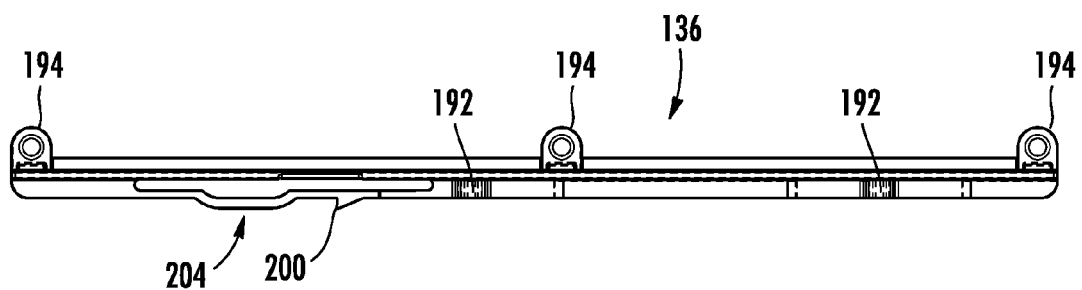

As the tray rail 136 is pulled within the guide channel 186, a protrusion 200 disposed in the tray rail 136 and illustrated in FIGS. 21A and 21B is biased to pass over transition members 202 disposed between the leaf springs 188, as illustrated in FIG. 19A. The protrusion 200 is provided in a leaf spring 204 disposed in the tray rail 136, as illustrated in FIGS. 21A and 21B. The transition members 202 have inclined surfaces 205 that allow the protrusion 200 to pass over the transition members 202 as the fiber optic equipment tray 22 is being translated within the guide channel 186. As the protrusion 200 contains the transition members 202, the force imparted onto the protrusion 200 causes the leaf spring 204 to bend inward to allow the protrusion 200 to pass over the transition member 202. To prevent the tray rail 136 and thus the fiber optic equipment tray 22 from being extended beyond the front end 198 and rear end 196 of the guide channel 186, stopping members 206 are disposed at the front end 198 and rear end 196 of the guide channel 186. The stopping members 206 do not have an inclined surface; thus, the protrusion 200 in the tray rail 136 abuts against the stopping member 206 and is prevented from extending over the stopping member 206 and outside of the front end 198 of the guide channel 186.

Figure 22:
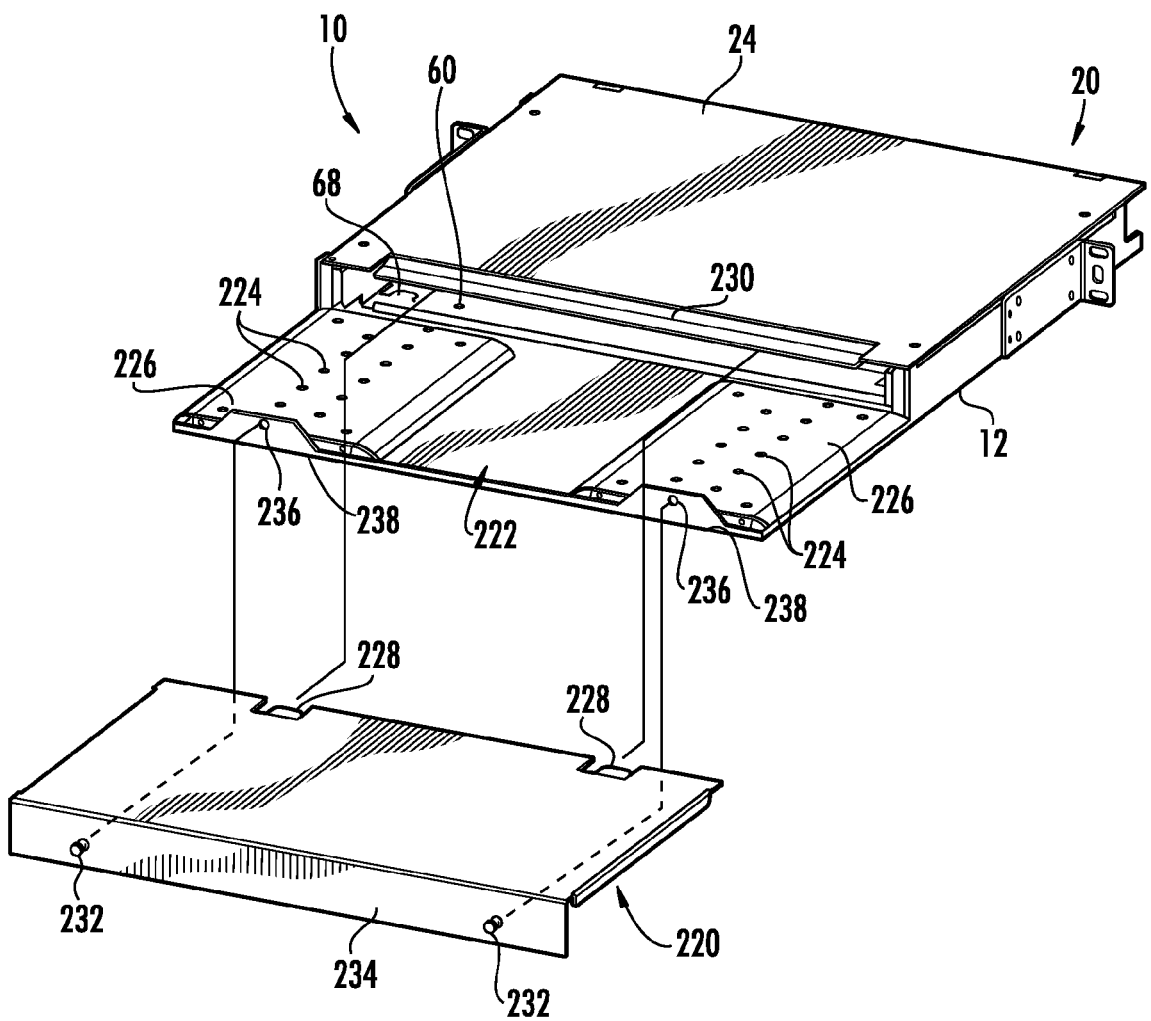
FIG. 22 is a rear perspective view of the fiber optic equipment drawer and chassis of FIG. 1 with the rear chassis cover illustrated and removed.
Figure 23:
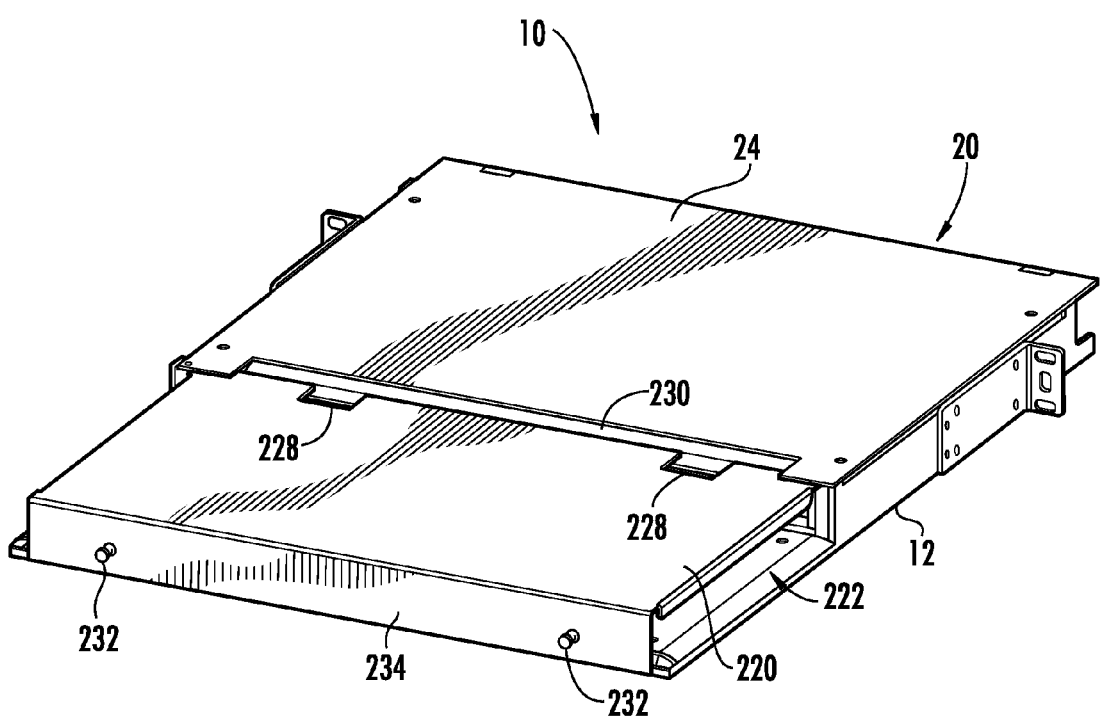
FIG. 23 is a rear perspective view of the fiber optic equipment drawer and chassis of FIG. 22 with the rear chassis cover installed.

Now that the fiber optic equipment drawer 20, fiber optic equipment trays 22 and fiber optic modules 26 have been described, other features that may be included in the fiber optic equipment 10 are now described. For example, FIG. 22 illustrates a rear perspective view of the fiber optic equipment 10 and chassis 12 of FIG. 1 configured to receive an optional rear cover 220. The rear cover 220 can be employed to protect furcated cables (not shown) disposed in a rear area 222 of the chassis 12. As illustrated in FIG. 22, a number of apertures 224 may be disposed in a raised area 226 in the rear area 222 of the chassis 12 to support securing furcations of trunk cables (not shown) coming into the chassis 12. Trunk cables are run to the chassis 12 to establish fiber optic connection with fiber optic modules 26 disposed in the fiber optic equipment drawer 20. The rear cover 220 contains overlapping members 228 that are configured to be received into a rear end 230 of the front chassis cover 24 to be secured to the chassis 12, as illustrated in FIG. 23. The rear cover 220 can protect furcations connected to the raised area 226. To secure the rear cover 230 to the front chassis cover 24, the rear cover 230 may also include plungers 232 or other fastener devices in a rear panel 234 of the rear cover 230. The plungers 232 engage with plunger receivers 236 disposed in flaps 238 in the rear area 222 of the chassis 12 to secure the rear cover 220 to the front chassis cover 24 and chassis 12.

Figure 24:
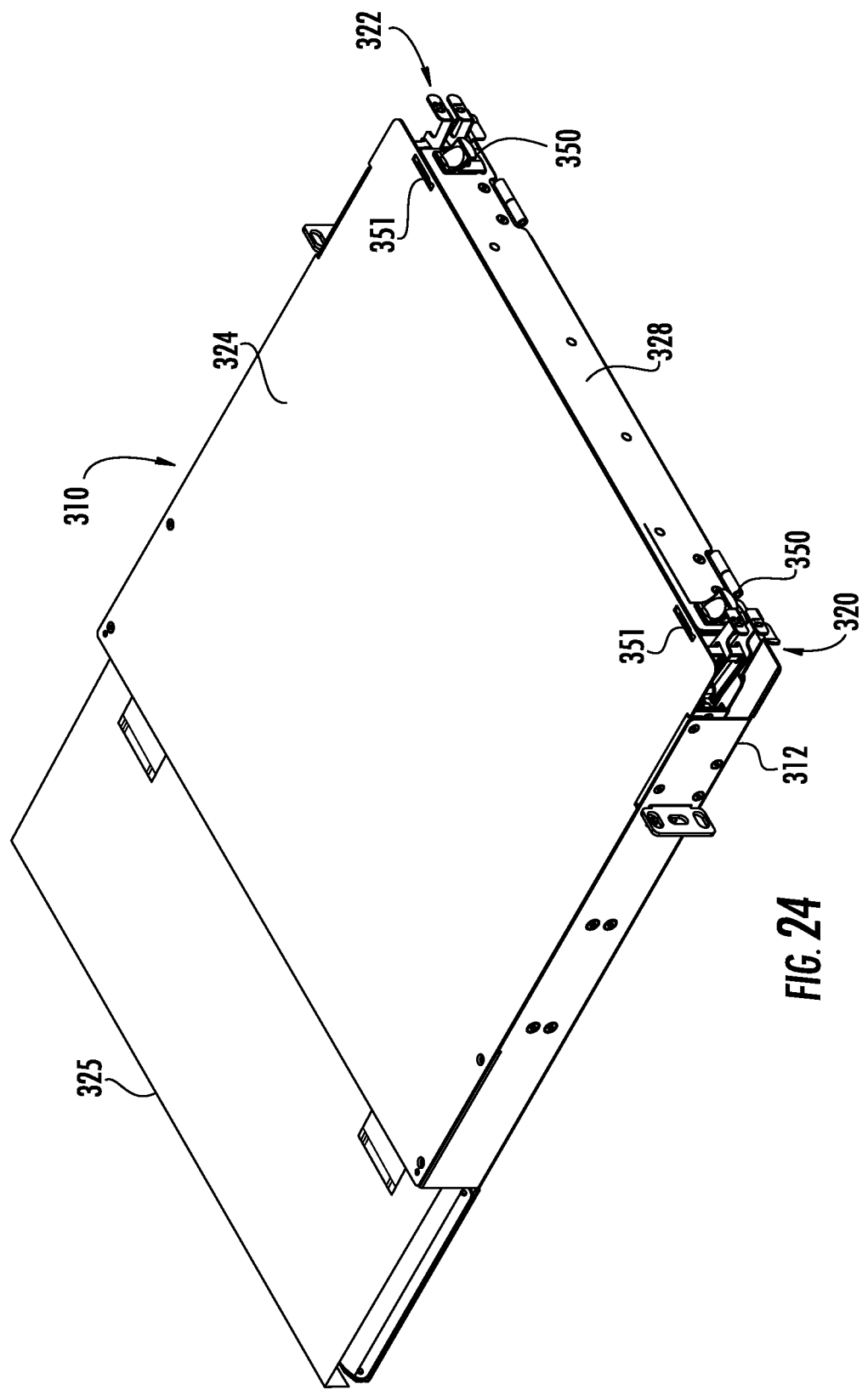
FIG. 24 is a front perspective view of another exemplary fiber optic equipment drawer installed in a chassis and supporting independently moveable fiber optic equipment trays and modules.

The embodiments described herein are not limited to the fiber optic equipment drawer 20 described above. Some or all of the features in the fiber optic equipment drawer 20 may be provided in other drawers, chassis, or other fiber optic equipment to support fiber optic modules and access thereto. For example, FIGS. 24-32B illustrate an alternate embodiment of fiber optic equipment that includes a fiber optic equipment drawer configured to support one or more fiber optic equipment trays each configured to support one or more fiber optic modules. In this regard, FIG. 24 illustrates alternative exemplary fiber optic equipment 310 in this regard. The exemplary fiber optic equipment 310 may be provided at a data distribution center or central office to support cable-to-cable fiber optic connections and to manage a plurality of fiber optic cable connections. The fiber optic equipment 310 includes a fiber optic equipment chassis 312 ("chassis 312"). The chassis 312 is configured to be installed in a fiber optic equipment rack if desired, such as the fiber optic equipment rack 14 previously discussed and illustrated in FIG. 1. The chassis 312 illustrated in FIG. 24 is 1U-size, but could be designed to be any other U-size desired, with "U" equaling a standard 1.75 inches in height, or any other height desired.

As illustrated in FIG. 24 and discussed in greater detail below in this description, the chassis 312 includes a fiber optic equipment drawer 320 supporting one or more extendable fiber optic equipment trays 322. The fiber optic equipment trays 322 are configured to support one or more fiber optic modules (not shown). The fiber optic equipment trays 322 in this embodiment are the same or essentially the same as the fiber optic equipment trays 22 previously discussed and illustrated in FIGS. 14A-15 and 17. The fiber optic modules supported by the fiber optic equipment trays 322 can be the same or essentially the same as the fiber optic modules 26 previously discussed and illustrated in FIGS. 16A and 16B. The fiber optic equipment trays 322 can be moved and extended from the fiber optic equipment drawer 320 and retracted back into the fiber optic equipment drawer 320. Any number of fiber optic equipment trays 322 can be provided. Any number of fiber optic modules can be supported by the fiber optic equipment trays 322. The view of the fiber optic equipment trays 322 in FIG. 24 is obstructed by a front chassis cover 324 placed in front of the fiber optic equipment drawer 320 as part of the chassis 312. The front chassis cover 324 is attached to a rear chassis cover 325 to form a cover over the chassis 312. Latch orifices 351 are disposed in the front chassis cover 324 to support a drawer door locking mechanism employing push buttons 350 in this embodiment to lock a drawer door 328 to the front chassis cover 324, as will be described in more detail below. The fiber optic equipment drawer 320 is extendable out from the chassis 312 to access the fiber optic equipment trays 322 and the fiber optic modules supported therein.

In the example of the fiber optic equipment 310 in FIG. 24, two fiber optic equipment trays 322 are supported by the fiber optic equipment drawer 320 with each fiber optic equipment tray 322 supporting four (4) fiber optic modules. Each fiber optic module can support any number of optical fiber connections. If the fiber optic modules included in the fiber optic equipment trays 322 support twelve (12) optical fiber connections, a total of up to ninety-six (96) optical fiber connections can be provided by the fiber optic equipment drawer 320, although the fiber optic equipment drawer 320 is not limited to this density.

Figure 25A:
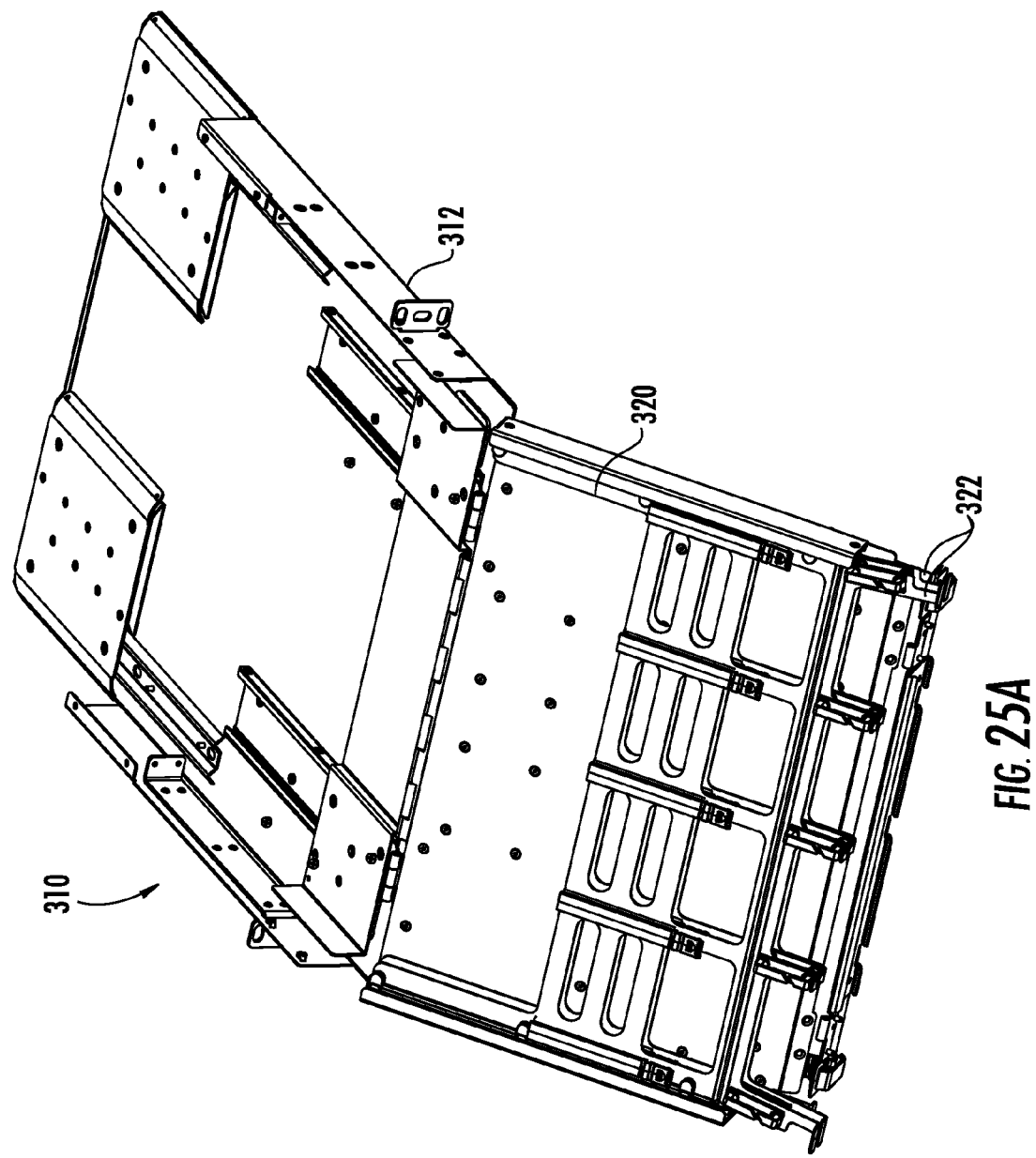
FIG. 25A is a front perspective view of the fiber optic equipment drawer of FIG. 24 pulled fully open from the chassis and tilted downward.
Figure 25B:
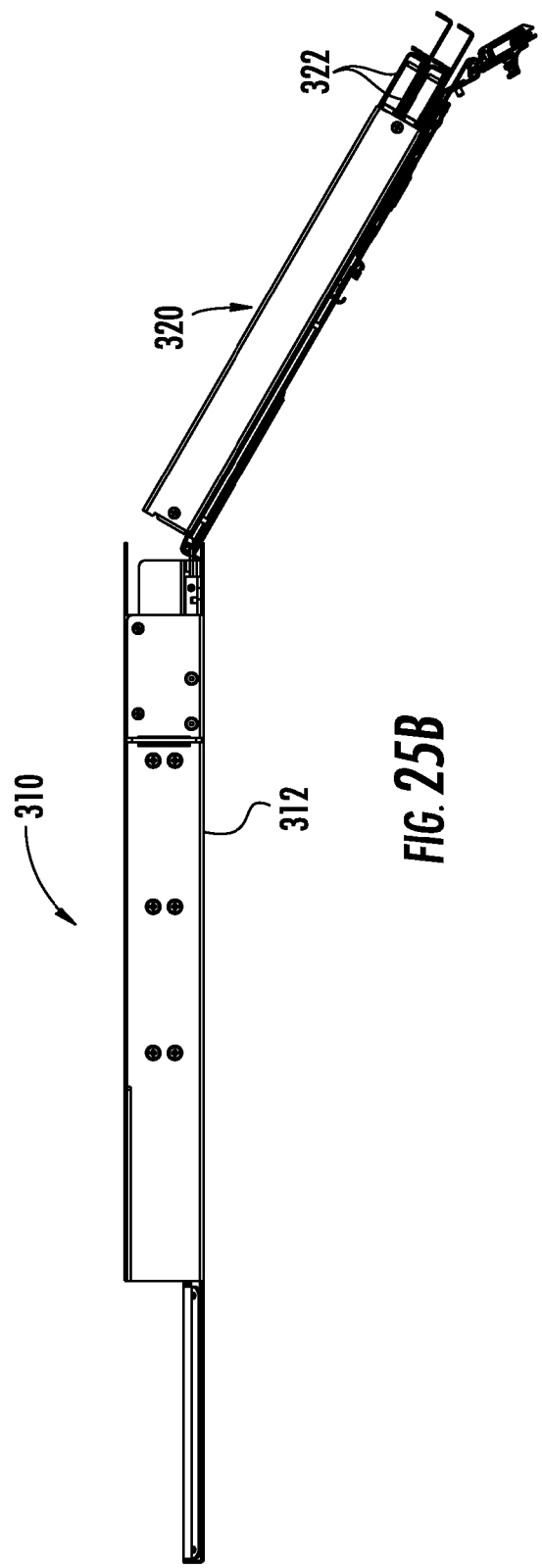
FIG. 25B is a side view of the fiber optic equipment drawer in FIG. 25A.

FIGS. 25A and 25B are provided to summarize certain capabilities and features of the fiber optic equipment 310 and fiber optic equipment drawer 320 of FIG. 24. Embodiments of these capabilities and features will be described in more detail in this description. FIG. 25A is a front perspective view of the chassis 312 and fiber optic equipment drawer 320. FIG. 25B is a side view of the chassis 312 and fiber optic equipment drawer 320. As illustrated in FIG. 25A, the front chassis cover 324 and the rear chassis cover 325 (FIG. 24) are removed from the chassis 312 so that fiber optic modules supported by the fiber optic equipment trays 322 inside the fiber optic equipment drawer 320 can be seen. The fiber optic equipment drawer 320 can be extended out from the chassis 312 to extend fiber optic modules installed in the fiber optic equipment trays 322 out from the chassis 312 to gain access to the fiber optic modules and the fiber optic connections therein. As illustrated in FIGS. 25A and 25B, the fiber optic equipment drawer 320 is pulled or extended fully from the chassis 312 and tilted downward. The fiber optic equipment drawer 320 can be tilted downward to tilt the fiber optic modules installed in the fiber optic equipment trays 322 downward if desired, as illustrated in FIGS. 25A and 25B. Tilting the fiber optic equipment drawer 320 downward may be particularly useful if the fiber optic equipment drawer 320 is located at taller heights in a fiber optic equipment rack. The desired fiber optic module to be accessed can be further separated for enhanced access, if desired, by pulling out the fiber optic equipment tray 322 supporting the fiber optic module from the fiber optic equipment drawer 320.

As will be described in more detail below, each fiber optic equipment tray 322 is also independently translatable from the fiber optic equipment drawer 320, whether or not the fiber optic equipment drawer 320 is extended out from the chassis 312 or tilted downward, similar to that provided in FIGS. 2A and 2B as an example. In this manner, enhanced access can be provided to the fiber optic modules provided in the fiber optic equipment trays 322. Access includes installing, configuring, re-configuring, re-installing, and removing the fiber optic modules and the fiber optic connections provided therein as an example. Further, each fiber optic module installed in a fiber optic equipment tray 322 in this embodiment can be translated or removed independent from other fiber optic modules in a given fiber optic equipment tray 322 for further access, if desired.

FIGS. 26-32B will now be referenced to describe the various capabilities and features of the fiber optic equipment 310 and fiber optic equipment drawer 320 of FIG. 24 by example in more detail.

Figure 26:
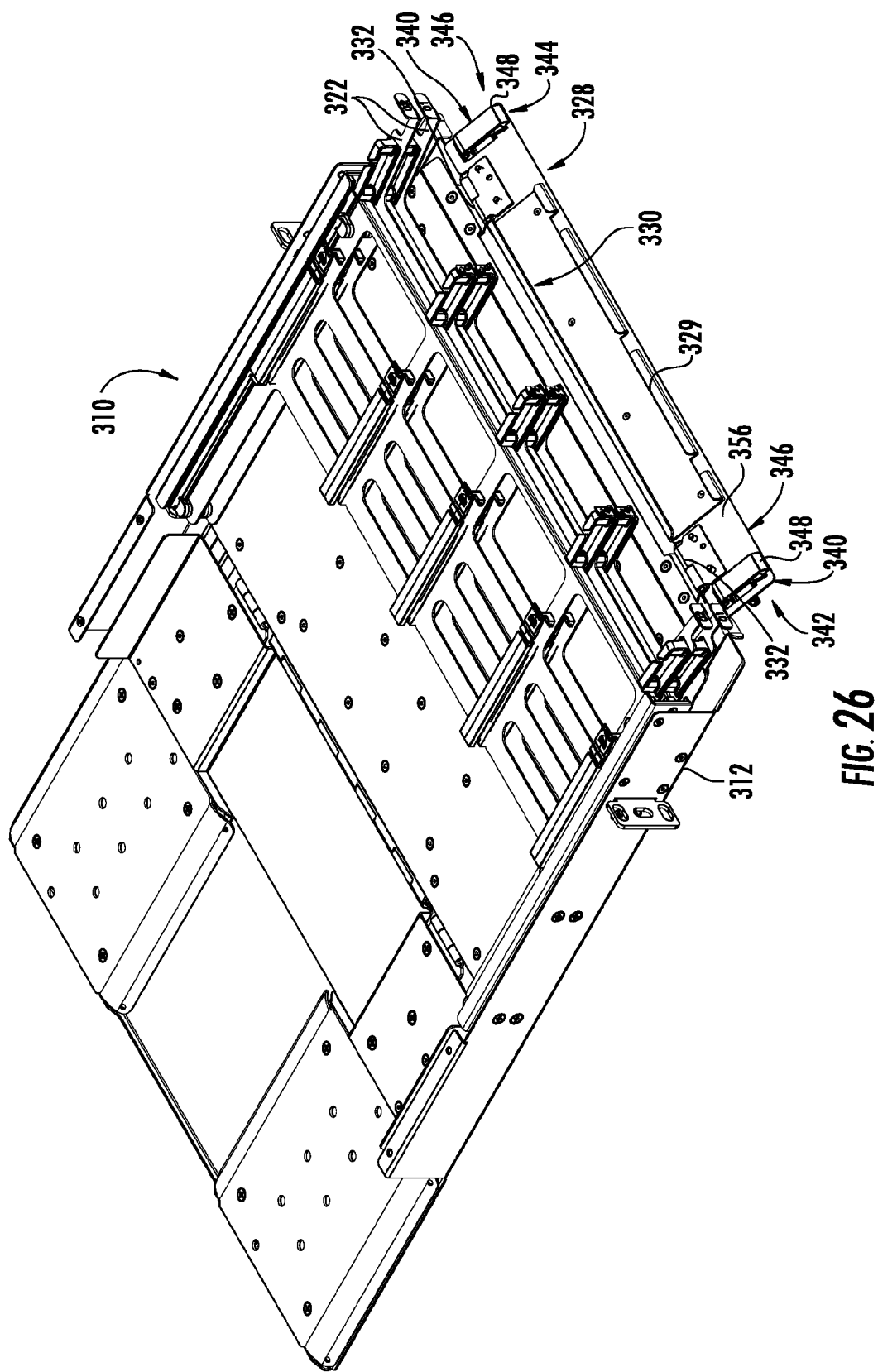
FIG. 26 is a front perspective view of the fiber optic equipment drawer and chassis of FIG. 24 with the drawer door lowered according to one embodiment.

FIG. 26 is a front perspective view of the fiber optic equipment 310 and fiber optic equipment drawer 320 of FIG. 24 with the fiber optic equipment drawer 320 fully retracted into the chassis 312. The front chassis cover 324 and rear chassis cover 325 are removed to facilitate discussion of the components of and inside the fiber optic equipment drawer 320. The fiber optic equipment drawer 320 includes a drawer door 328 in this embodiment. The drawer door 328 controls access to the fiber optic equipment trays 322. The drawer door 328 may also contain labeling that, for example, can be provided in a label holder 329 to identify optical fiber connections made in the fiber optic equipment drawer 320. The drawer door 328 is illustrated as being opened in FIG. 26. When the fiber optic equipment trays 322 are fully retracted into the fiber optic equipment drawer 320, as illustrated in FIG. 26, the drawer door 328 can be closed and locked to the chassis 312 to close off access to the fiber optic equipment trays 322. In this embodiment, the drawer door 328 is hingedly attached to a front end 330 of the fiber optic equipment drawer 320. In this manner, the drawer door 328 is retained with the fiber optic equipment drawer 320 when the drawer door 328 is opened, as illustrated in FIG. 26.

To retain the drawer door 328 closed to the chassis 312 in this embodiment, a drawer door locking mechanism 340 is provided. The drawer door locking mechanism 340 is similar to the drawer door locking mechanism 40 previously discussed and illustrated in FIGS. 3-5. The drawer door locking mechanism 340 is configured to releasably retain the drawer door 328 closed to the chassis 312, and more particularly to the front chassis cover 324. As illustrated in FIG. 26, two drawer door locking mechanisms 340 are provided; one for a left side end 342 and one for a right side end 344 of the drawer door 328. In this embodiment, the drawer door locking mechanism 340 is comprised of a push button latch 346 like or similar to the push button latch 46 previously discussed and illustrated in FIG. 5. The push button latch 346 is configured to engage a latch 348 with the latch orifice 351 (FIG. 24) disposed in the front chassis cover 324 to retain the drawer door 328 closed. Push button latches 346 are each disposed in the drawer door 328, one on the left side end 342 and one on the right side end 344, in this embodiment as illustrated in FIG. 26. Two latch orifices 351 (FIG. 24) are disposed in the front chassis cover 324 and configured to receive the latches 348 to lock the drawer door 328. The push button latches 346 in this embodiment are spring-loaded such that when a force is not applied to the push buttons 350, the latches 348 are biased upward to retain the latches 348 engaged with the latch orifices 351 when the drawer door 328 is closed.

When it is desired to pull out one or more of the fiber optic equipment trays 322, the drawer door 328 can be unlocked from the front chassis cover 324 and opened. The push buttons 350 are configured to move the latches 348 downward to overcome the spring-loaded force in the push button latch 346 when a downward force is applied to the push buttons 350, like the push buttons 50 previously described and illustrated in FIGS. 3-5. When the push buttons 350 are pushed downward, the latches 348 are disengaged from the latch orifices 351 in the front chassis cover 324 to unlock the drawer door 328. The drawer door 328 can then be opened from the front chassis cover 324. When opened, the drawer door 328 can swing downward about hinges 332.

As previously discussed, the fiber optic equipment drawer 320 in the fiber optic equipment 310 is configured to be pulled out from the chassis 312 for enhanced access to the fiber optic equipments trays 322 and/or to the fiber optic modules contained therein. In this regard, FIG. 27A provides a front perspective view of the fiber optic equipment 310 and fiber optic equipment drawer 320 of FIG. 24 with the drawer door 328 opened and lowered and the fiber optic equipment drawer 320 extended out from the chassis 312. To further illustrate the fiber optic equipment drawer 320 and its various features and components, a top view of the fiber optic equipment drawer 320 is illustrated in FIG. 27B. The fiber optic equipment drawer 320 is configured to provide several features, some or all which can be provided. In this embodiment, the fiber optic equipment drawer 320 includes a front panel 358 attached to a rear panel 360. The front panel 358 and rear panel 360 may be formed from sheet metal or any other form or type of material desired. The front panel 358 is configured to support one or more fiber optic equipment trays 322 and fiber optic modules disposed in the fiber optic equipment trays 322, as previously discussed and also illustrated in FIG. 27A.

Figure 28:
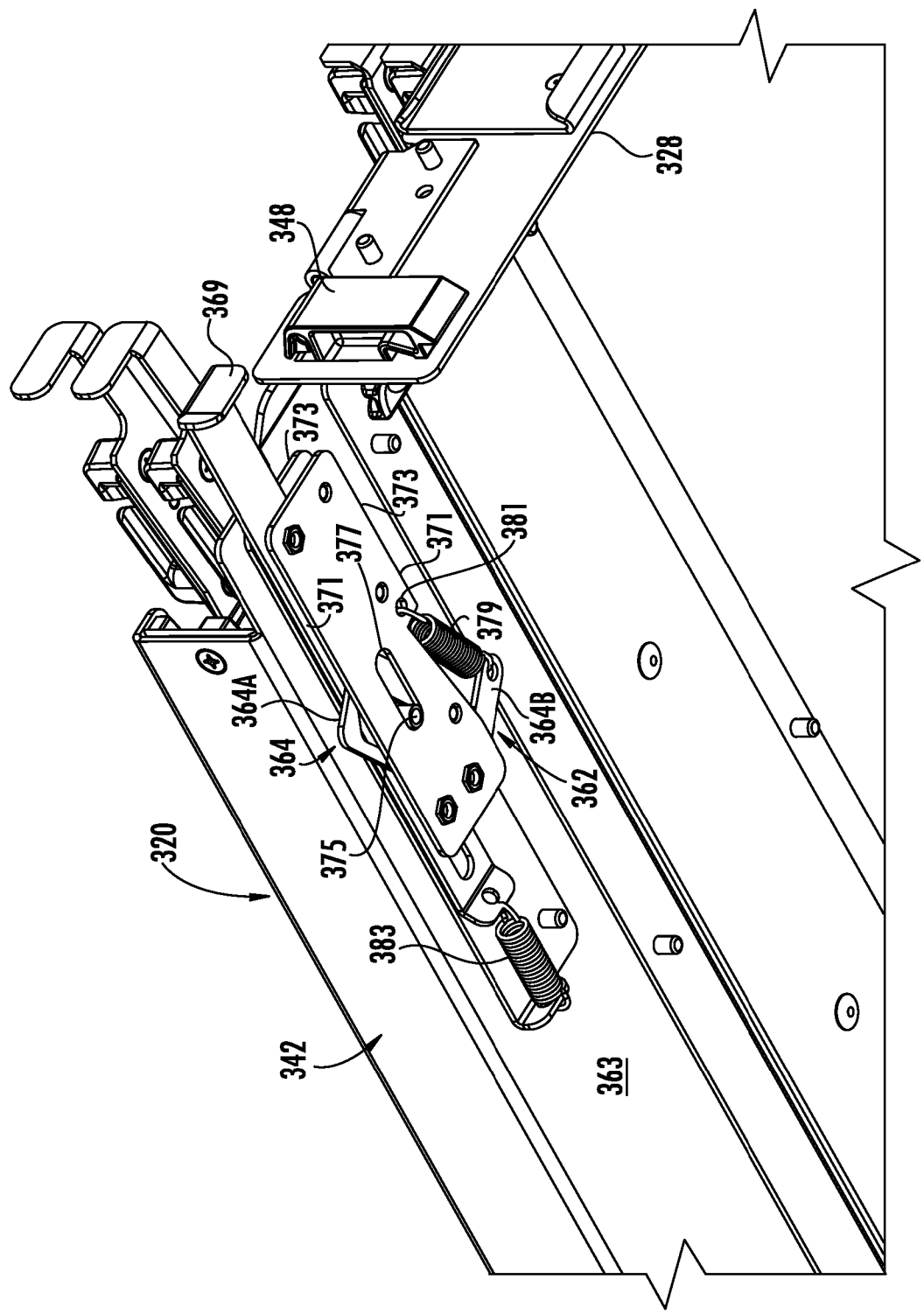
FIG. 28 is a bottom perspective, close-up view of a left end drawer retention member of the fiber optic equipment drawer of FIG. 24.

With continuing reference to FIG. 27B, the fiber optic equipment drawer 320 includes two drawer retention members 362 disposed in the front panel 358. The two drawer retention members 362 are disposed on a bottom side 363 of the front panel 358 as illustrated in FIG. 28. The drawer retention members 362 are configured to releasably retain the fiber optic equipment drawer 320 in the chassis 312 until released to release the fiber optic equipment drawer 320 from the chassis 312. The fiber optic equipment drawer 320 can be pulled out from the chassis 312 when the drawer retention members 362 are released.

In this embodiment, the drawer retention members 362 are provided in the form of elbow latches 364. The elbow latch 364 contains two elbow sections 364A, 364B in this embodiment. One elbow latch 364 is illustrated in FIG. 28, because only the left side end 342 of the fiber optic equipment drawer 320 is illustrated. However, note that another drawer retention member 362 and elbow latch 364 are also disposed on the bottom side 363 of the front panel 358 on the right side end 344 of the fiber optic equipment drawer 320. The elbow latches 364 are configured to align with and interfere with rearward biased latch engagement members 368 (FIG. 27B) disposed in the chassis 312 to retain the fiber optic equipment drawer 320 when retracted into the chassis 312. In this regard, the elbow sections 364A on each elbow latch 364 will be disposed on rearward sides 386 of the latch engagement members 368 (FIG. 27A) and configured to interfere with the latch engagement members 368 to retain the fiber optic equipment drawer 320 in the chassis 312. When the drawer retention members 362 are released, the elbow latches 364 are pulled inward to clear interference of the latch engagement members 368 with the elbow sections 364A to allow the elbow sections 364A on each elbow latch 364 to pass unimpeded past the latch engagement members 368 and into a forward side 390 of the latch engagement members 368 (FIG. 27A) to allow the fiber optic equipment drawer 320 to be pulled out from the chassis 312.

Figure 29A:
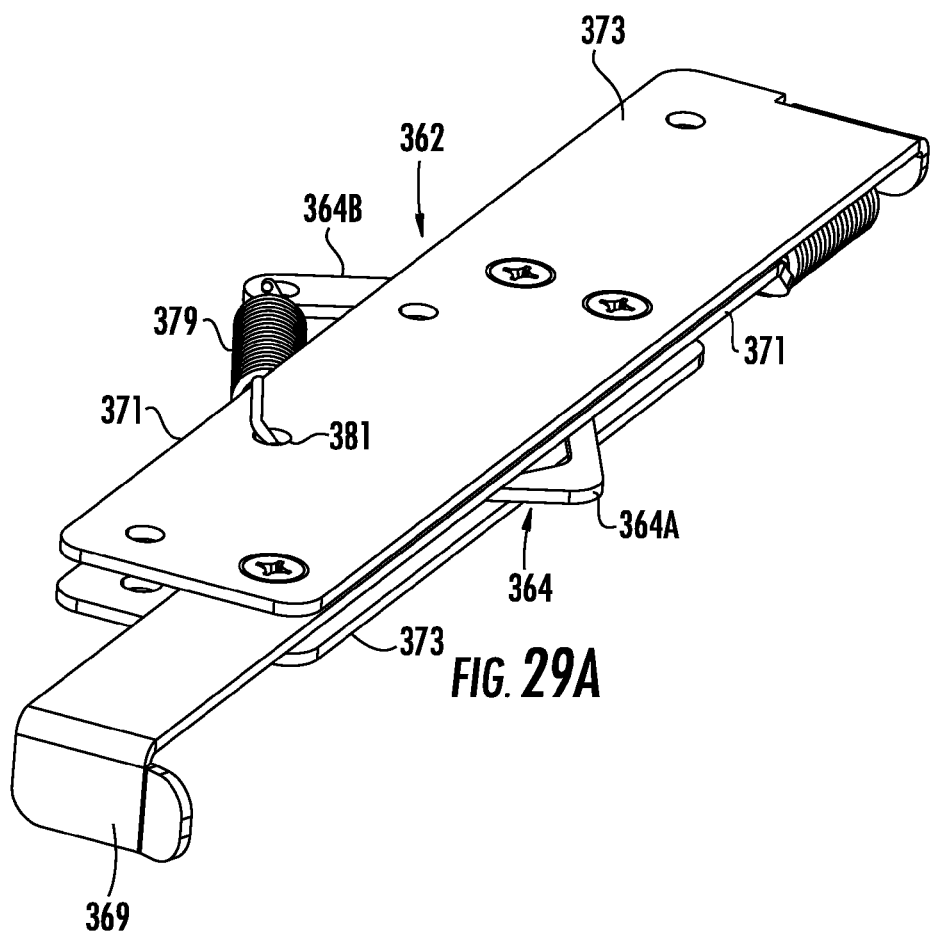
FIG. 29A is a perspective, right-side, isolated view of a right end drawer retention member of the fiber optic equipment drawer of FIG. 24.
Figure 29B:
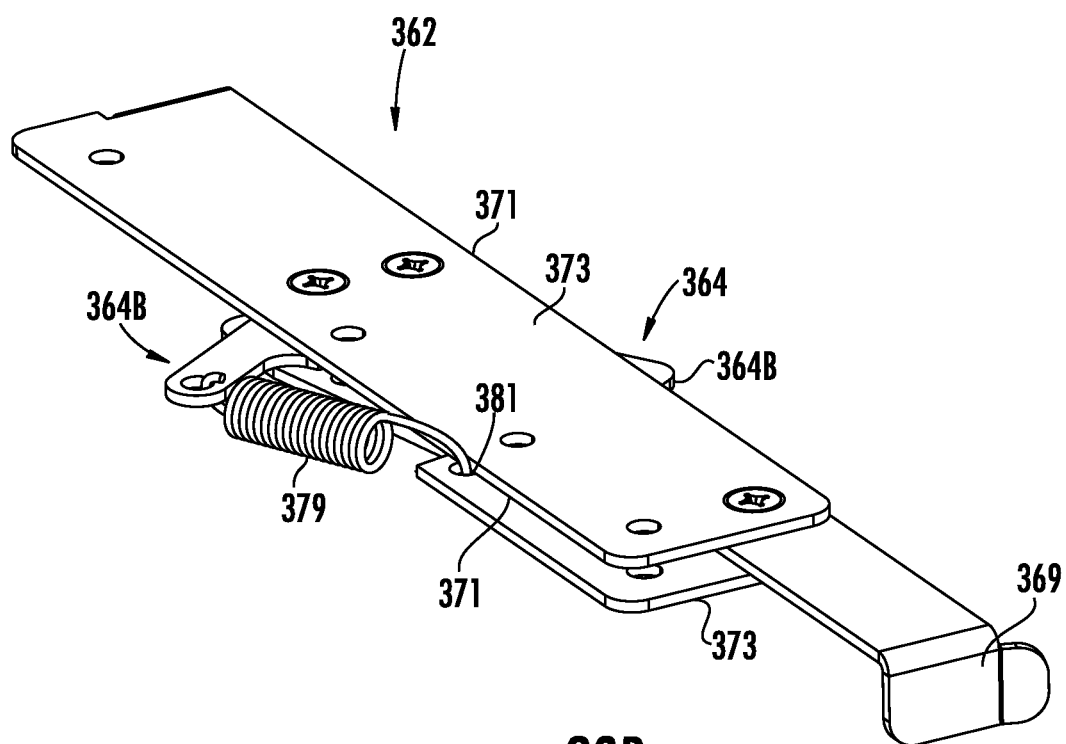
FIG. 29B is a perspective, left-side, isolated view of the drawer retention member of FIG. 29A.

FIGS. 28-29B illustrate more detail regarding the drawer retention members 362. FIG. 28 illustrates a drawer retention member 362 disposed on the left side end 342 on the bottom side 363 of the front panel 358 of the fiber optic equipment drawer 320. FIGS. 29A and 29B are perspective, isolated views of a drawer retention member 362 designed to be disposed on the right side end 344 of the bottom side 363 of the front panel 358 of the fiber optic equipment drawer 320. As illustrated in FIG. 28, the drawer retention member 362 includes a drawer pull release 369. The drawer pull release 369 is mechanically coupled to the elbow latch 364. When the drawer pull release 369 is pulled, the elbow sections 364A, 364B collapse inward toward outside edges 371 of two parallel or substantially parallel plate members 373 of the drawer retention members 362. A pin 375 connected to the elbow latch 364 and disposed in a slot 377 in a plate member 373 limits the pulling distance of the drawer pull release 369 and thus the distance of collapse to the elbow latch 364. The elbow latch 364 in this embodiment is disposed between the plate members 373 so that the elbow latch 364 is free to expand and retract outside and inside, respectively, from the plate members 373. When the elbow latch 364 is collapsed, the elbow sections 364A of each elbow latch 364 will be able to clear the interference with the latch engagement member 362 thereby allowing the fiber optic equipment drawer 320 to be released from the chassis 312. In this embodiment, because two drawer retention members 362 are included in the fiber optic equipment drawer 320, both drawer pull releases 369 of the drawer retention members 362 are pulled to release the fiber optic equipment drawer 320. However, one drawer retention member 362 could be provided so only one drawer pull release 369 would need to be pulled to release the fiber optic equipment drawer 320 from the chassis 312.

A spring 379 can also be included in the elbow latch 364, as illustrated in FIGS. 28-29B. Providing the spring 379 in the elbow latch 364 causes the elbow latch 364 to be biased outward in an expanded position. In this embodiment, the spring 379 is coupled inline to the elbow section 364B, but could also be coupled inline to the elbow section 364A, if desired. In this embodiment, the spring 379 is coupled between the elbow section 364B and an orifice 381 disposed in a plate member 373. Another spring 383 may also be coupled between the drawer pull release 369 and the fiber optic equipment drawer 320 as illustrated in FIG. 28. The spring 383 biases the drawer pull release 369 inward so the drawer pull release 369 retracts back towards the fiber optic equipment drawer 320 when a pulling force applied to the drawer pull release 369 is released.

After the fiber optic equipment drawer 320 is released from the chassis 312 via release of the drawer retention member 362, the fiber optic equipment drawer 320 is free to be pulled out from the chassis 312. The fiber optic equipment drawer 320 can be retracted in the chassis 312 to lock the fiber optic equipment drawer 320 in the chassis 312. When the fiber optic equipment drawer 320 is retracted, the elbow sections 364A of each elbow latch 364 will eventually come into contact with the latch engagement members 368 (FIG. 27B). Because the latch engagement members 368 are rearward biased, the contact between the latch engagement members 368 with the elbow sections 364A as the fiber optic equipment drawer 320 is pushed into the chassis 312 will cause the elbow latch 364 to collapse inward. The elbow section 364A will thereafter be disposed on the rearward side 386 of the latch engagement members 368 to retain the fiber optic equipment drawer 320 in the chassis 312.

Figure 30A:
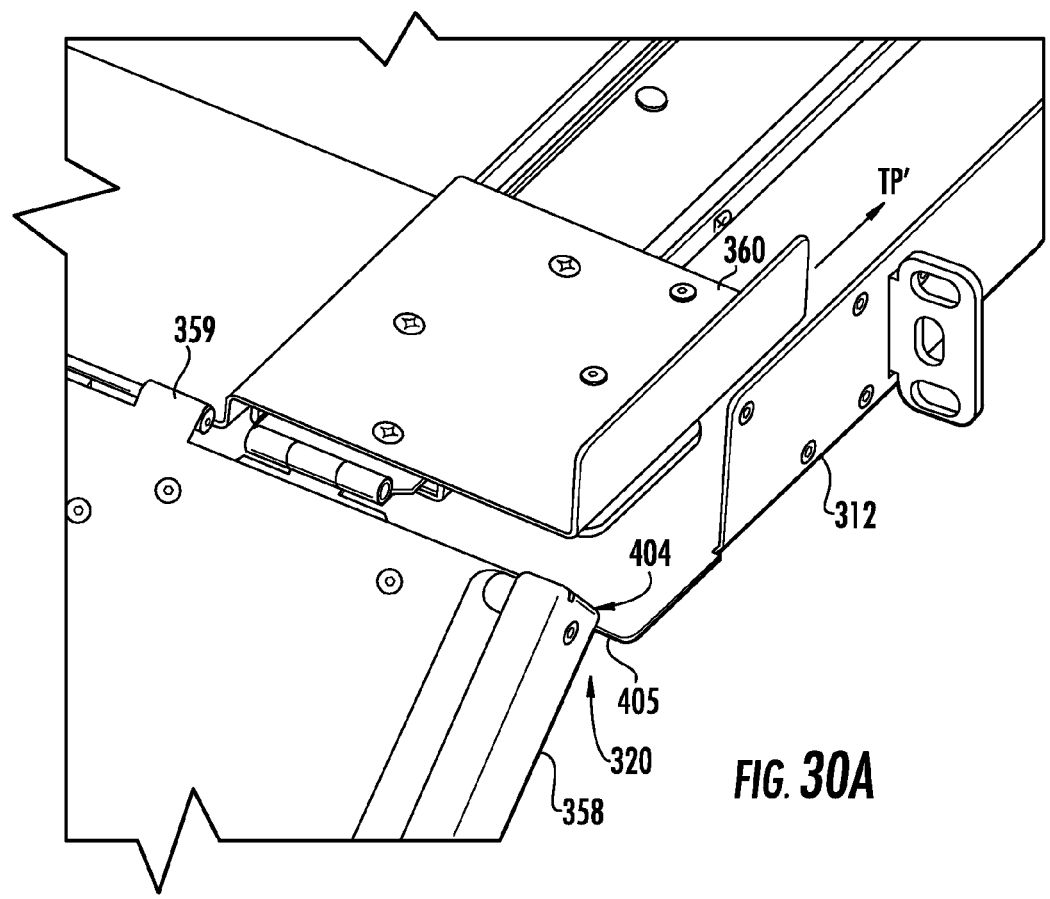
FIG. 30A is a perspective, close-up view of the front panel and rear panel of the fiber optic equipment drawer of FIG. 24 with the front panel tilted downward.
Figure 30B:
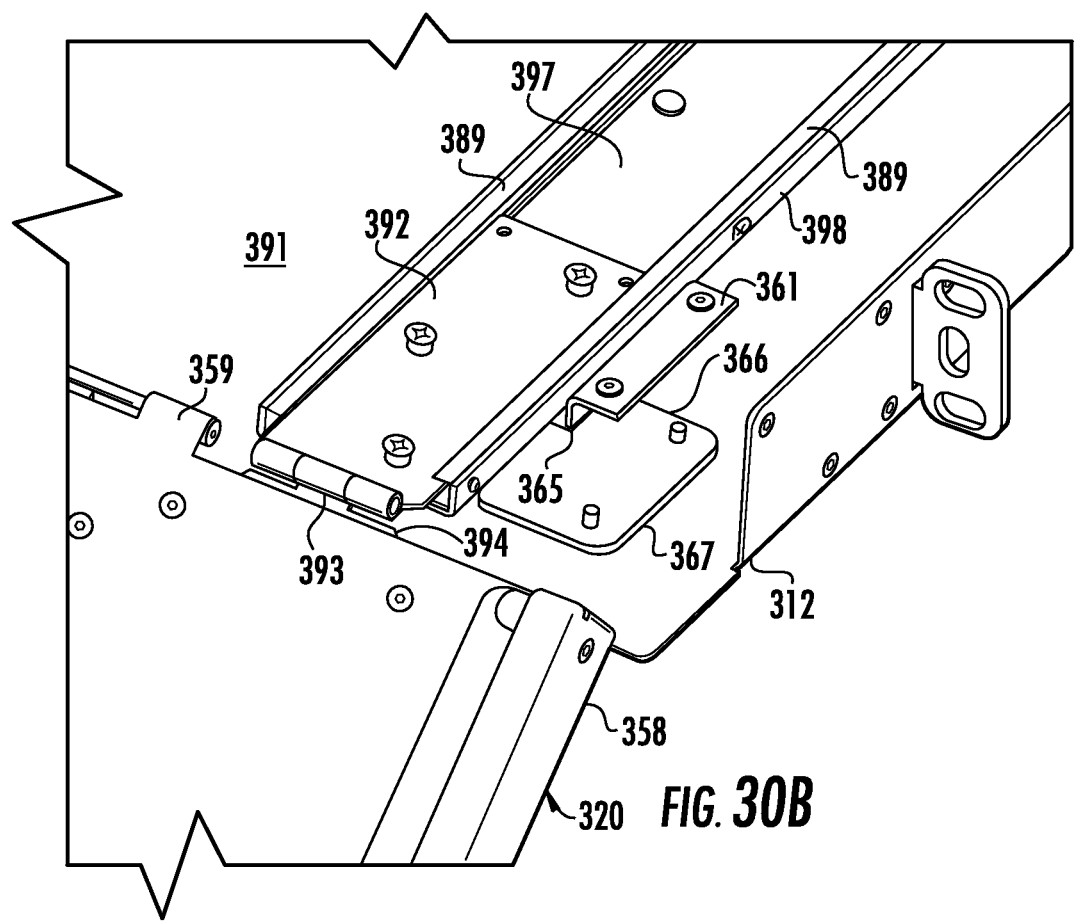
FIG. 30B is a perspective, close-up view of a drawer pull-out limiting member of the fiber optic equipment drawer of FIG. 24.

Another feature that may be provided in the fiber optic equipment drawer 320 is a drawer pull-out limiting member to limiting the pull out distance of the fiber optic equipment drawer 320. FIGS. 30A and 30B illustrate this feature. FIG. 30A is a close-up perspective view of the fiber optic equipment drawer 320 and the front panel 358 and rear panel 360 in particular. The rear panel 360 is configured to travel back into the chassis 312 along travel path TP' when the front panel 358 is brought planar to the rear panel 360 and pushed back along travel path TP' via linkage members 359 as will be described in more detail below. The front panel 358 is obscuring the view of a drawer pull-out limiting member 366. FIG. 30B illustrates the perspective view of the fiber optic equipment drawer 320 of FIG. 30A, but with the rear panel 360 removed for illustration purposes. As illustrated in FIG. 30B, the drawer pull-out limiting member 366 is provided in the form of a plate member 367 attached to a base 391 of the chassis 312. A tab member 361, which is fixedly attached to the bottom side of the rear panel 360, travels along the travel path TP' as the rear panel 360 moves along the travel path TP'. When the rear panel 360 is pulled out such that the tab member 361 enters a keyed section 365 of the plate member 367, the tab member 361 will abut the plate member 367 and prevent the rear panel 360 from extending beyond the keyed section 365, thus preventing the front panel 358 from further extending out from the chassis 312.

Figure 31A:
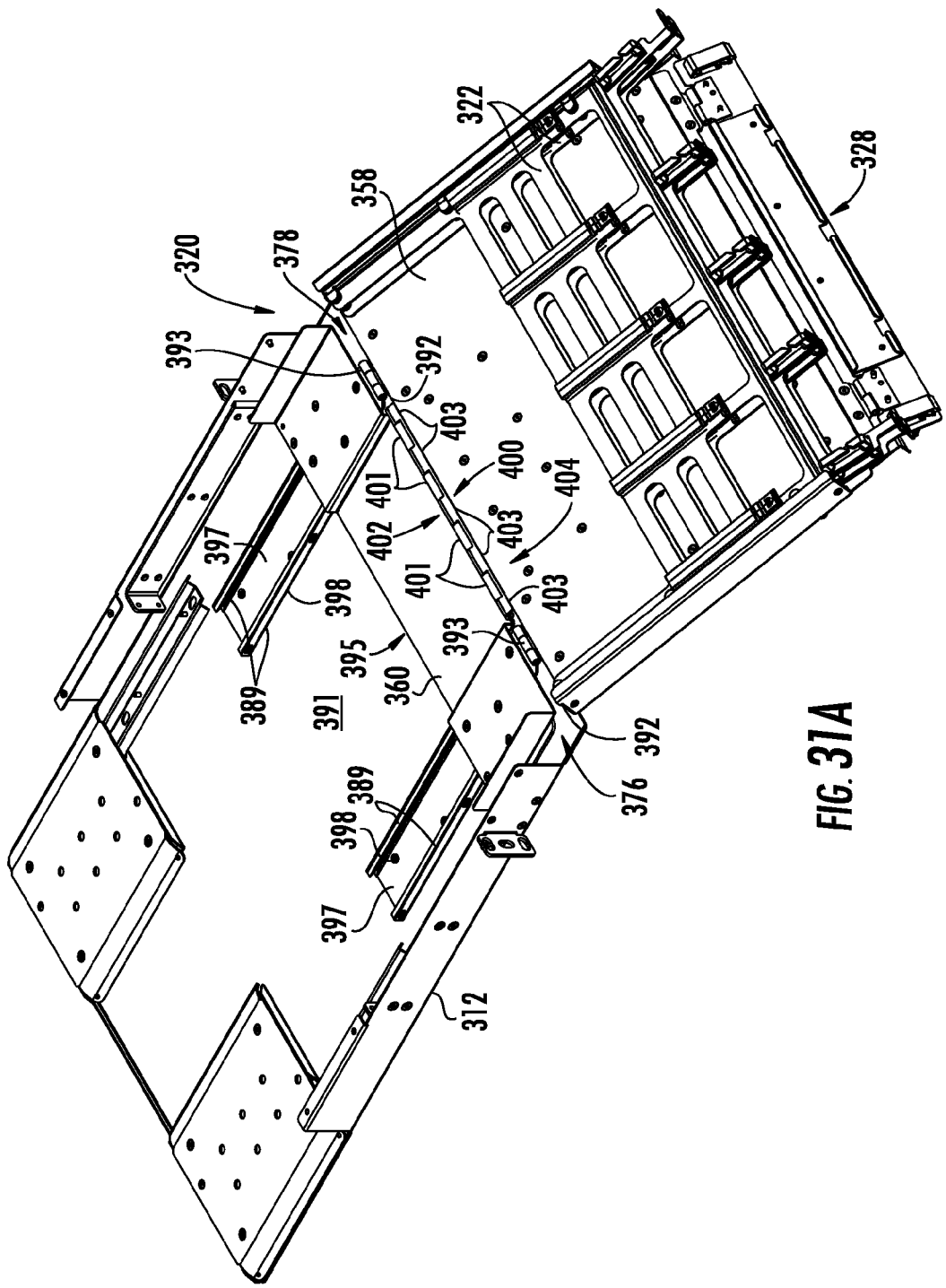
FIG. 31A is a front perspective view of the fiber optic equipment drawer of FIG. 24 fully pulled out from the chassis and tilted downward.
Figure 31B:
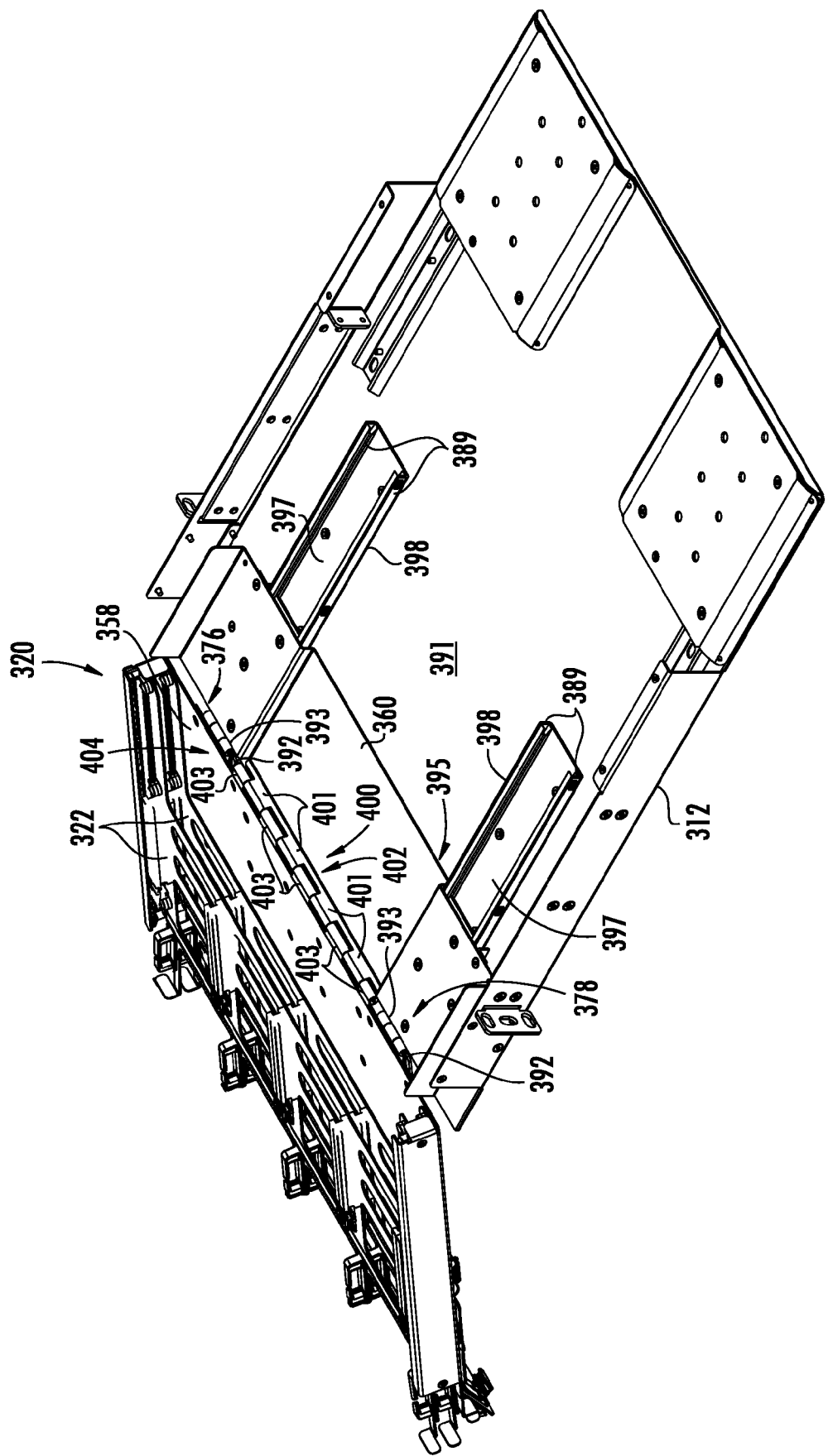
FIG. 31B is a rear perspective view of the fiber optic equipment drawer in FIG. 31A.
Figure 32A:
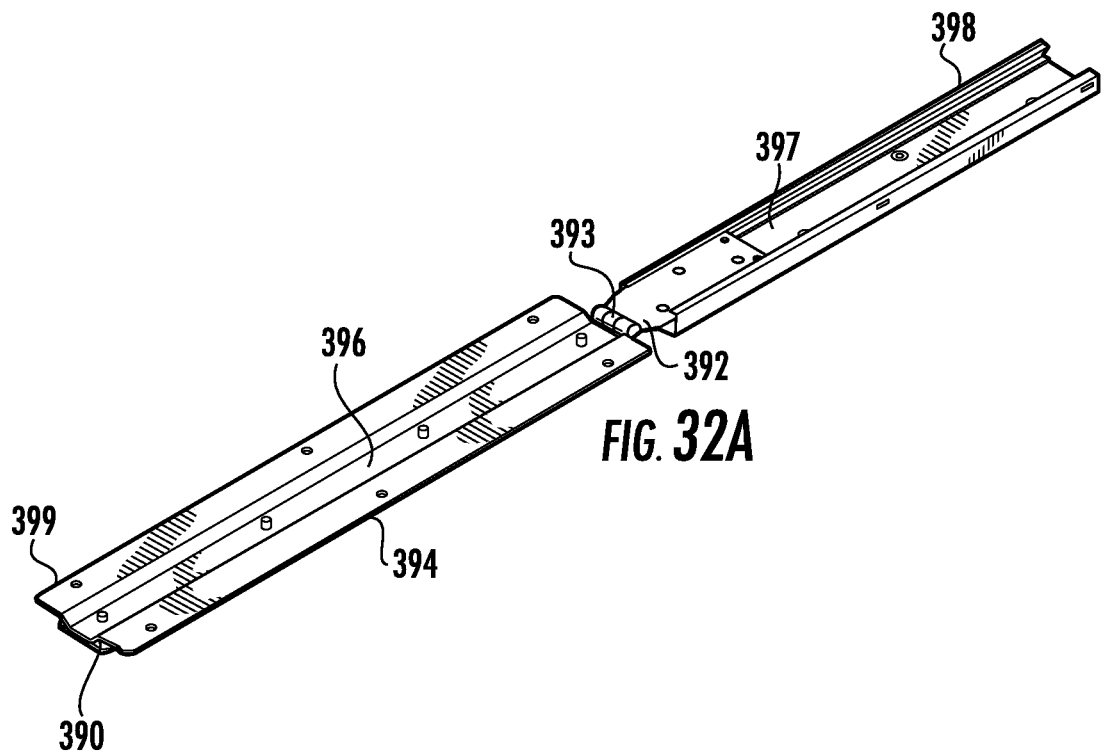
FIG. 32A is a perspective, close-up view of a drawer guide fully extended out from a drawer rail disposed in the fiber optic equipment drawer of FIG. 24.
Figure 32B:
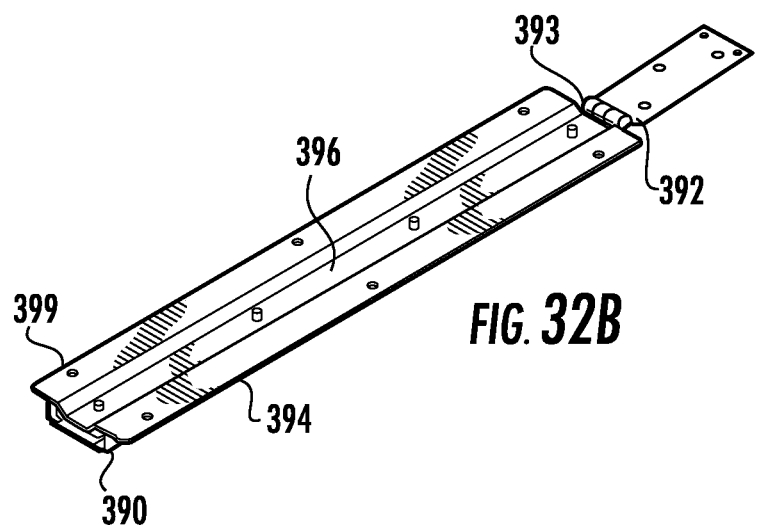
FIG. 32B is a perspective, close-up view of the drawer guide of FIG. 32A retracted fully into the drawer rail in the fiber optic equipment drawer of FIG. 24.

FIG. 30B and FIGS. 31A-32B illustrate the movement and tilt mechanism of fiber optic equipment drawer 320. Thus, the tilt mechanism of the fiber optic equipment drawer 320 will be described in detail. As illustrated in FIGS. 30B and 31A-32B, the fiber optic equipment tray 320 is configured to move in and out of the chassis 312 to provide enhanced access to the fiber optic equipment trays 322 and any fiber optic modules (not shown) supported therein. FIGS. 31A and 31B illustrate front and rear perspective views of the fiber optic equipment drawer 320 extended out from the chassis 312 with the front panel 358 tilted. In this embodiment, the fiber optic equipment drawer 320 moves in and out of the chassis 312 about outer guide members 389 disposed in two drawer rail guides 398 disposed in the base 391 of the chassis 312 as illustrated in FIGS. 31A and 31B. Two complimentary drawer rails 392 are fixedly connected to hinges 393 which are connected to linkage members 394, as illustrated in FIGS. 32A and 32B. The linkage members 394 are fixedly attached to a bottom side 395 of the fiber optic equipment drawer 320. Movement of the fiber optic equipment drawer 320 applies force to the linkage members 394 which in turn apply force on the drawer rails 392 causing them to move inside the drawer rail guides 398, as illustrated in FIG. 30B. The linkage members 394 includes a lower inner section 396 that travels along an inner section 397 of the drawer rail guide 398, as illustrated in FIG. 32A, when the fiber optic equipment drawer 320 is retracted.

The linkage members 394 also contain outer raised portions 399 so that the linkage members 394 do not interfere with the outer guide members 389 of the drawer rail guides 398 when the fiber optic equipment drawer 320 is retracted into the chassis 312. The drawer rail guides 398 may be made of sheet metal or other material, such as plastic, or may be a hybrid between a metal and a plastic. For example, the outer guide members 389 may be made of plastic with the other portions of the drawer rail guides 398 made of sheet metal.

FIGS. 31A-31B also illustrate tilt and tilt limiting features of the fiber optic equipment drawer 320 according to one embodiment. As previously discussed, tilting the fiber optic equipment drawer 320 downward can provide enhanced access to the fiber optic modules disposed in the fiber optic equipment drawer 320 and/or their fiber optic connections. As illustrated in FIG. 31A, the front panel 358 can tilt downward about the rear panel 360. The rear panel 360 remains oriented in a plane parallel or substantially parallel to the chassis 312. Because the fiber optic equipment trays 322 are disposed in the front panel 358, tilting of the front panel 358 also tilts the fiber optic equipment trays 322 for access.

The fiber optic equipment drawer 320 is configured to tilt downward via the hinges 393 and a hinge 400 disposed between the front panel 358 and the rear panel 360 of the fiber optic equipment drawer 320 in this embodiment. The hinge 400 is formed by rolled portions 401 on a front end 402 of the rear panel 360 interleaved with rolled portions 403 on a rear end 404 of the front panel 358. When interleaved, the rolled portions 401, 403 form the hinge 400 extending from a left side end 376 to a right side end 378 of the front and rear panels 358, 360. When the fiber optic equipment drawer 320 is pulled out such that the front panel 358 is pulled out beyond the chassis 312, the front panel 358 is free to tilt downward about the hinge 400. The tilt angle of the fiber optic equipment drawer 320 is controlled by the interference between the rear end 404 of the front panel 358 with a front end 405 of the chassis 312, as illustrated in FIG. 30A.

Figure 33A:
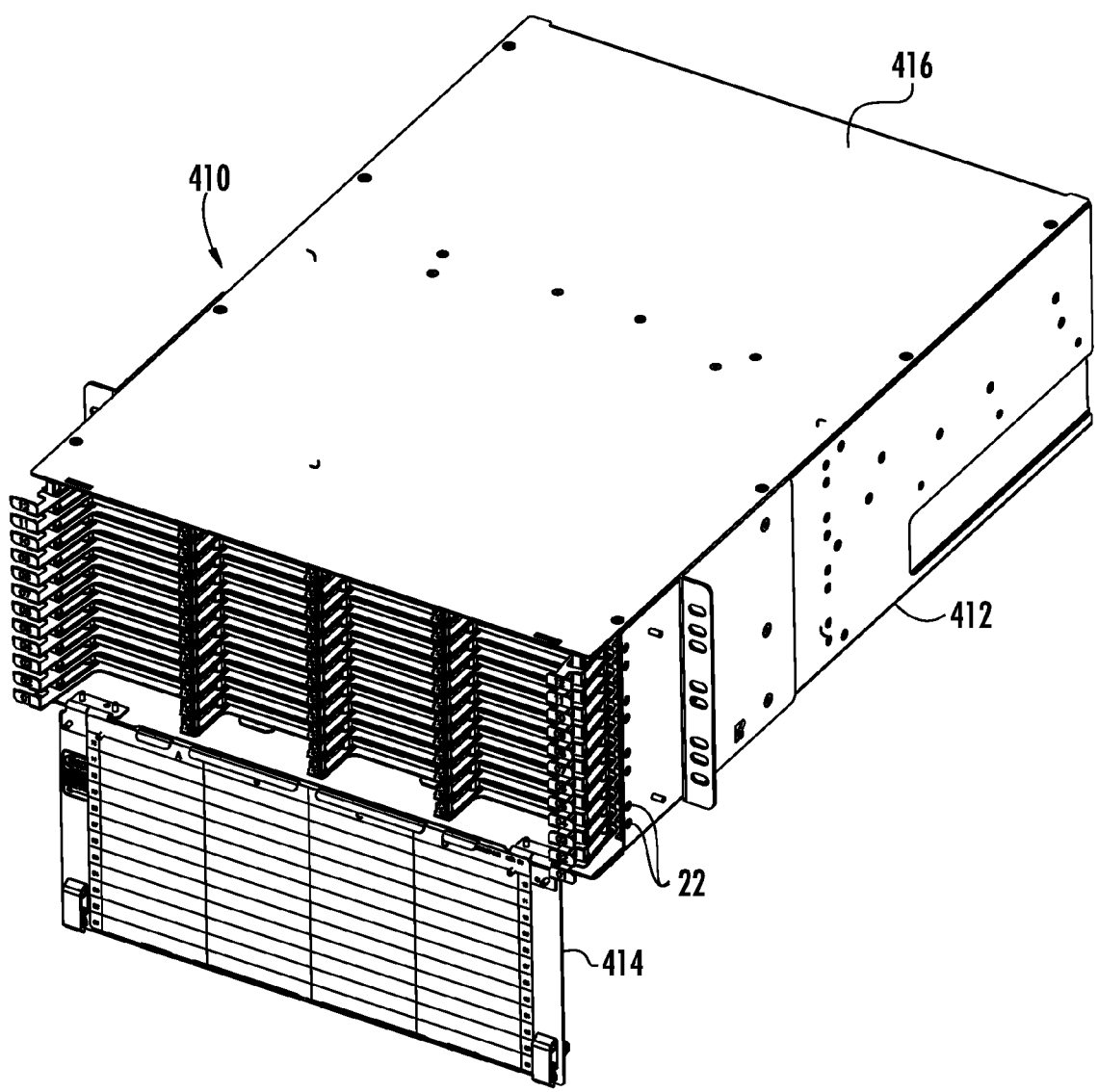
FIG. 33A is a front perspective view of alternative exemplary fiber optic equipment including independently moveable fiber optic equipment trays and fiber optic modules installed therein, according to another embodiment.
Figure 33B:
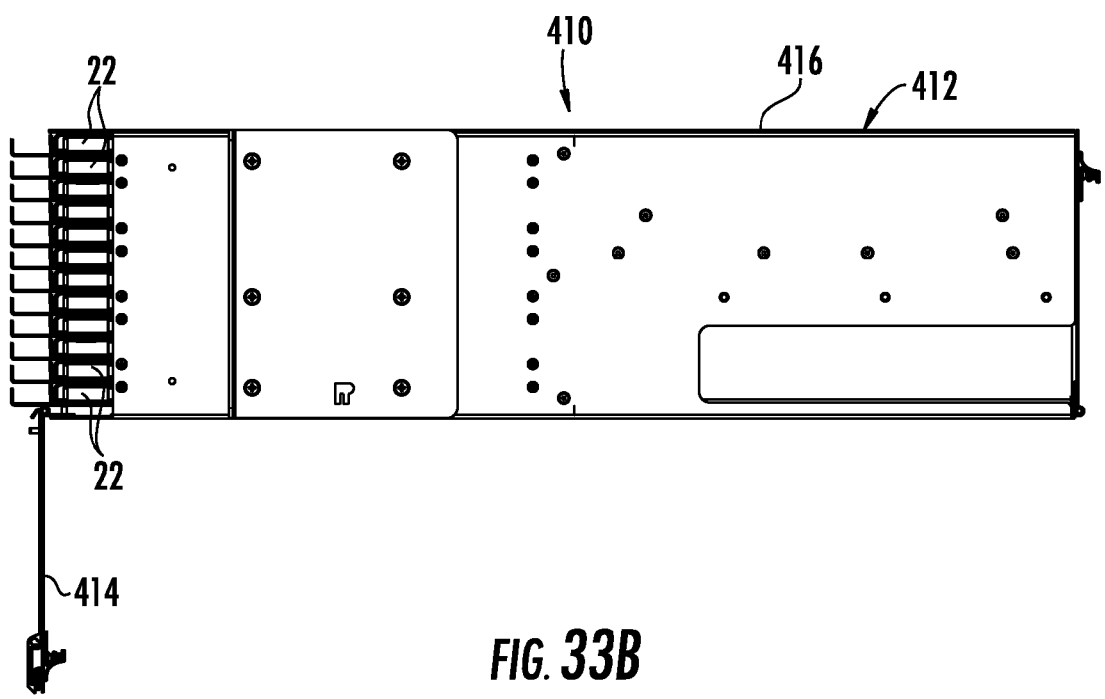
FIG. 33B is a side view of the fiber optic equipment drawer of FIG. 33A.
Figure 34:
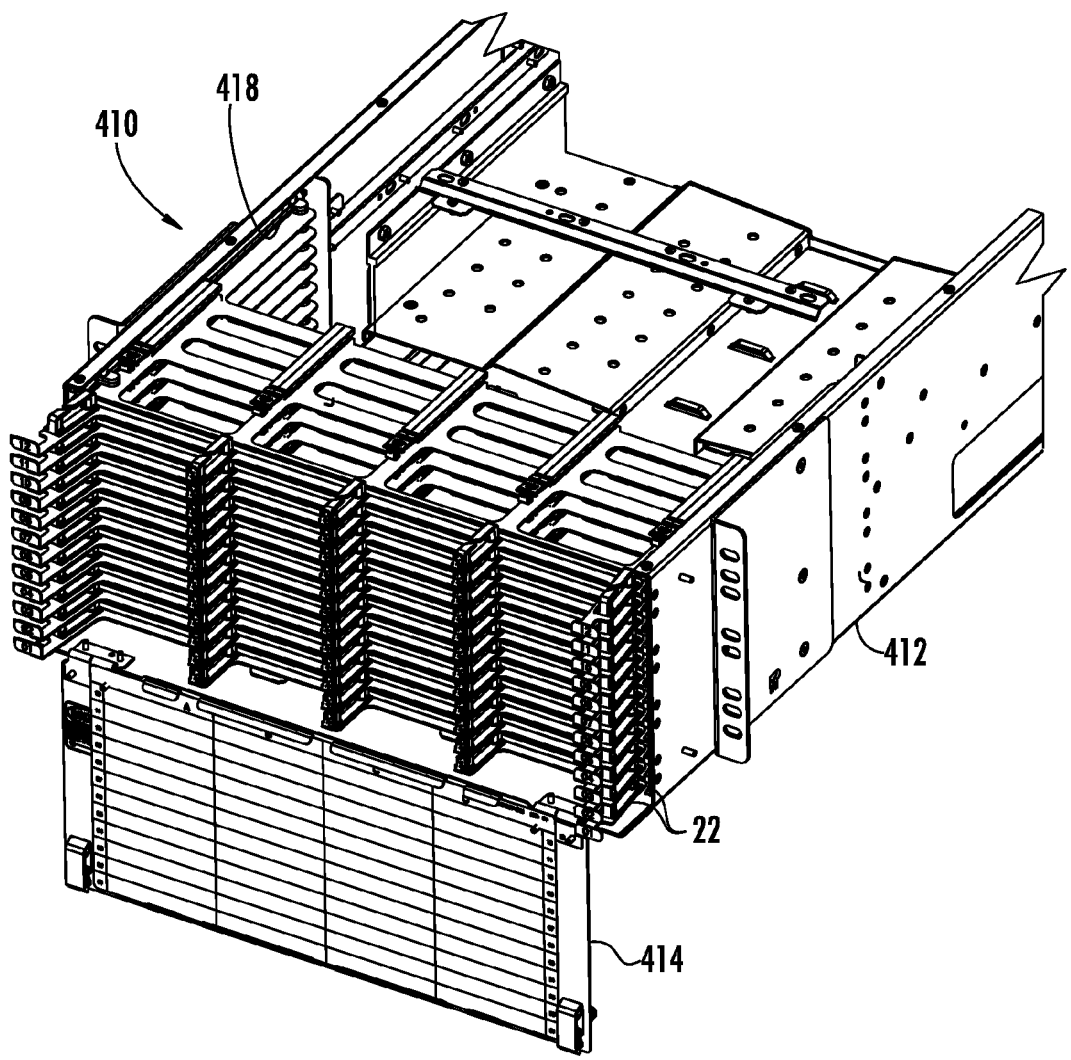
FIG. 34 is a front perspective view of the fiber optic equipment of FIG. 33A with the chassis cover removed.

FIGS. 33A-35 illustrate another embodiment of fiber optic equipment 410 that can include the same or essentially the same fiber optic equipment trays 22 previously described above and illustrated to support fiber optic modules 26. The fiber optic equipment 410 in this embodiment includes a 4-U sized chassis 412 configured to hold fiber optic equipment trays 22 each supporting one or more fiber optic modules 26. The fiber optic equipment trays 22 and fiber optic modules 26 supported by the chassis 412 are the same or essentially the same as those previously described above. Thus, the fiber optic equipment trays 22 disposed in the chassis 412 and fiber optic modules 26 disposed in the fiber optic equipment trays 22 do not need to be described again. FIG. 34A illustrates a front perspective view of the fiber optic equipment 410 with a front cover 414 lowered to show the fiber optic equipment trays 22 disposed inside the chassis 412. A chassis cover 416 (FIGS. 33A and 33B) is attached to the chassis 412 to secure the fiber optic equipment trays 22 and fiber optic modules contained therein (not illustrated). FIG. 33B illustrates a side view of the fiber optic equipment 410 illustrated in FIG. 33A. FIG. 34 illustrates the fiber optic equipment 410 as illustrated in FIG. 33A, but with the chassis cover 416 removed to show the fiber optic equipment trays 22 disposed inside the chassis 412.

The fiber optic modules 26 can be supported in the fiber optic equipment trays 22 previously described and illustrated in FIG. 15-18 as an example. The fiber optic equipment trays 22 can support one or more fiber optic modules like or similar to the fiber optic modules 26 previously described and illustrated in FIGS. 16A and 16B as an example. The fiber optic equipment 410 in this embodiment does not include a fiber optic equipment drawer. The fiber optic equipment trays 22 in this embodiment are supported directly by the chassis 412 as opposed to an intermediate fiber optic equipment drawer. The tray guides 74, 74' and tray rails 136 previously described in FIGS. 19A-21B can be used in the chassis 412 to support the fiber optic equipment trays 22 therein and to allow each fiber optic equipment tray 22 to be independently extended out from and retracted back into the chassis 412. However, in the chassis 412, up to twelve (12) fiber optic equipment trays 22 can be provided for a total of up to five hundred seventy-six (576) fiber optic connections (i.e., twelve (12) fiber optic equipment trays 22×four (4) fiber optic modules 26 per fiber optic equipment tray 22×twelve (12) fiber optic connections per fiber optic module 26). Thus, tray guides 418 disposed in the chassis 412, as illustrated in FIG. 34, can support up to twelve (12) fiber optic equipment trays 22. Otherwise, the tray guides 418 contain the same guide members and other features to support the fiber optic equipment trays 22 disposed therein as the tray guides 74 illustrated in FIGS. 19A and 19B and previously discussed.

Figure 35:
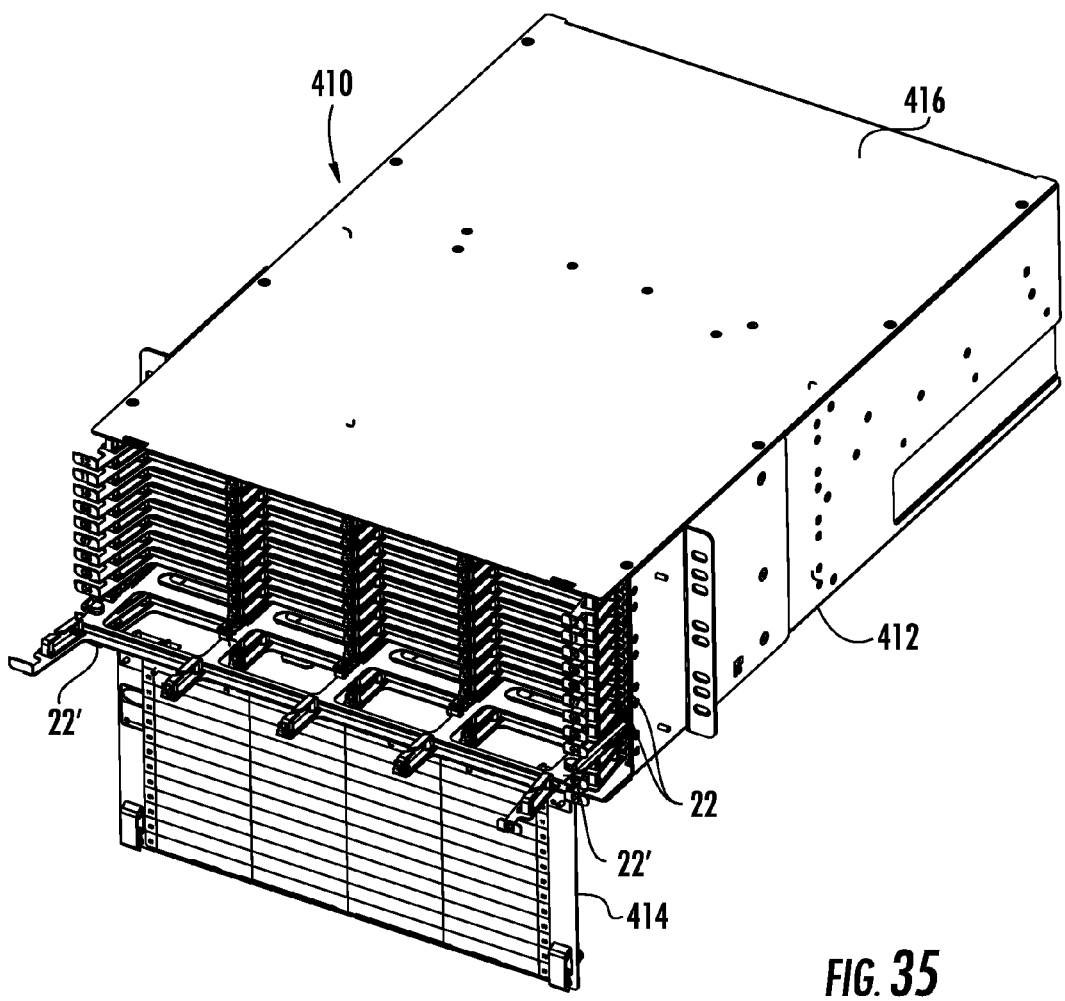
FIG. 35 is a front perspective view of the fiber optic equipment of FIG. 33A with a fiber optic equipment tray pulled out from the chassis.

FIG. 35 illustrates the fiber optic equipment 410 with one fiber optic equipment tray 22' extended out from the chassis 412. The fiber optic equipment tray 22' contains tray rails 136 just as illustrated in FIGS. 21A and 21B and previously described above to move about tray guides 74, just as illustrated in FIGS. 19A and 19B and previously described above. The fiber optic equipment tray 22' can be extended from the chassis 412 to provide enhanced access to fiber optic modules 26 contained therein and their fiber optic connections. When access is complete, the retracted fiber optic equipment tray 22' can be pushed back into the chassis 412 about the tray guides

418 just as previously described and illustrated for the fiber optic equipment trays 22 with regard to the chassis 12 and fiber optic equipment drawer 20.

Note that although the fiber optic equipment 410 illustrated in FIGS. 33A-35 does not include a fiber optic equipment drawer to allow the fiber optic equipment trays 22 to be pulled in and out of the chassis 412 collectively, a fiber optic equipment drawer could be provided. The fiber optic equipment drawer could be provided like or similar to the fiber optic equipment drawer 20 previously described and illustrated. The fiber optic equipment drawer could be designed to be retained and move in and out of the chassis 412, like the fiber optic equipment drawer 20 is retained and moved in and out of the chassis 12 previously described and illustrated. The fiber optic equipment tray 22 supported in the fiber optic equipment 410 would be inserted and supported in tray guides, like or similar to the tray guides 74 installed inside a fiber optic equipment drawer previously described and illustrated. Movement of the fiber optic equipment drawer would collectively move each of the fiber optic equipment trays 22. Providing a fiber optic equipment drawer, including like or similar to the fiber optic equipment drawer 20 previously described and illustrated, is not limited to any particular size, arrangement, or number of fiber optic equipment trays or fiber optic modules.

Many modifications and other embodiments of the invention set forth herein will come to mind to one skilled in the art to which the invention pertains having the benefit of the teachings presented in the foregoing descriptions and the associated drawings. These modifications include, but are not limited to, number or type of fiber optic equipment, fiber optic equipment drawer, features included in the fiber optic equipment drawer, including but not limited to retention features, pull out distance features, tilt features, and/or tilt limiting features. Any size equipment, including but not limited to 1-U, 2-U and 4-U sizes may include some or all of the aforementioned features, including but not limited to fiber optic equipment drawer(s), both tiltable and non-tiltable, fiber optic equipment tray(s), and fiber optic modules disclosed herein and some or all of their features. Further, the modifications are not limited to the type of fiber optic equipment tray or the means or device to support fiber optic modules installed in the fiber optic equipment trays. The fiber optic modules can include any fiber optic connection type, including but not limited to fiber optic connectors and adapters, and number of fiber optic connections, density, etc.

The terms "fiber optic cables" and/or "optical fibers" include all types of single mode and multi-mode light waveguides, including one or more optical fibers that may be upcoated, colored, buffered, ribbonized and/or have other organizing or protective structure in a cable such as one or more tubes, strength members, jackets or the like. Likewise, other types of suitable optical fibers include bend-insensitive optical fibers, or any other expedient of a medium for transmitting light signals. An example of a bend-insensitive optical fiber is ClearCurve® Multimode fiber commercially available from Corning Incorporated.

Therefore, it is to be understood that the embodiments are not to be limited to the specific embodiments disclosed and that modifications and other embodiments are intended to be included within the scope of the appended claims. It is intended that the embodiments cover the modifications and variations of this invention provided they come within the scope of the appended claims and their equivalents. Although specific terms are employed herein, they are used in a generic and descriptive sense only and not for purposes of limitation.

What is claimed is:

1. A fiber optic equipment guide panel, comprising:
   an elongated member; and
   at least one guide member disposed in the elongated member and configured to receive fiber optic equipment;
   wherein the elongated member is configured to be attached to a chassis; and
   further comprising at least one stopping member disposed within the at least one guide member, wherein the at least one stopping member is configured to receive at least one complementary member in the fiber optic equipment.

2. The fiber optic equipment guide panel of claim 1, wherein the fiber optic equipment includes at least one fiber optic equipment rail configured to be received within the at least one guide member.

3. The fiber optic equipment guide panel of claim 1, further comprising at least one aperture disposed in the elongated member to support attachment of the elongated member to the chassis.

4. The fiber optic equipment guide panel of claim 1, further comprising a pull-out limiting member disposed on an end of the at least one guide member.

5. The fiber optic equipment guide panel of claim 1, further comprising:
   a front pull-out limiting member disposed on a front end of the at least one guide member; and
   a rear pull-out limiting member disposed on a rear end of the at least one guide member.

6. The fiber optic equipment guide panel of claim 1, wherein the at least one stopping member is comprised of at least one detent or at least one protrusion.

7. The fiber optic equipment guide panel of claim 1, wherein the at least one stopping member is comprised of at least one leaf spring disposed in the at least one guide member.

8. The fiber optic equipment guide panel of claim 7, wherein the at least one leaf spring is provided in the form of at least one curly bracket.

9. The fiber optic equipment guide panel of claim 7, wherein the at least one leaf spring provides a force between two (2) and four (4) pounds (lbs).

10. The fiber optic equipment guide panel of claim 1, wherein the at least one stopping member is comprised of a plurality of stopping members disposed in the at least one guide member configured to provide a plurality of stopping positions for the fiber optic equipment during movement along the at least one guide member.

11. The fiber optic equipment guide of claim 1, wherein the chassis is comprised of a drawer.

12. The fiber optic equipment guide panel of claim 1, wherein the fiber optic equipment is comprised of a fiber optic module or a fiber optic equipment tray.

13. The fiber optic equipment guide panel of claim 1, comprising two of the fiber optic equipment guide panels disposed opposing each other in the chassis each configured to receive opposing ends of the fiber optic equipment.

14. A fiber optic equipment guide, comprising:
   a guide panel;
   at least one guide member disposed in the guide panel and configured to receive fiber optic equipment; and
   at least three stopping members disposed in the at least one guide member configured to provide one or more less stopping positions than the number of stopping members for the fiber optic equipment during movement in the at least one guide member.

15. The fiber optic equipment guide of claim 14, wherein the fiber optic equipment includes at least one fiber optic equipment rail configured to be received within the at least one guide member.

16. The fiber optic equipment guide of claim 14, wherein the fiber optic equipment is configured to engage at least two of the at least three stopping members to provide a stopping position for the fiber optic equipment.

17. The fiber optic equipment guide of claim 14, wherein the at least three stopping members are each configured to receive a complementary member in the fiber optic equipment.

18. The fiber optic equipment guide of claim 14, wherein the at least three stopping members are each comprised of either a detent or a protrusion.

19. The fiber optic equipment guide of claim 14, wherein at least one of the at least three stopping members is engaged by the fiber optic equipment for each of the stopping positions.

20. A fiber optic equipment guide, comprising:
a guide panel;
at least one guide member disposed in the guide panel and configured to receive fiber optic equipment;
at least one stopping member disposed in the at least one guide member configured to provide at least one stopping position for the fiber optic equipment during movement in the at least one guide member; and
at least one transition member disposed in the at least one guide member configured to allow a protrusion disposed in the fiber optic equipment to pass as a fiber optic equipment tray is translated within the at least one guide member.

21. The fiber optic equipment guide of claim 20, wherein the fiber optic equipment includes at least one fiber optic equipment rail configured to be received within the at least one guide member.

22. The fiber optic equipment guide of claim 20, wherein the at least one transition member includes at least one included surface.

23. The fiber optic equipment guide of claim 20, wherein the at least one transition member is disposed between a front end and a rear end of the at least one guide member.

24. The fiber optic equipment guide of claim 20, further comprising a pull-out limiting member disposed on an end of the at least one guide member.

25. The fiber optic equipment guide of claim 20, further comprising:
a front pull-out limiting member disposed on a front end of the at least one guide member; and
a rear pull-out limiting member disposed on a rear end of the at least one guide member.

26. A fiber optic equipment rail, comprising:
an elongated member configured to be attached to fiber optic equipment and received in a fiber optic equipment guide to move the fiber optic equipment about the fiber optic equipment guide; and
at least one detent disposed in the elongated member and configured to engage with the at least one stopping member disposed in the fiber optic equipment guide to provide at least one stopping position for the fiber optic equipment during movement about the fiber optic equipment guide; and
at least one protrusion disposed in the elongated member wherein the at least one protrusion is configured to engage with at least one transition member disposed in the fiber optic equipment guide.

27. The fiber optic equipment rail of claim 26, wherein the at least one stopping member is comprised of at least one detent or at least one protrusion.

28. The fiber optic equipment rail of claim 27, wherein the at least one stopping member is comprised of at least one leaf spring.

29. The fiber optic equipment rail of claim 26, wherein the at least one protrusion is configured is engage with at least one pull-out limiting member disposed on an end of the fiber optic equipment guide.

30. The fiber optic equipment rail of claim 26 attached to a fiber optic equipment tray or a fiber optic equipment module.

31. The fiber optic equipment rail of claim 26, wherein the at least one detent is configured to not impose a force on the at least one stopping member when the at least one detent is engaged with the at least one stopping member.

32. A method of providing access to a fiber optic module in fiber optic equipment, comprising:
imparting a force on a fiber optic equipment tray supporting one or more fiber optic modules to move at least one fiber optic equipment rail attached to the fiber optic equipment tray about a fiber optic equipment guide disposed in the fiber optic equipment; and
releasing at least one detent disposed in the fiber optic equipment rail from a first stopping member disposed in the fiber optic equipment guide to allow the fiber optic equipment tray to move;
engaging a second stopping member disposed in the fiber optic equipment guide with the at least one detent disposed in the fiber optic equipment rail to stop movement of the fiber optic equipment tray.

33. The method of claim 32, wherein the at least one stopping member is comprised of at least one detent or at least one protrusion.

34. The method of claim 32, wherein the first and second stopping members are each comprised of a leaf spring.

35. The method of claim 32, further comprising limiting the pull out distance of the fiber optic equipment tray when the at least one detent engages a pull-out limiting member disposed on an end of the fiber optic equipment guide.

36. The method of claim 32, wherein the at least one detent is configured to not impose a force on the at least one stopping member when the at least one detent is engaged with the at least one stopping member.

37. A fiber optic equipment guide panel, comprising:
an elongated member; and
at least one guide member disposed in the elongated member and configured to receive fiber optic equipment;
wherein the elongated member is configured to be attached to a chassis; and
a front pull-out limiting member disposed on a front end of the at least one guide member; and
a rear pull-out limiting member disposed on a rear end of the at least one guide member.

38. The fiber optic equipment guide panel of claim 37, wherein the front pull-out limiting member and the rear pull-out limiting member are each configured to receive at least one complementary member in the fiber optic equipment.

39. The fiber optic equipment guide panel of claim 37, wherein the front pull-out limiting member is configured to provide a front of stopping position for the fiber optic equipment during movement along the at least one guide member, and the rear pull-out limiting member is configured to provide a rear of stopping position for the fiber optic equipment during movement along the at least one guide member.

40. The fiber optic equipment guide of claim 37, wherein the chassis is comprised of a drawer.

41. The fiber optic equipment guide panel of claim 37, comprising two of the fiber optic equipment guide panels disposed opposing each other in the chassis each configured to receive opposing ends of the fiber optic equipment.

42. A fiber optic equipment guide panel, comprising:
an elongated member; and
at least one guide member disposed in the elongated member and configured to receive fiber optic equipment;
wherein the elongated member is configured to be attached to a chassis; and
wherein the at least one stopping member is comprised of at least one leaf spring disposed in the at least one guide member.

43. The fiber optic equipment guide panel of claim 42, wherein the at least one leaf spring is provided in the form of at least one curly bracket.

44. The fiber optic equipment guide panel of claim 42, wherein the at least one leaf spring provides a force between two (2) and four (4) pounds (lbs).

45. A fiber optic equipment rail, comprising:
an elongated member configured to be attached to fiber optic equipment and received in a fiber optic equipment guide to move the fiber optic equipment about the fiber optic equipment guide; and
at least one detent disposed in the elongated member and configured to engage with at least one stopping member disposed in the fiber optic equipment guide to provide at least one stopping position for the fiber optic equipment during movement about the fiber optic equipment guide;
wherein the at least one stopping member is comprised of at least one leaf spring.

46. The fiber optic equipment rail of claim 45, wherein the at least one stopping member is comprised of at least one detent or at least one protrusion.

47. The fiber optic equipment rail of claim 45 attached to a fiber optic equipment tray or a fiber optic equipment module.

48. The fiber optic equipment rail of claim 45, wherein the at least one detent is configured to not impose a force on the at least one stopping member when the at least one detent is engaged with the at least one stopping member.

* * * * *